(12) United States Patent
Chechik et al.

(10) Patent No.: US 12,358,277 B2
(45) Date of Patent: Jul. 15, 2025

(54) SYSTEMS AND METHODS FOR PREVENTING OR MINIMIZING PRINTING DEFECTS IN PRINTING PROCESSES

(71) Applicant: LANDA CORPORATION LTD., Rehovot (IL)

(72) Inventors: Helena Chechik, Rehovot (IL); Einat Tirosh, Ramat Gan (IL); Gal Finkelstein, Tel Aviv (IL); Lev Tsapovsky, Beer Sheva (IL); Dor Levy, Petah Tikva (IL)

(73) Assignee: LANDA CORPORATION LTD., Rehovot (IL)

( * ) Notice: Subject to any disclaimer, the term of this patent is extended or adjusted under 35 U.S.C. 154(b) by 803 days.

(21) Appl. No.: 17/438,497

(22) PCT Filed: Mar. 30, 2020

(86) PCT No.: PCT/IL2020/050384
§ 371 (c)(1),
(2) Date: Sep. 13, 2021

(87) PCT Pub. No.: WO2020/202145
PCT Pub. Date: Oct. 8, 2020

(65) Prior Publication Data
US 2022/0274411 A1    Sep. 1, 2022

Related U.S. Application Data

(60) Provisional application No. 62/827,083, filed on Mar. 31, 2019.

(51) Int. Cl.
*B41J 2/005* (2006.01)
*C09D 11/54* (2014.01)
(Continued)

(52) U.S. Cl.
CPC ............. *B41J 2/0057* (2013.01); *C09D 11/54* (2013.01); *C09D 183/04* (2013.01); *C09D 183/08* (2013.01); *B41J 2002/012* (2013.01)

(58) Field of Classification Search
CPC .................. B41J 2/0057; B41J 2002/012; B41J 2/17566; B41J 2/17509; C09D 11/54; C09D 183/04; C09D 183/08
See application file for complete search history.

(56) References Cited

U.S. PATENT DOCUMENTS 2,839,181 A    6/1958    Renner
3,011,545 A    12/1961   Welsh et al.
(Continued)

FOREIGN PATENT DOCUMENTS

CN    1121033 A    4/1996
CN    1200085 A    11/1998
(Continued)

OTHER PUBLICATIONS

CN101592896A Machine Translation (by EPO and Google)—published Dec. 2, 2009; Canon KK.
(Continued)

*Primary Examiner* — Justin Seo
(74) *Attorney, Agent, or Firm* — Momentum IP; Marc Van Dyke

(57) ABSTRACT

The present disclosure provides a system for punting. The present disclosure further provides a method for preventing or minimizing printing defects in a printing process.

22 Claims, 28 Drawing Sheets

(51) Int. Cl.
*C09D 183/04* (2006.01)
*C09D 183/08* (2006.01)
*B41J 2/01* (2006.01)

(56) References Cited

U.S. PATENT DOCUMENTS

| | | |
|---|---|---|
| 3,053,319 A | 9/1962 | Cronin et al. |
| 3,697,551 A | 10/1972 | Thomson |
| 3,697,568 A | 10/1972 | Boissieras et al. |
| 3,837,878 A | 9/1974 | Beers |
| 3,889,802 A | 6/1975 | Jonkers |
| 3,898,670 A | 8/1975 | Erikson et al. |
| 3,935,055 A | 1/1976 | Carmien |
| 3,947,113 A | 3/1976 | Buchan et al. |
| 4,009,958 A | 3/1977 | Kurita et al. |
| 4,093,764 A | 6/1978 | Duckett et al. |
| 4,204,471 A | 5/1980 | Becker |
| 4,293,866 A | 10/1981 | Takita et al. |
| 4,401,500 A | 8/1983 | Hamada et al. |
| 4,520,048 A | 5/1985 | Ranger |
| 4,535,694 A | 8/1985 | Fukuda |
| 4,538,156 A | 8/1985 | Durkee et al. |
| 4,555,437 A | 11/1985 | Tanck |
| 4,575,465 A | 3/1986 | Viola |
| 4,586,807 A | 5/1986 | Yuasa |
| 4,642,654 A | 2/1987 | Toganoh et al. |
| 4,792,473 A | 12/1988 | Vitale |
| 4,853,737 A | 8/1989 | Hartley et al. |
| 4,867,830 A | 9/1989 | Chung |
| 4,976,197 A | 12/1990 | Yamanari et al. |
| 5,012,072 A | 4/1991 | Martin et al. |
| 5,039,339 A | 8/1991 | Phan et al. |
| 5,062,364 A | 11/1991 | Lewis et al. |
| 5,075,731 A | 12/1991 | Kamimura et al. |
| 5,099,256 A | 3/1992 | Anderson |
| 5,106,417 A | 4/1992 | Hauser et al. |
| 5,128,091 A | 7/1992 | Agur et al. |
| 5,190,582 A | 3/1993 | Shinozuka et al. |
| 5,198,835 A | 3/1993 | Ando et al. |
| 5,246,100 A | 9/1993 | Stone et al. |
| 5,264,904 A | 11/1993 | Audi et al. |
| 5,278,199 A | 1/1994 | Ohkawa et al. |
| 5,305,099 A | 4/1994 | Morcos |
| 5,320,214 A | 6/1994 | Kordis |
| 5,333,771 A | 8/1994 | Cesario |
| 5,349,905 A | 9/1994 | Taylor et al. |
| 5,352,507 A | 10/1994 | Bresson et al. |
| 5,365,324 A | 11/1994 | Gu et al. |
| 5,406,884 A | 4/1995 | Okuda et al. |
| 5,471,233 A | 11/1995 | Okamoto et al. |
| 5,532,314 A | 7/1996 | Sexsmith |
| 5,552,875 A | 9/1996 | Sagiv et al. |
| 5,575,873 A | 11/1996 | Pieper et al. |
| 5,587,779 A | 12/1996 | Heeren et al. |
| 5,608,004 A | 3/1997 | Toyoda et al. |
| 5,613,669 A | 3/1997 | Grueninger |
| 5,614,933 A | 3/1997 | Hindman et al. |
| 5,623,296 A | 4/1997 | Fujino et al. |
| 5,642,141 A | 6/1997 | Hale et al. |
| 5,660,108 A | 8/1997 | Pensavecchia |
| 5,677,719 A | 10/1997 | Granzow |
| 5,679,463 A | 10/1997 | Visser et al. |
| 5,683,841 A | 11/1997 | Kato |
| 5,698,018 A | 12/1997 | Bishop et al. |
| 5,723,242 A | 3/1998 | Woo et al. |
| 5,733,698 A | 3/1998 | Lehman et al. |
| 5,736,250 A | 4/1998 | Heeks et al. |
| 5,772,746 A | 6/1998 | Sawada et al. |
| 5,777,576 A | 7/1998 | Zur et al. |
| 5,777,650 A | 7/1998 | Blank |
| 5,780,412 A | 7/1998 | Scarborough et al. |
| 5,841,456 A | 11/1998 | Takei et al. |
| 5,859,076 A | 1/1999 | Kozma et al. |
| 5,865,299 A | 2/1999 | Williams |
| 5,880,214 A | 3/1999 | Okuda |
| 5,883,144 A | 3/1999 | Bambara et al. |
| 5,883,145 A | 3/1999 | Hurley et al. |
| 5,884,559 A | 3/1999 | Okubo et al. |
| 5,889,534 A | 3/1999 | Johnson et al. |
| 5,891,934 A | 4/1999 | Moffatt et al. |
| 5,895,711 A | 4/1999 | Yamaki et al. |
| 5,902,841 A | 5/1999 | Jaeger et al. |
| 5,923,929 A | 7/1999 | Ben et al. |
| 5,929,129 A | 7/1999 | Feichtinger |
| 5,932,659 A | 8/1999 | Bambara et al. |
| 5,935,751 A | 8/1999 | Matsuoka et al. |
| 5,978,631 A | 11/1999 | Lee |
| 5,978,638 A | 11/1999 | Tanaka et al. |
| 5,991,590 A | 11/1999 | Chang et al. |
| 6,004,647 A | 12/1999 | Bambara et al. |
| 6,009,284 A | 12/1999 | Weinberger et al. |
| 6,024,018 A | 2/2000 | Darel et al. |
| 6,024,786 A | 2/2000 | Gore |
| 6,033,049 A | 3/2000 | Fukuda |
| 6,045,817 A | 4/2000 | Ananthapadmanabhan et al. |
| 6,053,438 A | 4/2000 | Romano, Jr. et al. |
| 6,055,396 A | 4/2000 | Pang |
| 6,059,407 A | 5/2000 | Komatsu et al. |
| 6,071,368 A | 6/2000 | Boyd et al. |
| 6,072,976 A | 6/2000 | Kuriyama et al. |
| 6,078,775 A | 6/2000 | Arai et al. |
| 6,094,558 A | 7/2000 | Shimizu et al. |
| 6,102,538 A | 8/2000 | Ochi et al. |
| 6,103,775 A | 8/2000 | Bambara et al. |
| 6,108,513 A | 8/2000 | Landa et al. |
| 6,109,746 A | 8/2000 | Jeanmaire et al. |
| 6,132,541 A | 10/2000 | Heaton |
| 6,143,807 A | 11/2000 | Lin et al. |
| 6,166,105 A | 12/2000 | Santilli et al. |
| 6,195,112 B1 | 2/2001 | Fassler et al. |
| 6,196,674 B1 | 3/2001 | Takemoto |
| 6,213,580 B1 | 4/2001 | Segerstrom et al. |
| 6,214,894 B1 | 4/2001 | Bambara et al. |
| 6,221,928 B1 | 4/2001 | Kozma et al. |
| 6,234,625 B1 | 5/2001 | Wen |
| 6,242,503 B1 | 6/2001 | Kozma et al. |
| 6,257,716 B1 | 7/2001 | Yanagawa et al. |
| 6,261,688 B1 | 7/2001 | Kaplan et al. |
| 6,262,137 B1 | 7/2001 | Kozma et al. |
| 6,262,207 B1 | 7/2001 | Rao et al. |
| 6,303,215 B1 | 10/2001 | Sonobe et al. |
| 6,316,512 B1 | 11/2001 | Bambara et al. |
| 6,318,853 B1 | 11/2001 | Asano et al. |
| 6,332,943 B1 | 12/2001 | Herrmann et al. |
| 6,335,046 B1 | 1/2002 | Mackey |
| 6,354,700 B1 | 3/2002 | Roth |
| 6,357,869 B1 | 3/2002 | Rasmussen et al. |
| 6,357,870 B1 | 3/2002 | Beach et al. |
| 6,358,660 B1 | 3/2002 | Agler et al. |
| 6,363,234 B2 | 3/2002 | Landa et al. |
| 6,364,451 B1 | 4/2002 | Silverbrook |
| 6,377,772 B1 | 4/2002 | Chowdry et al. |
| 6,383,278 B1 | 5/2002 | Hirasa et al. |
| 6,386,697 B1 | 5/2002 | Yamamoto et al. |
| 6,390,617 B1 | 5/2002 | Iwao |
| 6,396,528 B1 | 5/2002 | Yanagawa |
| 6,397,034 B1 | 5/2002 | Tarnawskyj et al. |
| 6,400,913 B1 | 6/2002 | De et al. |
| 6,402,317 B2 | 6/2002 | Yanagawa et al. |
| 6,405,006 B1 | 6/2002 | Tabuchi |
| 6,409,331 B1 | 6/2002 | Gelbart |
| 6,432,501 B1 | 8/2002 | Yang et al. |
| 6,438,352 B1 | 8/2002 | Landa et al. |
| 6,454,378 B1 | 9/2002 | Silverbrook et al. |
| 6,471,803 B1 | 10/2002 | Pelland et al. |
| 6,530,321 B2 | 3/2003 | Andrew et al. |
| 6,530,657 B2 | 3/2003 | Polierer |
| 6,531,520 B1 | 3/2003 | Bambara et al. |
| 6,551,394 B2 | 4/2003 | Hirasa et al. |
| 6,551,716 B1 | 4/2003 | Landa et al. |
| 6,554,189 B1 | 4/2003 | Good et al. |
| 6,559,969 B1 | 5/2003 | Lapstun |
| 6,575,547 B2 | 6/2003 | Sakuma |
| 6,586,100 B1 | 7/2003 | Pickering et al. |

(56) References Cited

U.S. PATENT DOCUMENTS

| | | |
|---|---|---|
| 6,590,012 B2 | 7/2003 | Miyabayashi |
| 6,608,979 B1 | 8/2003 | Landa et al. |
| 6,623,817 B1 | 9/2003 | Yang et al. |
| 6,630,047 B2 | 10/2003 | Jing et al. |
| 6,633,735 B2 | 10/2003 | Kellie et al. |
| 6,639,527 B2 | 10/2003 | Johnson |
| 6,648,468 B2 | 11/2003 | Shinkoda et al. |
| 6,678,068 B1 | 1/2004 | Richter et al. |
| 6,682,189 B2 | 1/2004 | May et al. |
| 6,685,769 B1 | 2/2004 | Karl et al. |
| 6,704,535 B2 | 3/2004 | Kobayashi et al. |
| 6,709,096 B1 | 3/2004 | Beach et al. |
| 6,716,562 B2 | 4/2004 | Uehara et al. |
| 6,719,423 B2 | 4/2004 | Chowdry et al. |
| 6,720,367 B2 | 4/2004 | Taniguchi et al. |
| 6,755,519 B2 | 6/2004 | Gelbart et al. |
| 6,761,446 B2 | 7/2004 | Chowdry et al. |
| 6,770,331 B1 | 8/2004 | Mielke et al. |
| 6,789,887 B2 | 9/2004 | Yang et al. |
| 6,811,840 B1 | 11/2004 | Cross |
| 6,827,018 B1 | 12/2004 | Hartmann et al. |
| 6,881,458 B2 | 4/2005 | Ludwig et al. |
| 6,898,403 B2 | 5/2005 | Baker et al. |
| 6,912,952 B1 | 7/2005 | Landa et al. |
| 6,916,862 B2 | 7/2005 | Ota et al. |
| 6,917,437 B1 | 7/2005 | Myers et al. |
| 6,966,712 B2 | 11/2005 | Trelewicz et al. |
| 6,970,674 B2 | 11/2005 | Sato et al. |
| 6,974,022 B2 | 12/2005 | Saeki |
| 6,982,799 B2 | 1/2006 | Lapstun |
| 6,983,692 B2 | 1/2006 | Beauchamp et al. |
| 7,025,453 B2 | 4/2006 | Ylitalo et al. |
| 7,057,760 B2 | 6/2006 | Lapstun et al. |
| 7,084,202 B2 | 8/2006 | Pickering et al. |
| 7,128,412 B2 | 10/2006 | King et al. |
| 7,129,858 B2 | 10/2006 | Ferran et al. |
| 7,134,953 B2 | 11/2006 | Reinke |
| 7,160,377 B2 | 1/2007 | Zoch et al. |
| 7,204,584 B2 | 4/2007 | Lean et al. |
| 7,213,900 B2 | 5/2007 | Ebihara |
| 7,224,478 B1 | 5/2007 | Lapstun et al. |
| 7,265,819 B2 | 9/2007 | Raney |
| 7,271,213 B2 | 9/2007 | Hoshida et al. |
| 7,296,882 B2 | 11/2007 | Buehler et al. |
| 7,300,133 B1 | 11/2007 | Folkins et al. |
| 7,300,147 B2 | 11/2007 | Johnson |
| 7,304,753 B1 | 12/2007 | Richter et al. |
| 7,322,689 B2 | 1/2008 | Kohne et al. |
| 7,334,520 B2 | 2/2008 | Geissler et al. |
| 7,348,368 B2 | 3/2008 | Kakiuchi et al. |
| 7,360,887 B2 | 4/2008 | Konno |
| 7,362,464 B2 | 4/2008 | Kitazawa |
| 7,419,257 B2 | 9/2008 | Mouri et al. |
| 7,459,491 B2 | 12/2008 | Tyvoll et al. |
| 7,494,213 B2 | 2/2009 | Taniuchi et al. |
| 7,527,359 B2 | 5/2009 | Stevenson et al. |
| 7,575,314 B2 | 8/2009 | Desie et al. |
| 7,612,125 B2 | 11/2009 | Muller et al. |
| 7,655,707 B2 | 2/2010 | Ma |
| 7,655,708 B2 | 2/2010 | House et al. |
| 7,699,922 B2 | 4/2010 | Breton et al. |
| 7,708,371 B2 | 5/2010 | Yamanobe |
| 7,709,074 B2 | 5/2010 | Uchida et al. |
| 7,712,890 B2 | 5/2010 | Yahiro |
| 7,732,543 B2 | 6/2010 | Loch et al. |
| 7,732,583 B2 | 6/2010 | Annoura et al. |
| 7,808,670 B2 | 10/2010 | Lapstun et al. |
| 7,810,922 B2 | 10/2010 | Gervasi et al. |
| 7,845,788 B2 | 12/2010 | Oku |
| 7,867,327 B2 | 1/2011 | Sano et al. |
| 7,876,345 B2 | 1/2011 | Houjou |
| 7,910,183 B2 | 3/2011 | Wu |
| 7,919,544 B2 | 4/2011 | Matsuyama et al. |
| 7,942,516 B2 | 5/2011 | Ohara et al. |
| 7,977,408 B2 | 7/2011 | Matsuyama et al. |
| 7,985,784 B2 | 7/2011 | Kanaya et al. |
| 8,002,400 B2 | 8/2011 | Kibayashi et al. |
| 8,012,538 B2 | 9/2011 | Yokouchi |
| 8,025,389 B2 | 9/2011 | Yamanobe et al. |
| 8,038,284 B2 | 10/2011 | Hori et al. |
| 8,041,275 B2 | 10/2011 | Soria et al. |
| 8,042,906 B2 | 10/2011 | Chiwata et al. |
| 8,059,309 B2 | 11/2011 | Lapstun et al. |
| 8,095,054 B2 | 1/2012 | Nakamura |
| 8,109,595 B2 | 2/2012 | Tanaka et al. |
| 8,119,315 B1 | 2/2012 | Heuft et al. |
| 8,122,846 B2 | 2/2012 | Stiblert et al. |
| 8,147,055 B2 | 4/2012 | Cellura et al. |
| 8,162,428 B2 | 4/2012 | Eun et al. |
| 8,177,351 B2 | 5/2012 | Taniuchi et al. |
| 8,186,820 B2 | 5/2012 | Chiwata |
| 8,192,904 B2 | 6/2012 | Nagai et al. |
| 8,215,762 B2 | 7/2012 | Ageishi |
| 8,242,201 B2 | 8/2012 | Goto et al. |
| 8,256,857 B2 | 9/2012 | Folkins et al. |
| 8,263,683 B2 | 9/2012 | Gibson et al. |
| 8,264,135 B2 | 9/2012 | Ozolins et al. |
| 8,295,733 B2 | 10/2012 | Imoto |
| 8,303,071 B2 | 11/2012 | Eun |
| 8,303,072 B2 | 11/2012 | Shibata et al. |
| 8,304,043 B2 | 11/2012 | Nagashima et al. |
| 8,353,589 B2 | 1/2013 | Ikeda et al. |
| 8,434,847 B2 | 5/2013 | Dejong et al. |
| 8,460,450 B2 | 6/2013 | Taverizatshy et al. |
| 8,469,476 B2 | 6/2013 | Mandel et al. |
| 8,474,963 B2 | 7/2013 | Hasegawa et al. |
| 8,536,268 B2 | 9/2013 | Karjala et al. |
| 8,546,466 B2 | 10/2013 | Yamashita et al. |
| 8,556,400 B2 | 10/2013 | Yatake et al. |
| 8,632,147 B2 | 1/2014 | Onishi |
| 8,693,032 B2 | 4/2014 | Goddard et al. |
| 8,711,304 B2 | 4/2014 | Mathew et al. |
| 8,714,731 B2 | 5/2014 | Leung et al. |
| 8,746,873 B2 | 6/2014 | Tsukamoto et al. |
| 8,779,027 B2 | 7/2014 | Idemura et al. |
| 8,802,221 B2 | 8/2014 | Noguchi et al. |
| 8,867,097 B2 | 10/2014 | Mizuno |
| 8,885,218 B2 | 11/2014 | Hirose |
| 8,891,128 B2 | 11/2014 | Yamazaki |
| 8,894,198 B2 | 11/2014 | Hook et al. |
| 8,919,946 B2 | 12/2014 | Suzuki et al. |
| 9,004,629 B2 | 4/2015 | De et al. |
| 9,044,932 B2 | 6/2015 | Ohnishi et al. |
| 9,186,884 B2 | 11/2015 | Landa et al. |
| 9,207,585 B2 | 12/2015 | Hatano et al. |
| 9,227,429 B1 | 1/2016 | LeStrange et al. |
| 9,229,664 B2 | 1/2016 | Landa et al. |
| 9,264,559 B2 | 2/2016 | Motoyanagi et al. |
| 9,284,469 B2 | 3/2016 | Song et al. |
| 9,290,016 B2 | 3/2016 | Landa et al. |
| 9,327,496 B2 | 5/2016 | Landa et al. |
| 9,327,519 B1 | 5/2016 | Larson et al. |
| 9,353,273 B2 | 5/2016 | Landa et al. |
| 9,381,736 B2 | 7/2016 | Landa et al. |
| 9,446,586 B2 | 9/2016 | Matos et al. |
| 9,498,946 B2 | 11/2016 | Landa et al. |
| 9,505,208 B2 | 11/2016 | Shmaiser et al. |
| 9,517,618 B2 | 12/2016 | Landa et al. |
| 9,566,780 B2 | 2/2017 | Landa et al. |
| 9,568,862 B2 | 2/2017 | Shmaiser et al. |
| 9,643,400 B2 | 5/2017 | Landa et al. |
| 9,643,403 B2 | 5/2017 | Landa et al. |
| 9,776,391 B2 | 10/2017 | Landa et al. |
| 9,782,993 B2 | 10/2017 | Landa et al. |
| 9,849,667 B2 | 12/2017 | Landa et al. |
| 9,884,479 B2 | 2/2018 | Landa et al. |
| 9,902,147 B2 | 2/2018 | Shmaiser et al. |
| 9,914,316 B2 | 3/2018 | Landa et al. |
| 9,969,182 B2 | 5/2018 | Torisaka et al. |
| 10,052,865 B2 | 8/2018 | Goto |
| 10,065,411 B2 | 9/2018 | Landa et al. |
| 10,175,613 B2 | 1/2019 | Watanabe |
| 10,179,447 B2 | 1/2019 | Shmaiser et al. |
| 10,190,012 B2 | 1/2019 | Landa et al. |

(56) References Cited

U.S. PATENT DOCUMENTS

| | | | |
|---|---|---|---|
| 10,195,843 B2 | 2/2019 | Landa et al. |
| 10,201,968 B2 | 2/2019 | Landa et al. |
| 10,226,920 B2 | 3/2019 | Shmaiser et al. |
| 10,266,711 B2 | 4/2019 | Landa et al. |
| 10,300,690 B2 | 5/2019 | Landa et al. |
| 10,336,060 B2 | 7/2019 | Liu |
| 10,357,963 B2 | 7/2019 | Landa et al. |
| 10,357,985 B2 | 7/2019 | Landa et al. |
| 10,427,399 B2 | 10/2019 | Shmaiser et al. |
| 10,434,761 B2 | 10/2019 | Landa et al. |
| 10,477,188 B2 | 11/2019 | Stiglic et al. |
| 10,518,526 B2 | 12/2019 | Landa et al. |
| 10,569,532 B2 | 2/2020 | Shmaiser et al. |
| 10,569,533 B2 | 2/2020 | Landa et al. |
| 10,569,534 B2 | 2/2020 | Shmaiser et al. |
| 10,576,734 B2 | 3/2020 | Landa et al. |
| 10,596,804 B2 | 3/2020 | Landa et al. |
| 10,632,740 B2 | 4/2020 | Landa et al. |
| 10,642,198 B2 | 5/2020 | Landa et al. |
| 10,703,093 B2 | 7/2020 | Karlinski et al. |
| 10,703,094 B2 | 7/2020 | Shmaiser et al. |
| 10,730,333 B2 | 8/2020 | Landa et al. |
| 10,759,953 B2 | 9/2020 | Landa et al. |
| 10,800,936 B2 | 10/2020 | Landa et al. |
| 10,828,888 B2 | 11/2020 | Landa et al. |
| 10,889,128 B2 | 1/2021 | Landa et al. |
| 10,926,532 B2 | 2/2021 | Chechik et al. |
| 10,933,661 B2 | 3/2021 | Landa et al. |
| 10,960,660 B2 | 3/2021 | Landa et al. |
| 10,981,377 B2 | 4/2021 | Landa et al. |
| 10,994,528 B1 | 5/2021 | Burkatovsky |
| 11,104,123 B2 | 8/2021 | Shmaiser et al. |
| 11,106,161 B2 | 8/2021 | Landa et al. |
| 11,179,928 B2 | 11/2021 | Shmaiser et al. |
| 11,196,984 B2 | 12/2021 | Stiglic et al. |
| 2001/0022607 A1 | 9/2001 | Takahashi et al. |
| 2001/0033688 A1 | 10/2001 | Taylor |
| 2002/0041317 A1 | 4/2002 | Kashiwazaki et al. |
| 2002/0061451 A1 | 5/2002 | Kita et al. |
| 2002/0064404 A1 | 5/2002 | Iwai |
| 2002/0102374 A1 | 8/2002 | Gervasi et al. |
| 2002/0121220 A1 | 9/2002 | Lin |
| 2002/0150408 A1 | 10/2002 | Mosher et al. |
| 2002/0164494 A1 | 11/2002 | Grant et al. |
| 2002/0197481 A1 | 12/2002 | Jing et al. |
| 2003/0004025 A1 | 1/2003 | Okuno et al. |
| 2003/0007055 A1 | 1/2003 | Ogawa |
| 2003/0018119 A1 | 1/2003 | Frenkel et al. |
| 2003/0030686 A1 | 2/2003 | Abe et al. |
| 2003/0032700 A1 | 2/2003 | Morrison et al. |
| 2003/0041777 A1 | 3/2003 | Karl et al. |
| 2003/0043258 A1 | 3/2003 | Kerr et al. |
| 2003/0054139 A1 | 3/2003 | Ylitalo et al. |
| 2003/0055129 A1 | 3/2003 | Alford |
| 2003/0063179 A1 | 4/2003 | Adachi |
| 2003/0064317 A1 | 4/2003 | Bailey et al. |
| 2003/0081964 A1 | 5/2003 | Shimura et al. |
| 2003/0103128 A1 | 6/2003 | Missell et al. |
| 2003/0118381 A1 | 6/2003 | Law et al. |
| 2003/0129435 A1 | 7/2003 | Blankenship et al. |
| 2003/0186147 A1 | 10/2003 | Pickering et al. |
| 2003/0214568 A1 | 11/2003 | Nishikawa et al. |
| 2003/0234849 A1 | 12/2003 | Pan et al. |
| 2004/0003863 A1 | 1/2004 | Eckhardt |
| 2004/0020382 A1 | 2/2004 | McLean et al. |
| 2004/0036758 A1 | 2/2004 | Sasaki et al. |
| 2004/0047666 A1 | 3/2004 | Imaizumi et al. |
| 2004/0087707 A1 | 5/2004 | Zoch et al. |
| 2004/0105971 A1 | 6/2004 | Parrinello et al. |
| 2004/0123761 A1 | 7/2004 | Szumla et al. |
| 2004/0125188 A1 | 7/2004 | Szumla et al. |
| 2004/0145643 A1 | 7/2004 | Nakamura |
| 2004/0173111 A1 | 9/2004 | Okuda |
| 2004/0177779 A1 | 9/2004 | Steffen et al. |
| 2004/0200369 A1 | 10/2004 | Brady |
| 2004/0221943 A1 | 11/2004 | Yu et al. |
| 2004/0228642 A1 | 11/2004 | Iida et al. |
| 2004/0246324 A1 | 12/2004 | Nakashima |
| 2004/0246326 A1 | 12/2004 | Dwyer et al. |
| 2004/0249327 A1 | 12/2004 | Sendijarevic et al. |
| 2004/0252175 A1 | 12/2004 | Bejat et al. |
| 2004/0265016 A1 | 12/2004 | Kitani et al. |
| 2005/0031807 A1 | 2/2005 | Quintens et al. |
| 2005/0082146 A1 | 4/2005 | Axmann |
| 2005/0103437 A1 | 5/2005 | Carroll |
| 2005/0110855 A1 | 5/2005 | Taniuchi et al. |
| 2005/0111861 A1 | 5/2005 | Calamita et al. |
| 2005/0117859 A1 | 6/2005 | Suzuki et al. |
| 2005/0134874 A1 | 6/2005 | Overall et al. |
| 2005/0150408 A1 | 7/2005 | Hesterman |
| 2005/0185009 A1 | 8/2005 | Claramunt et al. |
| 2005/0195235 A1 | 9/2005 | Kitao |
| 2005/0235870 A1 | 10/2005 | Ishihara |
| 2005/0266332 A1 | 12/2005 | Pavlisko et al. |
| 2005/0272334 A1 | 12/2005 | Wang et al. |
| 2006/0004123 A1 | 1/2006 | Wu et al. |
| 2006/0066704 A1 | 3/2006 | Nishida |
| 2006/0120740 A1 | 6/2006 | Yamada et al. |
| 2006/0135709 A1 | 6/2006 | Hasegawa et al. |
| 2006/0164488 A1 | 7/2006 | Taniuchi et al. |
| 2006/0164489 A1 | 7/2006 | Vega et al. |
| 2006/0175559 A1 | 8/2006 | Fischer et al. |
| 2006/0192827 A1 | 8/2006 | Takada et al. |
| 2006/0233578 A1 | 10/2006 | Maki et al. |
| 2006/0286462 A1 | 12/2006 | Jackson et al. |
| 2007/0014595 A1 | 1/2007 | Kawagoe |
| 2007/0025740 A1 | 2/2007 | Katoh et al. |
| 2007/0025768 A1 | 2/2007 | Komatsu et al. |
| 2007/0029171 A1 | 2/2007 | Nemedi |
| 2007/0045939 A1 | 3/2007 | Toya et al. |
| 2007/0054981 A1 | 3/2007 | Yanagi et al. |
| 2007/0064077 A1 | 3/2007 | Konno |
| 2007/0077520 A1 | 4/2007 | Maemoto |
| 2007/0120927 A1 | 5/2007 | Snyder et al. |
| 2007/0123642 A1 | 5/2007 | Banning et al. |
| 2007/0134030 A1 | 6/2007 | Lior et al. |
| 2007/0144368 A1 | 6/2007 | Barazani et al. |
| 2007/0146462 A1 | 6/2007 | Taniuchi et al. |
| 2007/0147894 A1 | 6/2007 | Yokota et al. |
| 2007/0166071 A1 | 7/2007 | Shima |
| 2007/0176995 A1 | 8/2007 | Kadomatsu et al. |
| 2007/0189819 A1 | 8/2007 | Uehara et al. |
| 2007/0199457 A1 | 8/2007 | Cyman et al. |
| 2007/0229639 A1 | 10/2007 | Yahiro |
| 2007/0253726 A1 | 11/2007 | Kagawa |
| 2007/0257955 A1 | 11/2007 | Tanaka et al. |
| 2007/0285486 A1 | 12/2007 | Harris et al. |
| 2008/0006176 A1 | 1/2008 | Houjou |
| 2008/0030536 A1 | 2/2008 | Furukawa et al. |
| 2008/0032072 A1 | 2/2008 | Taniuchi et al. |
| 2008/0044587 A1 | 2/2008 | Maeno et al. |
| 2008/0055356 A1 | 3/2008 | Yamanobe |
| 2008/0055381 A1 | 3/2008 | Doi et al. |
| 2008/0055385 A1* | 3/2008 | Houjou ............... C09D 11/40 |
| | | 347/213 |
| 2008/0066277 A1 | 3/2008 | Colson et al. |
| 2008/0074462 A1 | 3/2008 | Hirakawa |
| 2008/0101895 A1 | 5/2008 | Holcomb et al. |
| 2008/0112912 A1 | 5/2008 | Springob et al. |
| 2008/0124158 A1 | 5/2008 | Folkins |
| 2008/0138546 A1 | 6/2008 | Soria et al. |
| 2008/0166495 A1 | 7/2008 | Maeno et al. |
| 2008/0167185 A1 | 7/2008 | Hirota |
| 2008/0175612 A1 | 7/2008 | Oikawa et al. |
| 2008/0196612 A1 | 8/2008 | Rancourt et al. |
| 2008/0196621 A1 | 8/2008 | Ikuno et al. |
| 2008/0213548 A1 | 9/2008 | Koganehira et al. |
| 2008/0236480 A1 | 10/2008 | Furukawa et al. |
| 2008/0247780 A1 | 10/2008 | Hara |
| 2008/0253812 A1 | 10/2008 | Pearce et al. |
| 2008/0295724 A1 | 12/2008 | Lohweg et al. |
| 2009/0022504 A1 | 1/2009 | Kuwabara et al. |
| 2009/0041515 A1 | 2/2009 | Kim |
| 2009/0041932 A1 | 2/2009 | Ishizuka et al. |

(56) References Cited

U.S. PATENT DOCUMENTS

| | | |
|---|---|---|
| 2009/0064884 A1 | 3/2009 | Hook et al. |
| 2009/0073222 A1 | 3/2009 | Hori |
| 2009/0074492 A1 | 3/2009 | Ito |
| 2009/0082503 A1 | 3/2009 | Yanagi et al. |
| 2009/0087565 A1 | 4/2009 | Houjou |
| 2009/0098385 A1 | 4/2009 | Kaemper et al. |
| 2009/0116885 A1 | 5/2009 | Ando |
| 2009/0148200 A1 | 6/2009 | Hara et al. |
| 2009/0165937 A1 | 7/2009 | Inoue et al. |
| 2009/0185204 A1 | 7/2009 | Wu et al. |
| 2009/0190951 A1 | 7/2009 | Torimaru et al. |
| 2009/0202275 A1 | 8/2009 | Nishida et al. |
| 2009/0211490 A1 | 8/2009 | Ikuno et al. |
| 2009/0220873 A1 | 9/2009 | Enomoto et al. |
| 2009/0237479 A1 | 9/2009 | Yamashita et al. |
| 2009/0256896 A1 | 10/2009 | Scarlata |
| 2009/0279170 A1 | 11/2009 | Miyazaki et al. |
| 2009/0315926 A1 | 12/2009 | Yamanobe |
| 2009/0317555 A1 | 12/2009 | Hori |
| 2009/0318591 A1 | 12/2009 | Ageishi et al. |
| 2010/0012023 A1 | 1/2010 | Lefevre et al. |
| 2010/0035501 A1 | 2/2010 | Prudhomme et al. |
| 2010/0053292 A1 | 3/2010 | Thayer et al. |
| 2010/0053293 A1 | 3/2010 | Thayer et al. |
| 2010/0066796 A1 | 3/2010 | Yanagi et al. |
| 2010/0075843 A1 | 3/2010 | Ikuno et al. |
| 2010/0086692 A1 | 4/2010 | Ohta et al. |
| 2010/0091064 A1 | 4/2010 | Araki et al. |
| 2010/0123752 A1 | 5/2010 | Eun et al. |
| 2010/0225695 A1 | 9/2010 | Fujikura |
| 2010/0231623 A1 | 9/2010 | Hirato |
| 2010/0239789 A1 | 9/2010 | Umeda |
| 2010/0245511 A1 | 9/2010 | Ageishi |
| 2010/0247171 A1 | 9/2010 | Ono et al. |
| 2010/0282100 A1 | 11/2010 | Okuda et al. |
| 2010/0285221 A1 | 11/2010 | Oki et al. |
| 2010/0300604 A1 | 12/2010 | Goss et al. |
| 2010/0303504 A1 | 12/2010 | Funamoto et al. |
| 2010/0310281 A1 | 12/2010 | Miura et al. |
| 2011/0044724 A1 | 2/2011 | Funamoto et al. |
| 2011/0058001 A1 | 3/2011 | Gila et al. |
| 2011/0058859 A1 | 3/2011 | Nakamatsu et al. |
| 2011/0069110 A1 | 3/2011 | Matsumoto et al. |
| 2011/0069117 A1 | 3/2011 | Ohzeki et al. |
| 2011/0069129 A1 | 3/2011 | Shimizu |
| 2011/0085828 A1 | 4/2011 | Kosako et al. |
| 2011/0128300 A1 | 6/2011 | Gay et al. |
| 2011/0141188 A1 | 6/2011 | Morita |
| 2011/0149002 A1 | 6/2011 | Kessler |
| 2011/0150509 A1 | 6/2011 | Komiya |
| 2011/0150541 A1 | 6/2011 | Michibata |
| 2011/0169889 A1 | 7/2011 | Kojima et al. |
| 2011/0195260 A1 | 8/2011 | Lee et al. |
| 2011/0199414 A1 | 8/2011 | Lang |
| 2011/0234683 A1 | 9/2011 | Komatsu |
| 2011/0234689 A1 | 9/2011 | Saito |
| 2011/0242181 A1 | 10/2011 | Otobe |
| 2011/0249090 A1 | 10/2011 | Moore et al. |
| 2011/0269885 A1 | 11/2011 | Imai |
| 2011/0279554 A1 | 11/2011 | Dannhauser et al. |
| 2011/0298884 A1 | 12/2011 | Furuta |
| 2011/0304674 A1 | 12/2011 | Sambhy et al. |
| 2012/0013693 A1 | 1/2012 | Tasaka et al. |
| 2012/0013694 A1 | 1/2012 | Kanke |
| 2012/0013928 A1 | 1/2012 | Yoshida et al. |
| 2012/0014726 A1 | 1/2012 | Sekihara et al. |
| 2012/0026224 A1 | 2/2012 | Anthony et al. |
| 2012/0039647 A1 | 2/2012 | Brewington et al. |
| 2012/0094091 A1 | 4/2012 | Van et al. |
| 2012/0098882 A1 | 4/2012 | Onishi et al. |
| 2012/0105561 A1 | 5/2012 | Taniuchi et al. |
| 2012/0105562 A1 | 5/2012 | Sekiguchi et al. |
| 2012/0113180 A1 | 5/2012 | Tanaka et al. |
| 2012/0113203 A1 | 5/2012 | Kushida et al. |
| 2012/0127250 A1 | 5/2012 | Kanasugi et al. |
| 2012/0127251 A1 | 5/2012 | Tsuji et al. |
| 2012/0140009 A1 | 6/2012 | Kanasugi et al. |
| 2012/0154497 A1 | 6/2012 | Nakao et al. |
| 2012/0156375 A1 | 6/2012 | Brust et al. |
| 2012/0156624 A1 | 6/2012 | Rondon et al. |
| 2012/0162302 A1 | 6/2012 | Oguchi et al. |
| 2012/0163846 A1 | 6/2012 | Andoh et al. |
| 2012/0183756 A1 | 7/2012 | Higuchi |
| 2012/0194830 A1 | 8/2012 | Gaertner et al. |
| 2012/0236100 A1 | 9/2012 | Toya |
| 2012/0237260 A1 | 9/2012 | Sengoku et al. |
| 2012/0249630 A1 | 10/2012 | Bugner et al. |
| 2012/0280447 A1 | 11/2012 | Kayanuma |
| 2012/0287260 A1 | 11/2012 | Lu et al. |
| 2012/0301186 A1 | 11/2012 | Yang et al. |
| 2012/0314013 A1 | 12/2012 | Takemoto et al. |
| 2012/0314077 A1 | 12/2012 | Clavenna, II et al. |
| 2013/0011158 A1 | 1/2013 | Meguro et al. |
| 2013/0016156 A1 | 1/2013 | Ooishi et al. |
| 2013/0017006 A1 | 1/2013 | Suda |
| 2013/0044188 A1 | 2/2013 | Nakamura et al. |
| 2013/0057603 A1 | 3/2013 | Gordon |
| 2013/0088543 A1 | 4/2013 | Tsuji et al. |
| 2013/0096871 A1 | 4/2013 | Takahama |
| 2013/0120513 A1 | 5/2013 | Thayer et al. |
| 2013/0182045 A1 | 7/2013 | Ohzeki et al. |
| 2013/0201237 A1 | 8/2013 | Thomson et al. |
| 2013/0229457 A1 | 9/2013 | Yu |
| 2013/0234080 A1 | 9/2013 | Torikoshi et al. |
| 2013/0235139 A1 | 9/2013 | Schnabel et al. |
| 2013/0242016 A1 | 9/2013 | Edwards et al. |
| 2013/0302065 A1 | 11/2013 | Mori et al. |
| 2013/0338273 A1 | 12/2013 | Shimanaka et al. |
| 2014/0001013 A1 | 1/2014 | Takifuji et al. |
| 2014/0011125 A1 | 1/2014 | Inoue et al. |
| 2014/0043398 A1 | 2/2014 | Butler et al. |
| 2014/0104360 A1 | 4/2014 | Häcker et al. |
| 2014/0153956 A1 | 6/2014 | Yonemoto |
| 2014/0168313 A1 | 6/2014 | Ramesh et al. |
| 2014/0168330 A1 | 6/2014 | Liu et al. |
| 2014/0175707 A1 | 6/2014 | Wolk et al. |
| 2014/0176641 A1 | 6/2014 | Hawryschuk et al. |
| 2014/0198162 A1 | 7/2014 | DiRubio et al. |
| 2014/0232782 A1 | 8/2014 | Mukai et al. |
| 2014/0267777 A1 | 9/2014 | Le et al. |
| 2014/0334855 A1 | 11/2014 | Onishi et al. |
| 2014/0339056 A1 | 11/2014 | Iwakoshi et al. |
| 2015/0022605 A1 | 1/2015 | Mantell et al. |
| 2015/0024648 A1 | 1/2015 | Landa et al. |
| 2015/0025179 A1 | 1/2015 | Landa et al. |
| 2015/0072090 A1 | 3/2015 | Landa et al. |
| 2015/0085036 A1 | 3/2015 | Liu et al. |
| 2015/0085037 A1 | 3/2015 | Liu et al. |
| 2015/0085038 A1 | 3/2015 | Liu |
| 2015/0097906 A1 | 4/2015 | Beier et al. |
| 2015/0116408 A1 | 4/2015 | Armbruster et al. |
| 2015/0118503 A1 | 4/2015 | Landa et al. |
| 2015/0165758 A1 | 6/2015 | Sambhy et al. |
| 2015/0195509 A1 | 7/2015 | Phipps |
| 2015/0210065 A1 | 7/2015 | Kelly et al. |
| 2015/0273835 A1 | 10/2015 | Arimizu et al. |
| 2015/0304531 A1 | 10/2015 | Rodriguez et al. |
| 2015/0315403 A1 | 11/2015 | Song et al. |
| 2015/0336378 A1 | 11/2015 | Guttmann et al. |
| 2015/0343797 A1 | 12/2015 | Song et al. |
| 2015/0361288 A1 | 12/2015 | Song et al. |
| 2015/0375474 A1 | 12/2015 | DeGOLIER et al. |
| 2015/0375543 A1 | 12/2015 | Barnett et al. |
| 2016/0031246 A1 | 2/2016 | Sreekumar et al. |
| 2016/0083609 A1 | 3/2016 | Sisler et al. |
| 2016/0222232 A1 | 8/2016 | Landa et al. |
| 2016/0250879 A1 | 9/2016 | Chen et al. |
| 2016/0274519 A1 | 9/2016 | Lim et al. |
| 2016/0286462 A1 | 9/2016 | Gohite et al. |
| 2016/0375680 A1 | 12/2016 | Nishitani et al. |
| 2016/0378036 A1 | 12/2016 | Onishi et al. |
| 2017/0028688 A1 | 2/2017 | Dannhauser et al. |
| 2017/0104887 A1 | 4/2017 | Nomura |
| 2017/0282599 A1 | 10/2017 | Ido |

(56) References Cited

U.S. PATENT DOCUMENTS

| | | | |
|---|---|---|---|
| 2018/0149998 A1 | 5/2018 | Furukawa |
| 2018/0259888 A1 | 9/2018 | Mitsui et al. |
| 2018/0281382 A1 | 10/2018 | Umezawa et al. |
| 2018/0348672 A1 | 12/2018 | Yoshida |
| 2018/0348675 A1 | 12/2018 | Nakamura et al. |
| 2019/0016114 A1 | 1/2019 | Sugiyama et al. |
| 2019/0094727 A1 | 3/2019 | Landa et al. |
| 2019/0152218 A1 | 5/2019 | Stein et al. |
| 2019/0218411 A1 | 7/2019 | Landa et al. |
| 2019/0232638 A1 | 8/2019 | Ziegenbalg et al. |
| 2020/0073301 A1 | 3/2020 | Sakai et al. |
| 2020/0171813 A1 | 6/2020 | Chechik et al. |
| 2020/0276801 A1 | 9/2020 | Landa et al. |
| 2020/0353746 A1 | 11/2020 | Landa et al. |
| 2020/0361202 A1 | 11/2020 | Burkatovsky |
| 2020/0361715 A1 | 11/2020 | Meier |
| 2020/0376860 A1 | 12/2020 | Paker et al. |
| 2020/0376878 A1 | 12/2020 | Landa et al. |
| 2021/0001622 A1 | 1/2021 | Landa et al. |
| 2021/0053341 A1 | 2/2021 | Landa et al. |
| 2021/0055666 A1 | 2/2021 | Landa et al. |
| 2021/0062021 A1 | 3/2021 | Landa et al. |
| 2021/0070038 A1 | 3/2021 | Pomerantz et al. |
| 2021/0070083 A1 | 3/2021 | Levanon et al. |
| 2021/0095145 A1 | 4/2021 | Landa et al. |
| 2021/0146697 A1 | 5/2021 | Landa et al. |
| 2021/0182001 A1 | 6/2021 | Levant |
| 2021/0245528 A1 | 8/2021 | Landa et al. |
| 2021/0252876 A1 | 8/2021 | Landa et al. |
| 2021/0260869 A1 | 8/2021 | Landa et al. |
| 2021/0268793 A1 | 9/2021 | Burkatovsky |
| 2021/0283899 A1 | 9/2021 | Landa et al. |
| 2021/0309020 A1 | 10/2021 | Siman Tov et al. |
| 2022/0188050 A1 | 6/2022 | Levant |
| 2022/0288947 A1 | 9/2022 | Landa et al. |
| 2022/0379598 A1 | 12/2022 | Landa et al. |
| 2022/0388315 A1 | 12/2022 | Landa et al. |
| 2023/0001710 A1 | 1/2023 | Landa et al. |
| 2023/0166495 A1 | 6/2023 | Burkatovsky |
| 2023/0202162 A1 | 6/2023 | Landa et al. |
| 2023/0202209 A1 | 6/2023 | Guttman et al. |
| 2023/0331016 A1 | 10/2023 | Landa et al. |
| 2023/0356534 A1 | 11/2023 | Landa et al. |
| 2023/0365824 A1 | 11/2023 | Levanon et al. |

FOREIGN PATENT DOCUMENTS

| | | | |
|---|---|---|---|
| CN | 1212229 A | 3/1999 |
| CN | 1305895 A | 8/2001 |
| CN | 1324901 A | 12/2001 |
| CN | 1445622 A | 10/2003 |
| CN | 1493514 A | 5/2004 |
| CN | 1535235 A | 10/2004 |
| CN | 1543404 A | 11/2004 |
| CN | 1555422 A | 12/2004 |
| CN | 1680506 A | 10/2005 |
| CN | 1703326 A | 11/2005 |
| CN | 1720187 A | 1/2006 |
| CN | 1261831 C | 6/2006 |
| CN | 1809460 A | 7/2006 |
| CN | 1289368 C | 12/2006 |
| CN | 1961015 A | 5/2007 |
| CN | 101073937 A | 11/2007 |
| CN | 101096455 A | 1/2008 |
| CN | 101177057 A | 5/2008 |
| CN | 201082827 Y | 7/2008 |
| CN | 101248146 A | 8/2008 |
| CN | 101249768 A | 8/2008 |
| CN | 101344746 A | 1/2009 |
| CN | 101359210 A | 2/2009 |
| CN | 101396910 A | 4/2009 |
| CN | 101433074 A | 5/2009 |
| CN | 101508200 A | 8/2009 |
| CN | 101519007 A | 9/2009 |
| CN | 101524916 A | 9/2009 |
| CN | 101544100 A | 9/2009 |
| CN | 101544101 A | 9/2009 |
| CN | 101592896 A | 12/2009 |
| CN | 101607468 A | 12/2009 |
| CN | 201410787 Y | 2/2010 |
| CN | 101820241 A | 9/2010 |
| CN | 101835611 A | 9/2010 |
| CN | 101835612 A | 9/2010 |
| CN | 101873982 A | 10/2010 |
| CN | 102229294 A | 11/2011 |
| CN | 102248776 A | 11/2011 |
| CN | 102300932 A | 12/2011 |
| CN | 102341249 A | 2/2012 |
| CN | 102529257 A | 7/2012 |
| CN | 102566343 A | 7/2012 |
| CN | 102648095 A | 8/2012 |
| CN | 102673209 A | 9/2012 |
| CN | 102925002 A | 2/2013 |
| CN | 103045008 A | 4/2013 |
| CN | 103309213 A | 9/2013 |
| CN | 103568483 A | 2/2014 |
| CN | 103627337 A | 3/2014 |
| CN | 104015415 A | 9/2014 |
| CN | 104220934 A | 12/2014 |
| CN | 104245340 A | 12/2014 |
| CN | 104271356 A | 1/2015 |
| CN | 104271686 A | 1/2015 |
| CN | 104284850 A | 1/2015 |
| CN | 104618642 A | 5/2015 |
| CN | 104975254 A | 10/2015 |
| CN | 105058999 A | 11/2015 |
| CN | 102555450 B | 3/2016 |
| CN | 105844621 A | 8/2016 |
| CN | 103991293 B | 1/2017 |
| CN | 106930144 A | 7/2017 |
| CN | 107111267 A | 8/2017 |
| CN | 107879147 A | 4/2018 |
| CN | 109111790 B | 7/2021 |
| CN | 108859411 B | 9/2023 |
| DE | 102010060999 A1 | 6/2012 |
| DE | 102012011783 A1 | 12/2013 |
| EP | 0457551 A2 | 11/1991 |
| EP | 0499857 A1 | 8/1992 |
| EP | 0606490 A1 | 7/1994 |
| EP | 0609076 A2 | 8/1994 |
| EP | 0613791 A2 | 9/1994 |
| EP | 0676300 A2 | 10/1995 |
| EP | 0530627 B1 | 3/1997 |
| EP | 0784244 A2 | 7/1997 |
| EP | 0835762 A1 | 4/1998 |
| EP | 0843236 A2 | 5/1998 |
| EP | 0854398 A2 | 7/1998 |
| EP | 0923007 A2 | 6/1999 |
| EP | 1013466 A2 | 6/2000 |
| EP | 1146090 A2 | 10/2001 |
| EP | 1158029 A1 | 11/2001 |
| EP | 0825029 B1 | 5/2002 |
| EP | 1247821 A2 | 10/2002 |
| EP | 1271263 A1 | 1/2003 |
| EP | 0867483 B1 | 6/2003 |
| EP | 0923007 B1 | 3/2004 |
| EP | 1454968 A1 | 9/2004 |
| EP | 1503326 A1 | 2/2005 |
| EP | 1777243 A1 | 4/2007 |
| EP | 2028238 A1 | 2/2009 |
| EP | 2042317 A1 | 4/2009 |
| EP | 2065194 A2 | 6/2009 |
| EP | 2228210 A1 | 9/2010 |
| EP | 2270070 A1 | 1/2011 |
| EP | 2042318 B1 | 2/2011 |
| EP | 2042325 B1 | 2/2012 |
| EP | 2634010 A1 | 9/2013 |
| EP | 2683556 A1 | 1/2014 |
| EP | 2075635 B1 | 10/2014 |
| EP | 3260486 A1 | 12/2017 |
| EP | 2823363 B1 | 10/2018 |
| GB | 748821 A | 5/1956 |
| GB | 1496016 A | 12/1977 |
| GB | 1520932 A | 8/1978 |

(56) References Cited

FOREIGN PATENT DOCUMENTS

| | | |
|---|---|---|
| GB | 1522175 A | 8/1978 |
| GB | 2321430 A | 7/1998 |
| JP | 48043941 | 12/1973 |
| JP | S5480137 A | 6/1979 |
| JP | S5578904 A | 6/1980 |
| JP | S57121446 U | 7/1982 |
| JP | S6076343 A | 4/1985 |
| JP | S60199692 A | 10/1985 |
| JP | S6223783 A | 1/1987 |
| JP | S63274572 A | 11/1988 |
| JP | H01178269 A | 7/1989 |
| JP | H03248170 A | 11/1991 |
| JP | H05147208 A | 6/1993 |
| JP | H05192871 A | 8/1993 |
| JP | H05249870 A | 9/1993 |
| JP | H05297737 A | 11/1993 |
| JP | H06954 A | 1/1994 |
| JP | H0659608 A | 3/1994 |
| JP | H06100807 A | 4/1994 |
| JP | H06171076 A | 6/1994 |
| JP | H06345284 A | 12/1994 |
| JP | H07112841 A | 5/1995 |
| JP | H07186453 A | 7/1995 |
| JP | H07238243 A | 9/1995 |
| JP | H0862999 A | 3/1996 |
| JP | H08112970 A | 5/1996 |
| JP | 2529651 B2 | 8/1996 |
| JP | H08272224 A | 10/1996 |
| JP | H09123432 A | 5/1997 |
| JP | H09157559 A | 6/1997 |
| JP | 109174646 A | 7/1997 |
| JP | H09227819 A | 9/1997 |
| JP | H09281851 A | 10/1997 |
| JP | H09300678 A | 11/1997 |
| JP | H09314867 A | 12/1997 |
| JP | H1016382 A | 1/1998 |
| JP | H10130597 A | 5/1998 |
| JP | H1142811 A | 2/1999 |
| JP | H1178269 A | 3/1999 |
| JP | H11503244 A | 3/1999 |
| JP | H11106081 A | 4/1999 |
| JP | H11138740 A | 5/1999 |
| JP | H11245383 A | 9/1999 |
| JP | 2000094660 A | 4/2000 |
| JP | 2000108320 A | 4/2000 |
| JP | 2000108334 A | 4/2000 |
| JP | 2000141710 A | 5/2000 |
| JP | 2000141883 A | 5/2000 |
| JP | 2000168062 A | 6/2000 |
| JP | 2000169772 A | 6/2000 |
| JP | 2000190468 A | 7/2000 |
| JP | 2000206801 A | 7/2000 |
| JP | 2000337464 A | 12/2000 |
| JP | 2000343025 A | 12/2000 |
| JP | 2001088430 A | 4/2001 |
| JP | 2001098201 A | 4/2001 |
| JP | 2001139865 A | 5/2001 |
| JP | 3177985 B2 | 6/2001 |
| JP | 2001164165 A | 6/2001 |
| JP | 2001199150 A | 7/2001 |
| JP | 2001206522 A | 7/2001 |
| JP | 2002020666 A | 1/2002 |
| JP | 2002049211 A | 2/2002 |
| JP | 2002504446 A | 2/2002 |
| JP | 2002069346 A | 3/2002 |
| JP | 2002103598 A | 4/2002 |
| JP | 2002113943 A | 4/2002 |
| JP | 2002169383 A | 6/2002 |
| JP | 2002229276 A | 8/2002 |
| JP | 2002234243 A | 8/2002 |
| JP | 2002278365 A | 9/2002 |
| JP | 2002304066 A | 10/2002 |
| JP | 2002321443 A | 11/2002 |
| JP | 2002326733 A | 11/2002 |
| JP | 2002371208 A | 12/2002 |
| JP | 2003057967 A | 2/2003 |
| JP | 2003076159 A | 3/2003 |
| JP | 2003080823 A | 3/2003 |
| JP | 2003094795 A | 4/2003 |
| JP | 2003107819 A | 4/2003 |
| JP | 2003114558 A | 4/2003 |
| JP | 2003145914 A | 5/2003 |
| JP | 2003183557 A | 7/2003 |
| JP | 2003200106 A | 7/2003 |
| JP | 2003211770 A | 7/2003 |
| JP | 2003219271 A | 7/2003 |
| JP | 2003227549 A | 8/2003 |
| JP | 2003246135 A | 9/2003 |
| JP | 2003246484 A | 9/2003 |
| JP | 2003267580 A | 9/2003 |
| JP | 2003292855 A | 10/2003 |
| JP | 2003313466 A | 11/2003 |
| JP | 2004009632 A | 1/2004 |
| JP | 2004011263 A | 1/2004 |
| JP | 2004019022 A | 1/2004 |
| JP | 2004025708 A | 1/2004 |
| JP | 2004034441 A | 2/2004 |
| JP | 2004077669 A | 3/2004 |
| JP | 2004114377 A | 4/2004 |
| JP | 2004114675 A | 4/2004 |
| JP | 2004148687 A | 5/2004 |
| JP | 2004167902 A | 6/2004 |
| JP | 2004231711 A | 8/2004 |
| JP | 2004524190 A | 8/2004 |
| JP | 2004261975 A | 9/2004 |
| JP | 2004325782 A | 11/2004 |
| JP | 2004340983 A | 12/2004 |
| JP | 2005014255 A | 1/2005 |
| JP | 2005014256 A | 1/2005 |
| JP | 2005017472 A | 1/2005 |
| JP | 2005114769 A | 4/2005 |
| JP | 2005215247 A | 8/2005 |
| JP | 2005224737 A | 8/2005 |
| JP | 3712547 B2 | 11/2005 |
| JP | 2005307184 A | 11/2005 |
| JP | 2005319593 A | 11/2005 |
| JP | 2006001688 A | 1/2006 |
| JP | 2006023403 A | 1/2006 |
| JP | 2006095870 A | 4/2006 |
| JP | 2006102975 A | 4/2006 |
| JP | 2006137127 A | 6/2006 |
| JP | 2006143778 A | 6/2006 |
| JP | 2006152133 A | 6/2006 |
| JP | 2006224583 A | 8/2006 |
| JP | 2006231666 A | 9/2006 |
| JP | 2006234212 A | 9/2006 |
| JP | 2006243212 A | 9/2006 |
| JP | 2006263984 A | 10/2006 |
| JP | 2006347081 A | 12/2006 |
| JP | 2006347085 A | 12/2006 |
| JP | 2007025246 A | 2/2007 |
| JP | 2007041530 A | 2/2007 |
| JP | 2007069584 A | 3/2007 |
| JP | 2007079159 A | 3/2007 |
| JP | 2007083445 A | 4/2007 |
| JP | 2007152834 A | 6/2007 |
| JP | 2007190745 A | 8/2007 |
| JP | 2007216673 A | 8/2007 |
| JP | 2007253347 A | 10/2007 |
| JP | 2007334125 A | 12/2007 |
| JP | 2008006816 A | 1/2008 |
| JP | 2008018716 A | 1/2008 |
| JP | 2008019286 A | 1/2008 |
| JP | 2008036968 A | 2/2008 |
| JP | 2008082820 A | 4/2008 |
| JP | 2008137146 A | 6/2008 |
| JP | 2008137239 A | 6/2008 |
| JP | 2008139877 A | 6/2008 |
| JP | 2008142962 A | 6/2008 |
| JP | 2008183744 A | 8/2008 |
| JP | 2008194997 A | 8/2008 |
| JP | 2008532794 A | 8/2008 |
| JP | 2008201564 A | 9/2008 |
| JP | 2008238674 A | 10/2008 |

(56) References Cited

FOREIGN PATENT DOCUMENTS

| | | |
|---|---|---|
| JP | 2008246787 A | 10/2008 |
| JP | 2008246990 A | 10/2008 |
| JP | 2008254203 A | 10/2008 |
| JP | 2008255135 A | 10/2008 |
| JP | 2009040892 A | 2/2009 |
| JP | 2009045794 A | 3/2009 |
| JP | 2009045851 A | 3/2009 |
| JP | 2009045885 A | 3/2009 |
| JP | 2009083314 A | 4/2009 |
| JP | 2009083315 A | 4/2009 |
| JP | 2009083317 A | 4/2009 |
| JP | 2009083325 A | 4/2009 |
| JP | 2009096175 A | 5/2009 |
| JP | 2009148908 A | 7/2009 |
| JP | 2009154330 A | 7/2009 |
| JP | 2009154377 A | 7/2009 |
| JP | 2009190375 A | 8/2009 |
| JP | 2009202355 A | 9/2009 |
| JP | 2009214318 A | 9/2009 |
| JP | 2009214439 A | 9/2009 |
| JP | 2009532240 A | 9/2009 |
| JP | 2009226805 A | 10/2009 |
| JP | 2009226852 A | 10/2009 |
| JP | 2009226886 A | 10/2009 |
| JP | 2009226890 A | 10/2009 |
| JP | 2009227909 A | 10/2009 |
| JP | 2009233977 A | 10/2009 |
| JP | 2009234219 A | 10/2009 |
| JP | 2009240925 A | 10/2009 |
| JP | 2009258587 A | 11/2009 |
| JP | 2009271422 A | 11/2009 |
| JP | 2009279808 A | 12/2009 |
| JP | 2010005815 A | 1/2010 |
| JP | 2010030300 A | 2/2010 |
| JP | 2010054855 A | 3/2010 |
| JP | 2010076214 A | 4/2010 |
| JP | 2010510357 A | 4/2010 |
| JP | 2010105365 A | 5/2010 |
| JP | 2010173201 A | 8/2010 |
| JP | 2010184376 A | 8/2010 |
| JP | 2010214885 A | 9/2010 |
| JP | 4562388 B2 | 10/2010 |
| JP | 2010228192 A | 10/2010 |
| JP | 2010228392 A | 10/2010 |
| JP | 2010234599 A | 10/2010 |
| JP | 2010234681 A | 10/2010 |
| JP | 2010240897 A | 10/2010 |
| JP | 2010241073 A | 10/2010 |
| JP | 2010247381 A | 11/2010 |
| JP | 2010247528 A | 11/2010 |
| JP | 2010258193 A | 11/2010 |
| JP | 2010260204 A | 11/2010 |
| JP | 2010260287 A | 11/2010 |
| JP | 2010260302 A | 11/2010 |
| JP | 2010286570 A | 12/2010 |
| JP | 2011002532 A | 1/2011 |
| JP | 2011025431 A | 2/2011 |
| JP | 2011031619 A | 2/2011 |
| JP | 2011037070 A | 2/2011 |
| JP | 2011064850 A | 3/2011 |
| JP | 2011067956 A | 4/2011 |
| JP | 2011126031 A | 6/2011 |
| JP | 2011133884 A | 7/2011 |
| JP | 2011144271 A | 7/2011 |
| JP | 2011523601 A | 8/2011 |
| JP | 2011168024 A | 9/2011 |
| JP | 2011173325 A | 9/2011 |
| JP | 2011173326 A | 9/2011 |
| JP | 2011186346 A | 9/2011 |
| JP | 2011189627 A | 9/2011 |
| JP | 2011201951 A | 10/2011 |
| JP | 2011224032 A | 11/2011 |
| JP | 2012042943 A | 3/2012 |
| JP | 2012081770 A | 4/2012 |
| JP | 2012086499 A | 5/2012 |
| JP | 2012111194 A | 6/2012 |
| JP | 2012126123 A | 7/2012 |
| JP | 2012139905 A | 7/2012 |
| JP | 2012196787 A | 10/2012 |
| JP | 2012201419 A | 10/2012 |
| JP | 2013001081 A | 1/2013 |
| JP | 2013060299 A | 4/2013 |
| JP | 2013091313 A | 5/2013 |
| JP | 2013103474 A | 5/2013 |
| JP | 2013104044 A | 5/2013 |
| JP | 2013121671 A | 6/2013 |
| JP | 2013129158 A | 7/2013 |
| JP | 2014008609 A | 1/2014 |
| JP | 2014047005 A | 3/2014 |
| JP | 2014073675 A | 4/2014 |
| JP | 2014094827 A | 5/2014 |
| JP | 2014131843 A | 7/2014 |
| JP | 2014158999 A | 9/2014 |
| JP | 2015021037 A | 2/2015 |
| JP | 2015517928 A | 6/2015 |
| JP | 2015202616 A | 11/2015 |
| JP | 2016000477 A | 1/2016 |
| JP | 2016074206 A | 5/2016 |
| JP | 2016093999 A | 5/2016 |
| JP | 2016168543 A | 9/2016 |
| JP | 2016179678 A | 10/2016 |
| JP | 2016185688 A | 10/2016 |
| JP | 2016539830 A | 12/2016 |
| JP | 2017093178 A | 5/2017 |
| JP | 2018017429 A | 2/2018 |
| JP | 2018053035 A | 4/2018 |
| JP | 2018058815 A | 4/2018 |
| JP | 2018172585 A | 11/2018 |
| JP | 2019517907 A | 6/2019 |
| JP | 2019525966 A | 9/2019 |
| JP | 2020014350 A | 1/2020 |
| KR | 101728409 B1 | 4/2017 |
| RU | 2180675 C2 | 3/2002 |
| RU | 2282643 C1 | 8/2006 |
| WO | WO-8600327 A1 | 1/1986 |
| WO | WO-9307000 A1 | 4/1993 |
| WO | WO-9401283 A1 | 1/1994 |
| WO | WO-9604339 A1 | 2/1996 |
| WO | WO-9631809 A1 | 10/1996 |
| WO | WO-9707991 A1 | 3/1997 |
| WO | WO-9736210 A1 | 10/1997 |
| WO | WO-9821251 A1 | 5/1998 |
| WO | WO-9855901 A1 | 12/1998 |
| WO | WO-9912633 A1 | 3/1999 |
| WO | WO-9942509 A1 | 8/1999 |
| WO | WO-9943502 A2 | 9/1999 |
| WO | WO-0064685 A1 | 11/2000 |
| WO | WO-0154902 A1 | 8/2001 |
| WO | WO-0170512 A1 | 9/2001 |
| WO | WO-02068191 A1 | 9/2002 |
| WO | WO-02078868 A2 | 10/2002 |
| WO | WO-02094912 A1 | 11/2002 |
| WO | WO-2004113082 A1 | 12/2004 |
| WO | WO-2004113450 A1 | 12/2004 |
| WO | WO-2006051733 A1 | 5/2006 |
| WO | WO-2006069205 A1 | 6/2006 |
| WO | WO-2006073696 A1 | 7/2006 |
| WO | WO-2006091957 A2 | 8/2006 |
| WO | WO-2007009871 A2 | 1/2007 |
| WO | WO-2007145378 A1 | 12/2007 |
| WO | WO-2008078841 A1 | 7/2008 |
| WO | WO-2009025809 A1 | 2/2009 |
| WO | WO-2009134273 A1 | 11/2009 |
| WO | WO-2010042784 A3 | 7/2010 |
| WO | WO-2010073916 A1 | 7/2010 |
| WO | WO-2011142404 A1 | 11/2011 |
| WO | WO-2012014825 A1 | 2/2012 |
| WO | WO-2012148421 A1 | 11/2012 |
| WO | WO-2013060377 A1 | 5/2013 |
| WO | WO-2013087249 A1 | 6/2013 |
| WO | WO-2013132339 A1 | 9/2013 |
| WO | WO-2013132340 A1 | 9/2013 |
| WO | WO-2013132343 A1 | 9/2013 |
| WO | WO-2013132345 A1 | 9/2013 |

(56) References Cited

FOREIGN PATENT DOCUMENTS

| WO | WO-2013132356 A1 | 9/2013 |
|---|---|---|
| WO | WO-2013132418 A2 | 9/2013 |
| WO | WO-2013132419 A1 | 9/2013 |
| WO | WO-2013132420 A1 | 9/2013 |
| WO | WO-2013132424 A1 | 9/2013 |
| WO | WO-2013132432 A1 | 9/2013 |
| WO | WO-2013132438 A2 | 9/2013 |
| WO | WO-2013132439 A1 | 9/2013 |
| WO | WO-2013136220 A1 | 9/2013 |
| WO | 2015026864 A1 | 2/2015 |
| WO | 2015036865 A1 | 3/2015 |
| WO | WO-2015036864 A1 | 3/2015 |
| WO | WO-2015036906 A1 | 3/2015 |
| WO | WO-2015036960 A1 | 3/2015 |
| WO | WO-2016166690 A1 | 10/2016 |
| WO | 2017208152 A1 | 12/2017 |
| WO | WO-2017208155 A1 | 12/2017 |
| WO | WO-2017208246 A1 | 12/2017 |
| WO | WO-2018100541 A1 | 6/2018 |
| WO | 2019012456 A1 | 1/2019 |
| WO | 2019111223 A1 | 6/2019 |
| WO | 2020003088 A1 | 1/2020 |
| WO | 2020136517 A1 | 7/2020 |
| WO | 2020141465 A1 | 7/2020 |
| WO | 2021137063 A1 | 7/2021 |

OTHER PUBLICATIONS

CN101820241A Machine Translation (by EPO and Google)—published Sep. 1, 2010; Canon KK.
CN1305895A Machine Translation (by EPO and Google)—published Aug. 1, 2001; IMAJE SA [FR].
CN1543404A Machine Translation (by EPO and Google)—published Nov. 3, 2004; 3M Innovative Properties Co [US].
Co-pending U.S. Appl. No. 17/522,383, inventor Landa, filed on Nov. 9, 2021.
Co-pending U.S. Appl. No. 17/530,507, filed Nov. 19, 2021.
Co-pending U.S. Appl. No. 17/551,219, filed Dec. 15, 2021.
Co-pending U.S. Appl. No. 17/583,372, filed Jan. 25, 2022.
Co-pending U.S. Appl. No. 17/676,398, filed Mar. 21, 2022.
Co-pending U.S. Appl. No. 17/694,702, filed Mar. 15, 2022.
JP2003076159A Machine Translation (by EPO and Google)—published Mar. 14, 2003, Ricoh KK.
JP2008082820A Machine Translation (by EPO and Google)—published Apr. 10, 2008; Ricoh KK.
JP2009240925A Machine Translation (by EPO and Google)—published Oct. 22, 2009; Fujifilm Corp.
CN101096455A Machine Translation (EPO, PlatPat and Google) published on Jan. 2, 2008 Fujifilm Corp.
CN101248146A Machine Translation (EPO, PlatPat and Google) published on Aug. 20, 2008 Ricoh KK.
CN101433074A Machine Translation (by EPO and Google)—published May 13, 2009; Kyocera Mita Corp [JP].
CN102341249A Machine Translation (EPO, PlatPat and Google) published on Feb. 1, 2012 Eastman Kodak Co.
CN102529257A Machine Translation (by EPO and Google)—published Jul. 4, 2012; Nippon Synthetic Chem ND.
CN102566343A Machine Translation (by EPO and Google)—published Jul. 11, 2012; Canon KK.
CN102673209A Machine Translation (by EPO and Google)—published Sep. 19, 2012; Wistron Corp.
CN104015415A Machine Translation (by EPO and Google)—published Sep. 3, 2014; Avery Dennison Corp.
CN105844621A Machine Translation (by EPO and Google)—published Aug. 10, 2016; Fuyang Feiyang Rinting Co Ltd.
CN107879147A Machine Translation (by EPO and Google)—published Apr. 6, 2018; Brother Ind LTD.
CN1703326A Machine Translation (by EPO and Google)—published Nov. 30, 2005; Nissha Printing [JP].
CN1961015A Machine Translation (EPO, PlatPat and Google) published on May. 9, 2007 Dainippon Ink & Chemicals.
Co-pending U.S. Appl. No. 17/788,335, inventors Benzion; Landa et al., filed on Jun. 23, 2022.
Co-pending U.S. Appl. No. 17/963,225, inventors Burkatovsky; Vitaly et al., filed on Oct. 11, 2022.
IP.com search (Year: 2022).
JP2000094660A Machine Translation (by EPO and Google)—published Apr. 4, 2000; Brother Ind Ltd.
JP2000141883A Machine Translation (EPO, PlatPat and Google) published on May 23, 2000 Ricoh KK.
JP2000190468A Machine Translation (EPO, PlatPat and Google) published on Jul. 11, 2000 Brother Ind Ltd.
JP2000337464A Machine Translation (by EPO and Google)—published Dec. 5, 2000; Fuji Xerox Co Ltd.
JP2003107819A Machine Translation (by EPO and Google)—published Apr. 9, 2003; Kanegafuchi Chemical Ind.
JP2004117118A Machine Translation (by EPO and Google)—published Apr. 15, 2004; Nidec Copal Corp.
JP2005224737A Machine Translation (by EPO and Google)—published Aug. 25, 2005; Mitsubishi Paper Mills Ltd.
JP2006256087 Machine Translation (by EPO and Google)—published Sep. 28, 2006; Ricoh Printing Sys Ltd.
JP2009154377A Machine Translation (by EPO and Google)—published Jul. 16, 2009; Fujifilm Corp.
JP2009227909A Machine Translation (EPO, PlatPat and Google) published on Oct. 8, 2009 Fujifilm Corp.
JP2009258587A Machine Translation (by EPO and Google)—published Nov. 5, 2009; Fuji Xerox Co Ltd.
JP2009271422A Machine Translation (by EPO and Google)—published Nov. 19, 2009; Ricoh KK.
JP2009279808A Machine Translation (by EPO and Google)—published Dec. 3, 2009; Fuji Xerox Co Ltd.
JP2011168024A Machine Translation (EPO, PlatPat and Google) published on Sep. 1, 2011 Ricoh Co Ltd.
JP2013104044A Machine Translation (by EPO and Google)—published May 30, 2013; Three M Innovative Properties.
JP2014008609A Machine Translation (EPO, PlatPat and Google) published on Jan. 20, 2014 Seiko Epson Corp.
JP2014073675A Machine Translation (EPO and Google) published on Apr. 24, 2014 Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.
JP2016179678A Machine Translation (EPO, PlatPat and Google) published on Oct. 13, 2016 Xerox Corp.
JP2017093178A Machine Translation (EPO and Google) published on May 25, 2017 Samsung Electronics Co Ltd.
JP2018017429A Machine Translation (by EPO and Google)—published Feb. 1, 2018; Rinnai KK.
JP2020014350A Machine Translation (by EPO and Google)—published Jan. 23, 2020; Toshiba Mitsubishi Elec Ind.
JP48043941 Machine Translation (by EPO and Google)—published Dec. 21, 1973.
JPH10130597A Machine Translation (by EPO and Google)—published May 19, 1998; Sekisui Chemical Co Ltd.
JPS63274572A Machine Translation (by EPO and Google)—published Nov. 11, 1988; Canon KK.
CN106930144A Machine Translation (by EPO and Google)—published Jul. 7, 2017; Suzhou Jigu New Mat Co Ltd.
CN108859411B Machine Translation (by EPO and Google)—published Sep. 19, 2023; Anhui Yuelong Printing Technology Co., Ltd.
CN109111790B Machine Translation (by EPO and Google)—published Jul. 23, 2021; Anhui Jintian Color Printing and Packaging Co., Ltd.
Co-pending U.S. Appl. No. 18/625,268, filed Mar. 4, 2024.
JP2014158999A Machine Translation (by EPO and Google)—published Sep. 4, 2014; Ricoh Co Ltd.
JP2016000477A Machine Translation (by EPO and Google)—published Jan. 7, 2016; Ricoh Co Ltd.

(56) References Cited

OTHER PUBLICATIONS

JP2016168543A Machine Translation (by EPO and Google)—published Sep. 23, 2016; Ricoh Co Ltd.
JP2018172585A Machine Translation (by EPO and Google)—published Nov. 8, 2018; Pilot Corp.
JPH01178269A Machine Translation (by EPO and Google)—published Jul. 14, 1989; Toshiba Corp et al.
JPH09227819A Machine Translation (by EPO and Google)—published Sep. 2, 1997; Asahi Glass Co Ltd.
JPS5480137A Machine Translation (by EPO and Google)—published Jun. 26, 1979; Matsushita Electric Ind Co Ltd.
CN104975254A Machine Translation (by EPO and Google)—published Oct. 14, 2015; Shanghai Junshan Surface Technology Engineering Co Ltd.
CN201082827Y Machine Translation (by EPO and Google)—published Jul. 9, 2008; Baoshan Iron & STEEL.
DE102012011783A1 Machine Translation (by EPO, PlatPat and Google)—published Dec. 19, 2013; Heidelberger Druckmasch Ag.
JP2002113943A Machine Translation (by EPO and Google)—published Apr. 16, 2002; Konishiroku Photo Ind.
JP2002321443A Machine Translation (by EPO and Google)—published Nov. 5, 2002; Konishiroku Photo Ind.
JP2003080823A Machine Translation (by EPO and Google)—published Mar. 19, 2003; Mitsubishi Paper Mills Ltd.
JP2003200106A Machine Translation (by EPO and Google)—published Jul. 15, 2003; Fuji Photo Film Co Ltd.
JP2003227549A Machine Translation (by EPO, PlatPat and Google)—published Aug. 15, 2003; Xerox Corp.
JP2007152834A Machine Translation (by EPO and Google)—published Jun. 21, 2007; Oji Paper Co.
JP2009083315A Machine Translation (by EPO and Google)—published Apr. 23, 2009; Fujifilm Corp.
JP2010076214A Machine Translation (EPO, PlatPat and Google) published on Apr. 8, 2010 Fuji Xerox Co Ltd.
JP2012081770A Machine Translation (EPO, PlatPat and Google) published on Apr. 26, 2012 Komori Printing Mach.
JP2015021037A Machine Translation (by EPO and Google)—published Feb. 2, 2015; Gen Co Ltd.
JP2018053035A Machine Translation (by EPO and Google)—published Apr. 5, 2018; Seiko Epson Corp.
JP2018058815A Machine Translation (by EPO and Google)—published Apr. 12, 2018; Spartan Chemical Co Inc.
JP2019517907A Machine Translation (by EPO and Google)—published Jun. 27, 2019; Cebu Societe Anonymous.
JP3712547B2 Machine Translation (EPO, PlatPat and Google) published on Nov. 2, 2005 Sasaya Shunji.
JPH05249870A Machine Translation (by EPO, PlatPat and Google)—published Sep. 28, 1993; Matsushita Electric Ind Co Ltd.
JPH0659608A Machine Translation (by EPO and Google)—published Mar. 4, 1994; Xerox Corp.
JPH08272224A Machine Translation (by EPO, PlatPat and Google)—published Oct. 18, 1996; Ricoh Kk.
JPH1016382A Machine Translation (by EPO and Google)—published Jan. 20, 1998; Canon Kk.
JPH1178269A Machine Translation (by EPO and Google)—published Mar. 23, 1999; Daicel Chem.
Co-pending U.S. Appl. No. 18/729,096, filed Jul. 15, 2024.
KR101728409B1 Machine Translation (by EPO and Google)—published Apr. 19, 2017; (CO)KJ IND [KR].
"Amino Functional Silicone Polymers", in Xiameter.COPYRGT. 2009 Dow Corning Corporation.
BASF , "JONCRYL 537", Datasheet , Retrieved from the internet : Mar. 23, 2007 p. 1.
Clariant., "Ultrafine Pigment Dispersion for Design and Creative Materials: Hostafine Pigment Preparation" Jun. 19, 2008. Retrieved from the Internet: [URL: http://www.clariant.com/C125720D002B963C/4352D0BC052E90CEC1257479002707D9/$FILE/DP6208E_0608_FL_Hostafinefordesignandcreativematerials.pdf].

CN101073937A Machine Translation (by EPO and Google)—published Nov. 21, 2007; Werner Kaman Maschinen GMBH & [DE].
CN101177057 Machine Translation (by EPO and Google)—published May 14, 2008—Hangzhou Yuanyang Industry Co.
CN101249768A Machine Translation (by EPO and Google)—published Aug. 27, 2008; Shantou Xinxie Special Paper T [CN].
CN101344746A Machine Translation (by EPO and Google)—published Jan. 14, 2009; Ricoh KK [JP].
CN101359210A Machine Translation (by EPO and Google)—published Feb. 4, 2009; Canon KK [JP].
CN101524916A Machine Translation (by EPO and Google)—published Sep. 9, 2009; Fuji Xerox Co Ltd.
CN101544100A Machine Translation (by EPO and Google)—published Sep. 30, 2009; Fuji Xerox Co Ltd.
CN101873982A Machine Translation (by EPO and Google)—published Oct. 27, 2010; Habasit AG, Delair et al.
CN102229294A Machine Translation (by EPO and Google)—published Nov. 2, 2011; Guangzhou Changcheng Ceramics Co Ltd.
CN102300932A Machine Translation (by EPO and Google)—published Dec. 28, 2011; Yoshida Hiroaki et al.
CN102648095A Machine Translation (by EPO and Google)—published Aug. 22, 2012; Mars Inc.
CN102925002 Machine Translation (by EPO and Google)—published Feb. 13, 2013; Jiangnan University, Fu et al.
CN103045008A Machine Translation (by EPO and Google)—published Apr. 17, 2013; Fuji Xerox Co Ltd.
CN103568483A Machine Translation (by EPO and Google)—published Feb. 12, 2014; Anhui Printing Mechanical & Electrical Co Ltd.
CN103627337A Machine Translation (by EPO and Google)—published Mar. 12, 2014; Suzhou Banlid New Material Co Ltd.
CN103991293A Machine Translation (by EPO and Google)—published Aug. 20, 2014; Miyakoshi Printing Machinery Co., Ltd, Junichi et al.
CN103991293B Machine Translation (by EPO and Google)—issued on Jan. 4, 2017; Miyakoshi Printing Machinery Co., Ltd, Junichi et al.
CN104618642 Machine Translation (by EPO and Google); published on May 13, 2015, Yulong Comp Comm Tech Shenzhen.
CN105058999A Machine Translation (by EPO and Google)—published Nov. 18, 2015; Zhuoli Imaging Technology Co Ltd.
CN107111267A Machine Translation (by EPO and Google)—published Aug. 29, 2017; Hewlett Packard Indigo BV.
CN1121033A Machine Translation (by EPO and Google)—published Apr. 24, 1996; Kuehnle Manfred R [US].
CN1212229A Machine Translation (by EPO and Google)—published Mar. 31, 1999; Honta Industry Corp [JP].
CN1493514A Machine Translation (by EPO and Google)—published May 5, 2004; GD SPA, Boderi et al.
CN1555422A Machine Translation (by EPO and Google)—published Dec. 15, 2004; Noranda Inc.
CN1680506A Machine Translation (by EPO and Google)—published Oct. 12, 2005; Shinetsu Chemical Co [JP].
CN1809460A Machine Translation (by EPO and Google)—published Jul. 26, 2006; Canon KK.
CN201410787Y Machine Translation (by EPO and Google)—published Feb. 24, 2010; Zhejiang Chanx Wood Co Ltd.
Co-pending U.S. Appl. No. 16/590,397, filed Oct. 2, 2019.
Co-pending U.S. Appl. No. 17/155,121, filed Jan. 22, 2021.
Co-pending U.S. Appl. No. 17/279,539, inventors Helena; Chechik et al., filed on Mar. 24, 2021.
Co-pending U.S. Appl. No. 17/312,394, inventors Benzion; Landa et al., filed on Jun. 10, 2021.
Co-pending U.S. Appl. No. 17/382,285, filed Jul. 21, 2021.
Co-pending U.S. Appl. No. 17/382,334, inventor Landa; Benzion, filed on Jul. 21, 2021.
Co-pending U.S. Appl. No. 17/414,087, inventors Benzion; Landa et al., filed on Jun. 15, 2021.
Co-pending U.S. Appl. No. 17/507,758, filed Oct. 21, 2021.
DE102010060999 Machine Translation (by EPO and Google)—published Jun. 6, 2012; Wolf, Roland, Dr.-Ing.

(56) References Cited

OTHER PUBLICATIONS

Epomin Polyment, product information from Nippon Shokubai, dated Feb. 28, 2014.
Flexicon., "Bulk Handling Equipment and Systems: Carbon Black," 2018, 2 pages.
Furia, T.E., "CRC Handbook of Food Additives, Second Edition, vol. 1" CRC Press LLC, 1972, p. 434.
Handbook of Print Media, 2001, Springer Verlag, Berlin/Heidelberg/New York, pp. 127-136,748—With English Translation.
IP.com Search, 2018, 2 pages.
IP.com Search, 2019, 1 page.
IP.com search (Year: 2021).
JP2000108320 Machine Translation (by PlatPat English machine translation)—published Apr. 18, 2000 Brother Ind. Ltd.
JP2000108334A Machine Translation (by EPO and Google)—published Apr. 18, 2000; Brother Ind Ltd.
JP2000141710A Machine Translation (by EPO and Google)—published May 23, 2000; Brother Ind Ltd.
JP2000168062A Machine Translation (by EPO and Google)—published Jun. 20, 2000; Brother Ind Ltd.
JP2000169772 Machine Translation (by EPO and Google)—published Jun. 20, 2000; Tokyo Ink MFG Co Ltd.
JP2000206801 Machine Translation (by PlatPat English machine translation); published on Jul. 28, 2000, Canon KK, Kobayashi et al.
JP2000343025A Machine Translation (by EPO and Google)—published Dec. 12, 2000; Kyocera Corp.
JP2001088430A Machine Translation (by EPO and Google)—published Apr. 3, 2001; Kimoto KK.
JP2001098201A Machine Translation (by EPO and Google)—published Apr. 10, 2001; Eastman Kodak Co.
JP2001139865A Machine Translation (by EPO and Google)—published May 22, 2001; Sharp KK.
JP2001164165A Machine Translation (by EPO and Google)—published Jun. 19, 2001; Dainippon Ink & Chemicals.
JP2001199150A Machine Translation (by EPO and Google)—published Jul. 24, 2001; Canon KK.
JP2001206522 Machine Translation (by EPO, PlatPat and Google)—published Jul. 31, 2001; Nitto Denko Corp, Kato et al.
JP2002049211A Machine Translation (by EPO and Google)—published Feb. 15, 2002; PFU Ltd.
JP2002069346A Machine Translation (by EPO and Google)—published Mar. 8, 2002; Dainippon Ink & Chemicals.
JP2002103598A Machine Translation (by EPO and Google)—published Apr. 9, 2002; Olympus Optical Co.
JP2002169383 Machine Translation (by EPO, PlatPat and Google)—published Jun. 14, 2002 Ricoh KK.
JP2002234243 Machine Translation (by EPO and Google)—published Aug. 20, 2002; Hitachi Koki Co Ltd.
JP2002278365 Machine Translation (by PlatPat English machine translation)—published Sep. 27, 2002 Katsuaki, Ricoh KK.
JP2002304066A Machine Translation (by EPO and Google)—published Oct. 18, 2002; PFU Ltd.
JP2002326733 Machine Translation (by EPO, PlatPat and Google)—published Nov. 12, 2002; Kyocera Mita Corp.
JP2002371208 Machine Translation (by EPO and Google)—published Dec. 26, 2002; Canon Inc.
JP2003094795A Machine Translation (by EPO and Google)—published Apr. 3, 2003; Ricoh KK.
JP2003114558 Machine Translation (by EPO, PlatPat and Google)—published Apr. 18, 2003 Mitsubishi Chem Corp, Yuka Denshi Co Ltd, et al.
JP2003145914A Machine Translation (by EPO and Google)—published May 21, 2003; Konishiroku Photo Ind.
JP2003211770 Machine Translation (by EPO and Google)—published Jul. 29, 2003 Hitachi Printing Solutions.
JP2003219271 Machine Translation (by EPO and Google); published on Jul. 31, 2003, Japan Broadcasting.
JP2003246135 Machine Translation (by PlatPat English machine translation)—published Sep. 2, 2003 Ricoh KK, Morohoshi et al.
JP2003246484 Machine Translation (English machine translation)—published Sep. 2, 2003 Kyocera Corp.
JP2003292855A Machine Translation (by EPO and Google)—published Oct. 15, 2003; Konishiroku Photo Ind.
JP2003313466A Machine Translation (by EPO and Google)—published Nov. 6, 2003; Ricoh KK.
JP2004009632A Machine Translation (by EPO and Google)—published Jan. 15, 2004; Konica Minolta Holdings Inc.
JP2004011263A Machine Translation (by EPO and Google)—published Jan. 15, 2004; Sumitomo Denko Steel Wire KK.
JP2004019022 Machine Translation (by EPO and Google)—published Jan. 22, 2004; Yamano et al.
JP2004025708A Machine Translation (by EPO and Google)—published Jan. 29, 2004; Konica Minolta Holdings Inc.
JP2004034441A Machine Translation (by EPO and Google)—published Feb. 5, 2004; Konica Minolta Holdings Inc.
JP2004077669 Machine Translation (by PlatPat English machine translation)—published Mar. 11, 2004 Fuji Xerox Co Ltd.
JP2004114377(A) Machine Translation (by EPO and Google)—published Apr. 15, 2004; Konica Minolta Holdings Inc, et al.
JP2004114675 Machine Translation (by EPO and Google)—published Apr. 15, 2004; Canon Inc.
JP2004148687A Machine Translation (by EPO and Google)—published May 27, 2014; Mitsubishi Heavy Ind Ltd.
JP2004167902A Machine Translation (by EPO and Google)—published Jun. 17, 2004; Nippon New Chrome KK.
JP2004231711 Machine Translation (by EPO and Google)—published Aug. 19, 2004; Seiko Epson Corp.
JP2004261975 Machine Translation (by EPO, PlatPat and Google); published on Sep. 24, 2004, Seiko Epson Corp, Kataoka et al.
JP2004325782A Machine Translation (by EPO and Google)—published Nov. 18, 2004; Canon KK.
JP2004340983A Machine Translation (by EPO and Google)—published Dec. 2, 2004; Ricoh KK.
JP2004524190A Machine Translation (by EPO and Google)—published Aug. 12, 2004; Avery Dennison Corp.
JP2005014255 Machine Translation (by EPO and Google)—published Jan. 20, 2005; Canon Inc.
JP2005014256 Machine Translation (by EPO and Google)—published Jan. 20, 2005; Canon Inc.
JP2005114769 Machine Translation (by PlatPat English machine translation)—published Apr. 28, 2005 Ricoh KK.
JP2005215247A Machine Translation (by EPO and Google)—published Aug. 11, 2005; Toshiba Corp.
JP2005319593 Machine Translation (by EPO and Google)—published Nov. 17, 2005, Jujo Paper Co Ltd.
JP2006001688 Machine Translation (by PlatPat English machine translation)—published Jan. 5, 2006 Ricoh KK.
JP2006023403A Machine Translation (by EPO and Google)—published Jan. 26, 2006; Ricoh KK.
JP2006095870A Machine Translation (by EPO and Google)—published Apr. 13, 2006; Fuji Photo Film Co Ltd.
JP2006102975 Machine Translation (by EPO and Google)—published Apr. 20, 2006; Fuji Photo Film Co Ltd.
JP2006137127 Machine Translation (by EPO and Google)—published Jun. 1, 2006; Konica Minolta Med & Graphic.
JP2006143778 Machine Translation (by EPO, PlatPat and Google)—published Jun. 8, 2006 Sun Bijutsu Insatsu KK et al.
JP2006152133 Machine Translation (by EPO, PlatPat and Google)—published Jun. 15, 2006 Seiko Epson Corp.
JP2006224583A Machine Translation (by EPO and Google)—published Aug. 31, 2006; Konica Minolta Holdings Inc.
JP2006231666A Machine Translation (by EPO and Google)—published Sep. 7, 2006; Seiko Epson Corp.
JP2006234212A Machine Translation (by EPO and Google)—published Sep. 7, 2006; Matsushita Electric Ind Co Ltd.
JP2006243212 Machine Translation (by PlatPat English machine translation)—published Sep. 14, 2006 Fuji Xerox Co Ltd.
JP2006263984 Machine Translation (by EPO, PlatPat and Google)—published Oct. 5, 2006 Fuji Photo Film Co Ltd.
JP2006347081 Machine Translation (by EPO and Google)—published Dec. 28, 2006; Fuji Xerox Co Ltd.

(56) References Cited

OTHER PUBLICATIONS

JP2006347085 Machine Translation (by EPO and Google)—published Dec. 28, 2006 Fuji Xerox Co Ltd.
JP2007025246A Machine Translation (by EPO and Google)—published Feb. 1, 2007; Seiko Epson Corp.
JP2007041530A Machine Translation (by EPO and Google)—published Feb. 15, 2007; Fuji Xerox Co Ltd.
JP2007069584 Machine Translation (by EPO and Google)—published Mar. 22, 2007 Fujifilm.
JP2007079159A Machine Translation (by EPO and Google)—published Mar. 29, 2007; Ricoh KK.
JP2007083445A Machine Translation (by EPO and Google)—published Apr. 5, 2007; Fujifilm Corp.
JP2007216673 Machine Translation (by EPO and Google)—published Aug. 30, 2007 Brother Ind.
JP2007253347A Machine Translation (by EPO and Google)—published Oct. 4, 2007; Ricoh Kk, Matsuo et al.
JP2008006816 Machine Translation (by EPO and Google)—published Jan. 17, 2008; Fujifilm Corp.
JP2008018716 Machine Translation (by EPO and Google)—published Jan. 31, 2008; Canon Inc.
JP2008137146A Machine Translation (by EPO and Google)—published Jun. 19, 2008; CBG ACCIAI SRL.
JP2008137239A Machine Translation (by EPO and Google); published on Jun. 19, 2008, Kyocera Mita Corp.
JP2008142962 Machine Translation (by EPO and Google)—published Jun. 26, 2008; Fuji Xerox Co Ltd.
JP2008183744A Machine Translation (by EPO and Google)—published Aug. 14, 2008, Fuji Xerox Co Ltd.
JP2008194997A Machine Translation (by EPO and Google)—published Aug. 28, 2008; Fuji Xerox Co Ltd.
JP2008201564 Machine Translation (English machine translation)—published Sep. 4, 2008 Fuji Xerox Co Ltd.
JP2008238674A Machine Translation (by EPO and Google)—published Oct. 9, 2008; Brother Ind Ltd.
JP2008246990 Machine Translation (by EPO and Google)—published Oct. 16, 2008; Jujo Paper Co Ltd.
JP2008254203A Machine Translation (by EPO and Google)—published Oct. 23, 2008; Fujifilm Corp.
JP2008255135 Machine Translation (by EPO and Google)—published Oct. 23, 2008; Fujifilm Corp.
JP2009045794 Machine Translation (by EPO and Google)—published Mar. 5, 2009; Fujifilm CORP.
JP2009045851A Machine Translation (by EPO and Google); published on Mar. 5, 2009, Fujifilm Corp.
JP2009045885A Machine Translation (by EPO and Google)—published Mar. 5, 2009; Fuji Xerox Co Ltd.
JP2009083314 Machine Translation (by EPO, PlatPat and Google)—published Apr. 23, 2009 Fujifilm Corp.
JP2009083317 Abstract; Machine Translation (by EPO and Google)—published Apr. 23, 2009; Fuji Film Corp.
JP2009083325 Abstract; Machine Translation (by EPO and Google)—published Apr. 23, 2009 Fujifilm.
JP2009096175 Machine Translation (EPO, PlatPat and Google) published on May 7, 2009 Fujifilm CORP.
JP2009148908A Machine Translation (by EPO and Google)—published Jul. 9, 2009; Fuji Xerox Co Ltd.
JP2009154330 Machine Translation (by EPO and Google)—published Jul. 16, 2009; Seiko Epson Corp.
JP2009190375 Machine Translation (by EPO and Google)—published Aug. 27, 2009; Fuji Xerox Co Ltd.
JP2009202355 Machine Translation (by EPO and Google)—published Sep. 10, 2009; Fuji Xerox Co Ltd.
JP2009214318 Machine Translation (by EPO and Google)—published Sep. 24, 2009 Fuji Xerox Co Ltd.
JP2009214439 Machine Translation (by PlatPat English machine translation)—published Sep. 24, 2009 Fujifilm Corp.
JP2009226805A Machine Translation (by EPO and Google)—published Oct. 8, 2009; Fuji Xerox Co Ltd.
JP2009226852 Machine Translation (by EPO and Google)—published Oct. 8, 2009; Hirato Katsuyuki, Fujifilm CORP.
JP2009226890A Machine Translation (by EPO and Google)—published Oct. 8, 2009; Fuji Xerox Co Ltd.
JP2009233977 Machine Translation (by EPO and Google)—published Oct. 15, 2009; Fuji Xerox Co Ltd.
JP2009234219 Machine Translation (by EPO and Google)—published Oct. 15, 2009; Fujifilm Corp.
JP2009532240A Machine Translation (by EPO and Google)—published Sep. 10, 2009; Aisapack Holding Sa.
JP2010030300A Machine Translation (by EPO and Google)—published Feb. 12, 2010; Xerox Corp.
JP2010054855 Machine Translation (by PlatPat English machine translation)—published Mar. 11, 2010 Itatsu, Fuji Xerox Co.
JP2010105365 Machine Translation (by EPO and Google)—published May 13, 2010; Fuji Xerox Co Ltd.
JP2010173201 Abstract; Machine Translation (by EPO and Google)—published Aug. 12, 2010; Richo Co Ltd.
JP2010184376 Machine Translation (by EPO, PlatPat and Google)—published Aug. 26, 2010 Fujifilm Corp.
JP2010214885A Machine Translation (by EPO and Google)—published Sep. 30, 2010; Mitsubishi Heavy Ind Ltd.
JP2010228192 Machine Translation (by PlatPat English machine translation)—published Oct. 14, 2010 Fuji Xerox.
JP2010228392A Machine Translation (by EPO and Google)—published Oct. 14, 2010; Jujo Paper Co Ltd.
JP2010234599A Machine Translation (by EPO and Google)—published Oct. 21, 2010; Duplo Seiko Corp et al..
JP2010234681A Machine Translation (by EPO and Google)—published Oct. 21, 2010; Riso Kagaku Corp.
JP2010240897A Machine Translation (by EPO and Google)—published Oct. 28, 2010; Toppan Printing Co Ltd.
JP2010241073 Machine Translation (by EPO and Google)—published Oct. 28, 2010; Canon Inc.
JP2010247381A Machine Translation (by EPO and Google); published on Nov. 4, 2010, Ricoh Co Ltd.
JP2010258193 Machine Translation (by EPO and Google)—published Nov. 11, 2010; Seiko Epson Corp.
JP2010260204A Machine Translation (by EPO and Google)—published Nov. 18, 2010; Canon KK.
JP2010260287 Machine Translation (by EPO and Google)—published Nov. 18, 2010, Canon Kk.
JP2010260302A Machine Translation (by EPO and Google)—published Nov. 18, 2010; Riso Kagaku Corp.
JP2011002532 Machine Translation (by PlatPat English machine translation)—published Jan. 6, 2011 Seiko Epson Corp.
JP2011025431 Machine Translation (by EPO and Google)—published Feb. 10, 2011; Fuji Xerox Co Ltd.
JP2011031619A Machine Translation (by EPO and Google)—published Feb. 17, 2011; Xerox Corp.
JP2011037070A Machine Translation (by EPO and Google)—published Feb. 24, 2011; Riso Kagaku Corp.
JP2011064850A Machine Translation (by EPO and Google)—published Mar. 31, 2011; Seiko Epson Corp.
JP2011067956A Machine Translation (by EPO and Google)—published Apr. 7, 2011; Fuji Xerox Co Ltd.
JP2011126031A Machine Translation (by EPO and Google); published on Jun. 30, 2011, Kao Corp.
JP2011144271 Machine Translation (by EPO and Google)—published Jun. 28, 2011 Toyo Ink Sc Holdings Co Ltd.
JP2011173325 Abstract; Machine Translation (by EPO and Google)—published Sep. 8, 2011; Canon Inc.
JP2011173326 Machine Translation (by EPO and Google)—published Sep. 8, 2011; Canon Inc.
JP2011186346 Machine Translation (by PlatPat English machine translation)—published Sep. 22, 2011 Seiko Epson Corp, Nishimura et al.
JP2011189627 Machine Translation (by Google Patents)—published Sep. 29, 2011; Canon KK.
JP2011201951A Machine Translation (by PlatPat English machine translation); published on Oct. 13, 2011, Shin-Etsu Chemical Co Ltd, Todoroki et al.

(56) References Cited

OTHER PUBLICATIONS

JP2011224032 Machine Translation (by EPO & Google)—published Nov. 10, 2011, Mameita KK.
JP2012086499 Machine Translation (by EPO and Google)—published May 10, 2012; Canon Inc.
JP2012111194 Machine Translation (by EPO and Google)—published Jun. 14, 2012; Konica Minolta.
JP2012196787A Machine Translation (by EPO and Google)—published Oct. 18, 2012; Seiko Epson Corp.
JP2012201419A Machine Translation (by EPO and Google)—published Oct. 22, 2012, Seiko Epson Corp.
JP2013001081 Machine Translation (by EPO and Google)—published Jan. 7, 2013; Kao Corp.
JP2013060299 Machine Translation (by EPO and Google)—published Apr. 4, 2013; Ricoh Co Ltd.
JP2013103474 Machine Translation (by EPO and Google)—published May 30, 2013; Ricoh Co Ltd.
JP2013121671 Machine Translation (by EPO and Google)—published Jun. 20, 2013; Fuji Xerox Co Ltd.
JP2013129158 Machine Translation (by EPO and Google)—published Jul. 4, 2013; Fuji Xerox Co Ltd.
JP2014047005A Machine Translation (by EPO and Google)—published Mar. 17, 2014; Ricoh Co Ltd.
JP2014094827A Machine Translation (by EPO and Google)—published May 22, 2014; Panasonic Corp.
JP2014131843A Machine Translation (by EPO and Google)—published Jul. 17, 2014; Ricoh Co Ltd.
JP2016093999A Machine Translation (by EPO and Google)—published May 26, 2016; Canon KK.
JP2016185688A Machine Translation (by EPO and Google)—published Oct. 27, 2016; Hitachi Industry Equipment Systems Co Ltd.
JP2529651B2 Machine Translation (by EPO and Google)—issued Aug. 28, 1996;OSAKA Sealing Insatsu KK.
JP4562388B2 Machine Translation (by EPO and Google)—published Oct. 13, 2010; SK Kaken Co Ltd.
JPH03248170A Machine Translation (by EPO & Google)—published Nov. 6, 1991; Fujitsu Ltd.
JPH05147208 Machine Translation (by EPO and Google)—published Jun. 15, 1993-Mita Industrial Co Ltd.
JPH06100807 Machine Translation (by EPO and Google)—published Apr. 12, 1994; Seiko Instr Inc.
JPH06171076A Machine Translation (by PlatPat English machine translation)—published Jun. 21, 1994, Seiko Epson Corp.
JPH06345284A Machine Translation (by EPO and Google); published on Dec. 20, 1994, Seiko Epson Corp.
JPH06954A Machine Translation (by EPO and Google)—published Jan. 11, 1994; Seiko Epson Corp.
JPH07186453A Machine Translation (by EPO and Google)—published Jul. 25, 1995; Toshiba Corp.
JPH07238243A Machine Translation (by EPO and Google)—published Sep. 12, 1995; Seiko Instr Inc.
JPH08112970 Machine Translation (by EPO and Google)—published May 7, 1996; Fuji Photo Film Co Ltd.
JPH0862999A Machine Translation (by EPO & Google)—published Mar. 8, 1996 Toray Industries, Yoshida, Tomoyuki.
JPH09123432 Machine Translation (by EPO and Google)—published May 13, 1997, Mita Industrial Co Ltd.
JPH09157559A Machine Translation (by EPO and Google)—published Jun. 17, 1997; Toyo Ink Mfg Co.
JPH09281851A Machine Translation (by EPO and Google)—published Oct. 31, 1997; Seiko Epson Corp.
JPH09300678A Machine Translation (by EPO and Google)—published Nov. 25, 1997; Mitsubishi Electric Corp.
JPH09314867A Machine Translation (by PlatPat English machine translation)—published Dec. 9, 1997, Toshiba Corp.
JPH11106081A Machine Translation (by EPO and Google)—published Apr. 20, 1999; Ricoh KK.
JPH11138740A Machine Translation (by EPO and Google)—published May 25, 1999; Nikka KK.
JPH11245383A Machine Translation (by EPO and Google)—published Sep. 14, 1999; Xerox Corp.
JPH5297737 Machine Translation (by EPO & Google machine translation)—published Nov. 12, 1993 Fuji Xerox Co Ltd.
JPS5578904A Machine Translation (by EPO and Google)—published Jun. 14, 1980; Yokoyama Haruo.
JPS57121446U Machine Translation (by EPO and Google)—published Jul. 28, 1982.
JPS60199692A Machine Translation (by EPO and Google)—published Oct. 9, 1985; Suwa Seikosha KK.
JPS6076343A Machine Translation (by EPO and Google)—published Apr. 30, 1985; Toray Industries.
JPS6223783A Machine Translation (by EPO and Google)—published Jan. 31, 1987; Canon KK.
Larostat 264 A Quaternary Ammonium Compound, Technical Bulletin, BASF Corporation, Dec. 2002, p. 1.
Machine Translation (by EPO and Google) of JPH07112841 published on May 2, 1995 Canon KK.
Marconi Studios, Virtual SET Real Time; http://www.marconistudios.il/pages/virtualset_en.php.
Montuori G.M., et al., "Geometrical Patterns for Diagrid Buildings: Exploring Alternative Design Strategies From the Structural Point of View," Engineering Structures, Jul. 2014, vol. 71, pp. 112-127.
"Solubility of Alcohol", in http://www.solubilityoflhings.com/water/alcohol; downloaded on Nov. 30, 2017.
Poly(vinyl acetate) data sheet. PolymerProcessing.com. Copyright 2010. http://polymerprocessing .com/polymers/PV AC.html.
Royal Television Society, The Flight of the Phoenix; https://rts.org.uk/article/flight-phoenix, Jan. 27, 2011.
RU2180675C2 Machine Translation (by EPO and Google)—published Mar. 20, 2002; Zao Rezinotekhnika.
RU2282643C1Machine Translation (by EPO and Google)—published Aug. 27, 2006; Balakovorezinotekhnika Aoot.
Technical Information Lupasol Types, Sep. 2010, 10 pages.
The Engineering Toolbox., "Dynamic Viscosity of Common Liquids," 2018, 4 pages.
Units of Viscosity published by Hydramotion Ltd. 1 York Road Park, Malton, York Y017 6YA, England; downloaded from www.hydramotion.com website on Jun. 19, 2017.
WO2006051733A1 Machine Translation (by EPO and Google)—published May 18, 2006; Konica Minolta Med & Graphic.
WO2010073916A1 Machine Translation (by EPO and Google)—published Jul. 1, 2010; Nihon Parkerizing [JP] et al.
WO2013087249 Machine Translation (by EPO and Google)—published Jun. 20, 2013; Koenig & Bauer AG.
XIAMETER™ "OFS-0777 Siliconate Technical Data Sheet," Dec. 31, 2017, 5 pages. [Retrieved from the internet on Oct. 13, 2021]: <url: <a= href=>https://www.dow.com/en-us/document-viewer.html?ramdomVar=6236427586842315077&docPath=/content/dam/dcc/documents/en-us/productdatasheet/95/95-4/95-435-01-xiameter-ofs-0777-siliconate.pdf.</url:>.

* cited by examiner

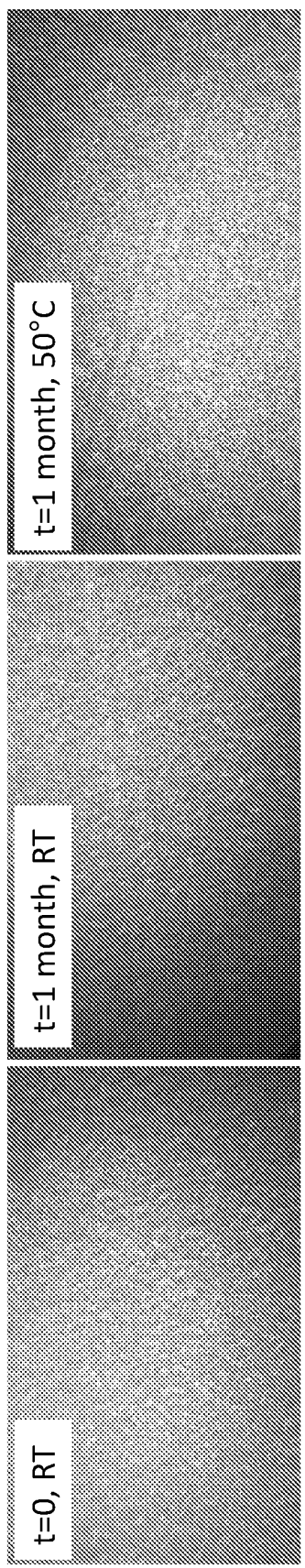

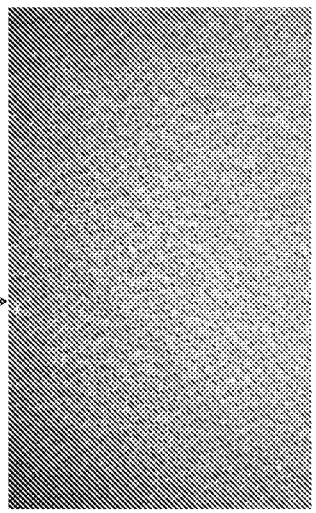
Fig. 6B
Fresh Blanket, used TF — Zoom in
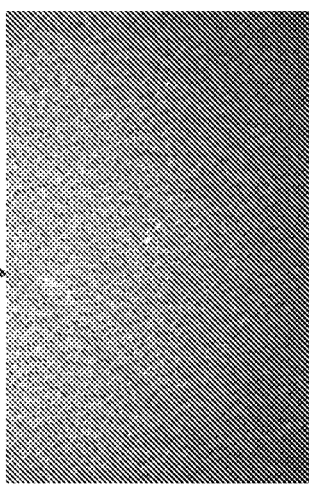
Fig. 6A
Fresh Blanket, Fresh TF — Zoom in

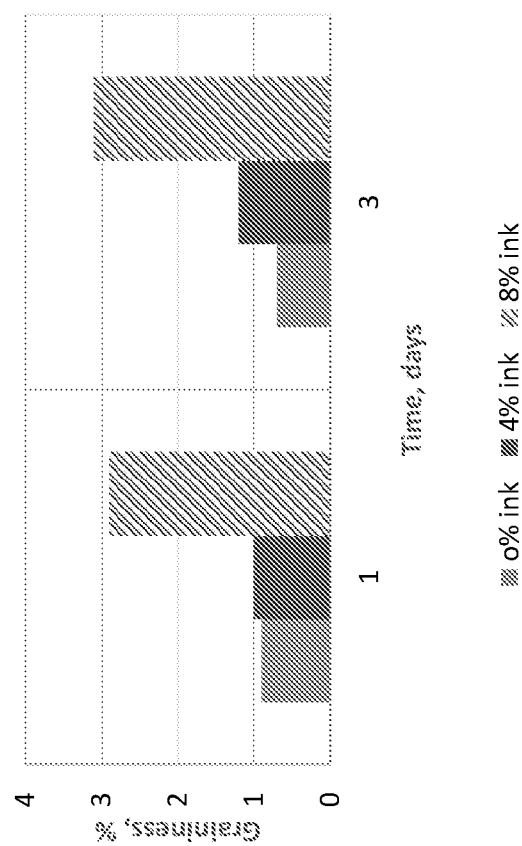

TF + 8% ink, 3d, 50°C → filtered

TF + 8% ink, rt, t=0 → filtered

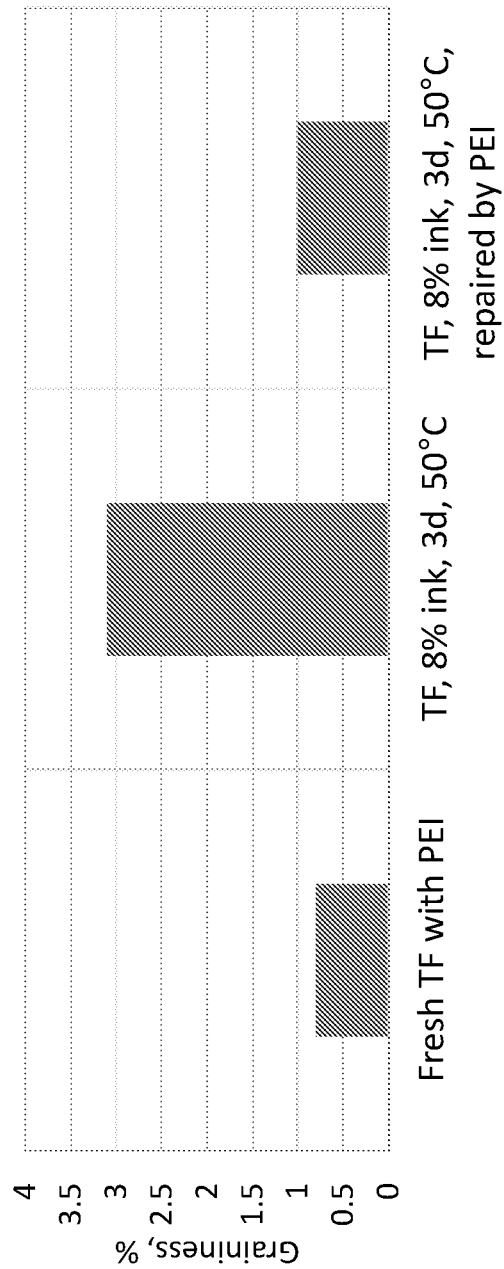
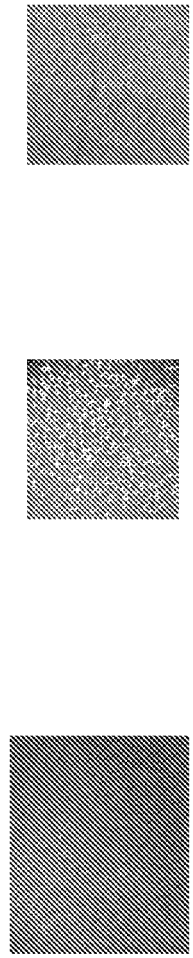
Fig. 14A
Fig. 14B

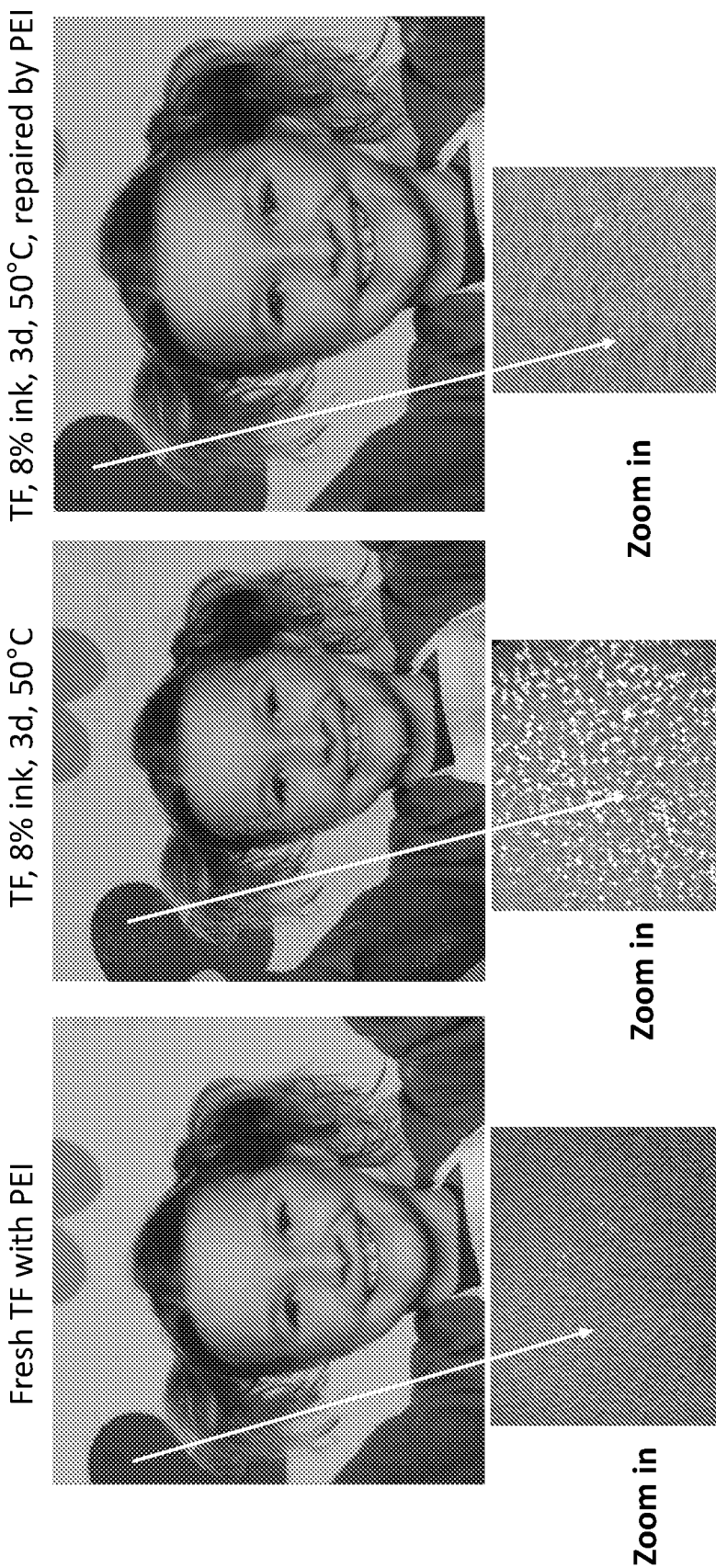

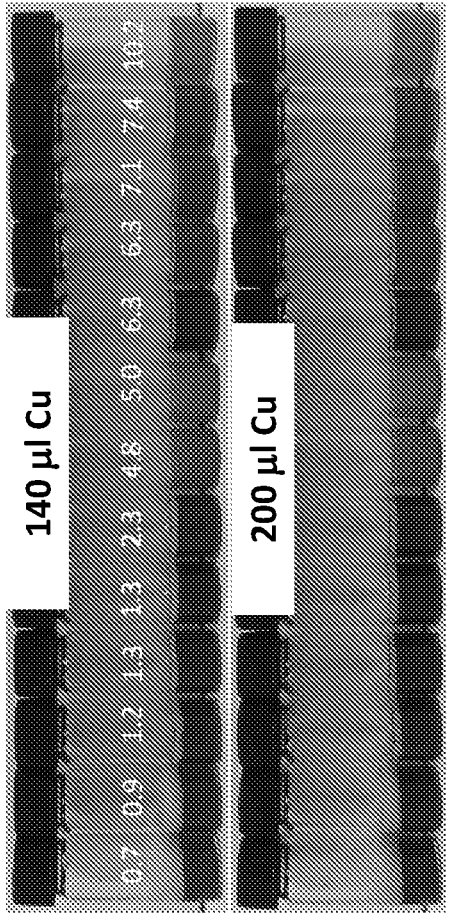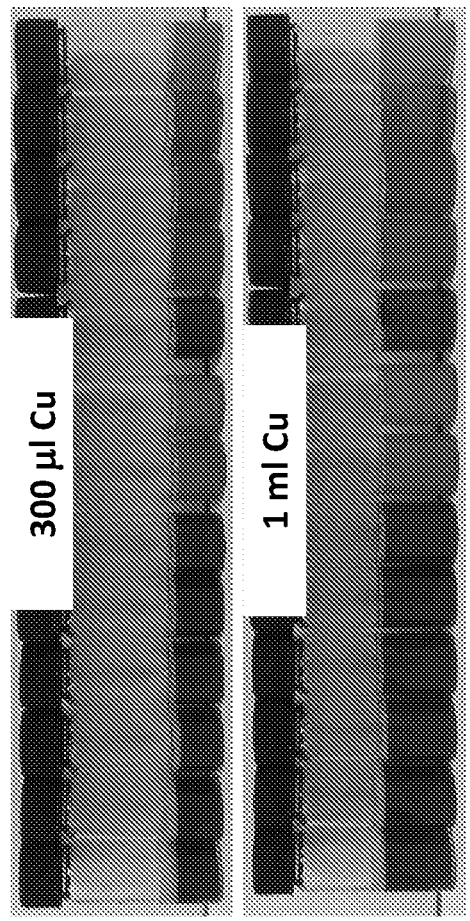
Fig. 17I  Fig. 17J  Fig. 17K  Fig. 17L

SYSTEMS AND METHODS FOR PREVENTING OR MINIMIZING PRINTING DEFECTS IN PRINTING PROCESSES

TECHNOLOGICAL FIELD

The present disclosure relates to systems and methods for preventing or minimizing printing defects.

BACKGROUND ART

References considered to be relevant as background to the presently disclosed subject matter are listed below:
[1] Piotr Warszynski et al., "*Characteristics of polyelectrolyte multilayers: Effect of PEI anchoring layer and post-treatment after deposition*" Journal of Colloid and Interface Science, Volume 305, Issue 1, 1 Jan. 2007, Pages 46-56.

The following patent applications/publications to the Applicant provide potentially relevant background material, acid are all incorporated herein by reference in their entirety:
[2] WO2017/208246 (publication of PCT/IL2017/050616 filed Jun. 1, 2017);
[3] WO2019/111223 (publication of PCT/IB2018/059761 filed Dec. 7, 2018);
[4] WO2015/036812 (publication of PCT/IB2013/002571 filed Sep. 12, 2013);
[5] WO2015/036865 (publication of PCT/IB2014/002395 filed Sep. 11, 2014);
[6] WO2013/132439 (publication of PCT/IB2013/051755 filed Mar. 5, 2013);
[7] WO2013/132418 (publication of PCT/IB2013/051716 filed Mar. 5, 2013);
[8] WO2013/132345 (publication of PCT/2013/000840 filed Mar. 5, 2013);
[9] WO2013/132339 (publication of PCT/IB2013/000757 filed Mar. 5, 2013);
[10] WO2017/208152 (publication of PCT/IB2017/053177 filed May 30, 2017);
[11] WO2019/012456 (publication of PCT/IB2018/055126 filed Jul. 11, 2018);
[12] WO2020/003088 (publication of PCT/IB2019/055288 filed Jun. 24, 2019);
[13] U.S. Pat. No. 9,914,316;
[14] U.S. Pat. No. 9,186,884;
[15] WO2013/132424 (publication of PCT/IB2013/051727 filed Mar. 5, 2013);
[16] U.S. Patent Application Publication 2015/0054865; and
[17] U.S. Provisional Application No. 62/787,984, U.S. Provisional Application No. 62/790,890, U.S. Provisional Application No. 62,825,568 and the corresponding International application No. PCT/IB2020/050001).

Acknowledgement of the above references herein is not to be inferred as meaning that these are in any way relevant to the patentability of the presently disclosed subject matter.

SUMMARY OF THE INVENTION

The inventors of the present invention have developed a s and a method that prevents and/or minimize printing defects associated with undesired depletion of at least one ingredient used in a printing process. The ingredient was found to be of great importance to the quality of the printed image and depletion thereof significantly affected same.

In particular, the inventors of the present invention utilized a system for printing process e.g., an indirect printing process, in which a release surface of an intermediate transfer member (ITM) is pre-treated (e.g., coated) with a treatment formulation (e.g., an aqueous treatment formulation) before deposition of an ink image thereto. The treatment formulation is applied to a surface of an ITM to form thereon a thin wet treatment layer which is subjected to a drying process on the ITM release surface to leave a thin substantially dried treatment film on the ITM release surface. Then after, droplets of an aqueous ink, which comprises at least one organic polymeric resin and at least one coloring agent in an aqueous carrier, are deposited (e.g. by ink-jetting) onto the thin substantially dried treatment film to form an ink image thereon. The formed ink-image is then subjected to a drying process to leave a substantially dry ink image residue on the substantially dried treatment film. The substantially dried ink-image is then transferred, together with the thin substantially dried treatment film, from the ITM surface to a final printed substrate (e.g. foil-based, paper-based or plastic-based).

Examples of such printing processes and systems are disclosed in the aforementioned patent applications/publications to the Applicant (e.g., WO2013/132418, and WO2017/208152) which content thereof is incorporated herein by reference.

During the printing process, there is a need to refill the ink and the treatment formulations due to consumption thereof in the printing process and for the printing purpose.

The inventors of the present invention have found that the quality of the ink image which is produced in the above printing process may be reduced as the printing process proceeds. At times, the quality of the printed image may be reduced at various stages of the printing process, at times even at the very beginning of the printing process, implying that the reductions in the printing quality might not be related to the performed number of printing cycles.

Further, the inventors of the present invention have surprisingly found that the reduction in the printed image quality, which at times may be reflected in the graininess of the image, is strongly dependent on the presence of at least one ingredient in the treatment formulation. The inventors have found that in the absence of said ingredient the printed image is of very low quality.

The inventors have further found that reduction in the printing quality may not be related to the physical characteristics of the treatment formulation (e.g., viscosity and surface tension) neither to the age (freshness) of the treatment formulation or the temperature thereof.

Furthermore, the inventors of the present invention have surprisingly found that at times the refill required amounts of the treatment formulations exceed the amount which is expected based on the calculated amount of treatment formulation per printed substrate.

The inventors of the present invention have surprisingly found that the ingredient which is important to image printing quality (and as such to the performance of the printing process) may be depleted during the printing process or even when no active printing is in progress. It is noted that the depletion of said ingredient is not due to the consumption thereof in the printing process for the printing purposes but is rather a result of an undesired reaction with a contaminant which unintentionally reaches a reservoir which is holding the formulation with the aforementioned ingredient (e.g., treatment formulation). In particular, the contaminant can be originated from the ink formulation used in the printing process. The inventors have found that the contamination has significant negative effect on the quality of the formulation that comprises the aforementioned ingredient.

The aforementioned specific ingredient which is important to image printing quality and wherein depletion thereof negatively affects the printing quality is referred to herein as "a depletable chemical agent" or any lingual variation thereof e.g., "depleted chemical agent" "chemically depleted agent" etc.

To avoid reduction and/or to prevent or minimize reduction in the quality of a printed image, the inventors have developed the novel systems and processes detailed herein.

In particular, the inventors have found that in order to negate the reduction in the printing quality which is associated with insufficient quality of a treatment formulation used in an indirect printing process, there is no need to replenish the whole treatment formulation (all the ingredients thereof including a carrier). The performance of the treatment formulation may be repaired by merely adding thereto the depleted chemical agent. This provides an advantage both in terms of costs and waste reduction, rendering the disclosed systems and process more environmentally friendly.

The systems and the methods of the present invention also beneficially assures printing quality stability.

Thus, the present invention provides in one of its aspects a system for printing, comprising:
- a liquid reservoir configured for holding a formulation, the formulation comprising a first amount (e.g., weight, volume, concentration) of at least one depletable chemical agent (in a liquid carrier e.g. a liquid carrier containing water), said first amount being substantially equal to or greater than a predetermined threshold value, wherein said formulation optionally further comprises at least one further component;
- a replenishment reservoir configured for holding a second amount (e.g., weight, volume, concentration) of said at least one depletable chemical agent, optionally in at least one liquid carrier (e.g., a water containing carrier being same or different from the liquid carrier of the formulation comprised within the liquid reservoir);
- detection means configured at least to identify a reduction in (i) said first amount of said depletable chemical agent below said predetermined threshold value and/or (ii) the functionability of said at least one depletable chemical agent;
- transfer means configured to transfer at least a portion of said second amount of the at least one depletable chemical agent from said replenishment reservoir to said liquid reservoir once said reduction has been identified, optionally wherein said transfer means are manual means.

In another one of its aspects the present invention provides a method for preventing or minimizing printing defects in a printing process, wherein the printing defects are associated with a reduction in a first amount of at least one depletable chemical agent comprised within a liquid formulation (optionally in a liquid carrier), the method comprising:
- identifying/detecting a reduction in the first amount of said least one depletable chemical agent below a predetermined threshold value and/or relative to an amount of at least another component in the formulation; and
- adding to the formulation, upon identifying/detecting said reduction, at least a portion of a second amount of the at least one depletable chemical agent, wherein said at least a portion of a second amount being sufficient to reestablish the first amount of the depletable chemical agent in said liquid formulation to be substantially equal or greater than said predetermined threshold value and/or wherein said at least a portion of said second amount being sufficient to negate said reduction of the first amount relative to an amount of at least another component in the formulation, to thereby prevent or minimize said printing defects.

In a further one of its aspects the present invention provides a method for preventing or minimizing printing defects in a printing process, the method utilizes the system described herein.

Yet, in a further one of its aspects the present invention provides a system and a process as herein described.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 4A-4C display a section (an enlarged, zoom in section) of a printed image obtained in an indirect printing process utilizing a treatment formulation, the formulations being at different temperatures and of different aging, according to some embodiments of the invention.

FIGS. 6A-6D display a printed image and a corresponding enlarged (zoom in) section thereof obtained in an indirect printing process utilizing fresh (unused) treatment formulation (TF) and used TF, in combination with fresh and used (aged) blanket (ITM), according to some embodiments of the invention.

FIG. 9 displays a diagram representing the effect of presence of ink contamination in a treatment formulation (at 50° C.) on the graining of a printed image produced in an indirect printing process according to some embodiments of the invention.

(FIG. 13C) and with a TF contaminated with ink but with additional repaired amount of PEI (FIG. 13D). FIGS. 13A-13D further display the corresponding printed image (zoom in) (right side of the figure) obtained in an indirect printing process, according to some embodiments of the invention, utilizing the corresponding treatment formulations.

FIGS. 14A-14B display a diagram (FIG. 14A) representing the graining of a printed image produced in an indirect printing process utilizing fresh TF, ink contaminated TF, and ink contaminated TF with added (repaired) amount of PEI. FIG. 14B display zoom in sections of the corresponding printed images, obtained in an indirect printing process utilizing the corresponding treatment formulations, according to sonic embodiments of the invention.

FIGS. 15A-15C display (upper part) printed images produced in an indirect printing process utilizing fresh TF (FIG. 15A), ink contaminated TF (FIG. 15B) and ink contaminated FT with added (repaired) amount of PEI (FIG. 15C). FIGS. 15A-15C further display (lower part) zoom in a section of the corresponding printed images, according to some embodiments of the invention.

FIGS. 17A-17L illustrate the color reaction observed upon titration with copper of various fresh TF having different PEI concentrations (with the corresponding observed graininess values which are the numbers detailed in the upper part of these figures).

DETAILED DESCRIPTION OF THE INVENTION

Figure 1A:
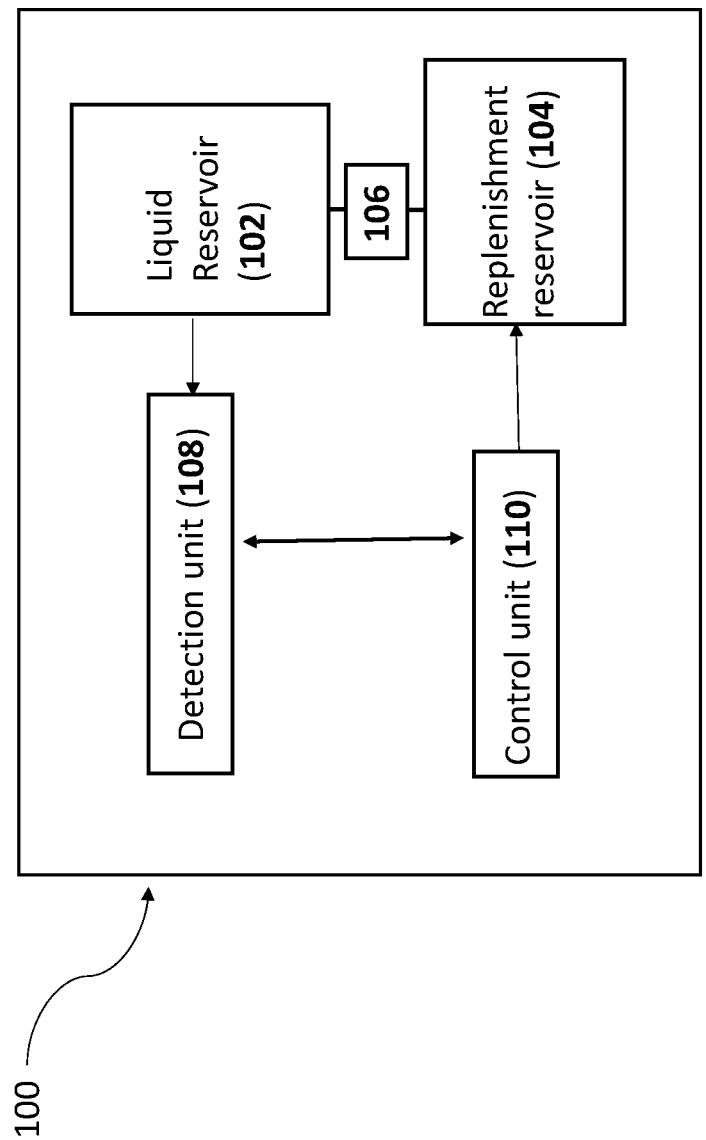
FIG. 1A displays a schematically illustration of a system (e.g., an apparatus) according to some embodiments of the invention.

The present invention is based on a novel concept of assuring quality of a printed image obtained in a printing process by replenishing a specific ingredient used in the printing process.

Thus, the present invention provides in one of its aspects a system for printing, comprising:
  a liquid reservoir configured for holding a formulation, the formulation comprising a first amount of at least one depletable chemical agent, said first amount being substantially equal to or greater than a predetermined threshold value, wherein said formulation optionally further comprises at least one further component;
  a replenishment reservoir configured for holding a second amount of said at least one depletable chemical agent, optionally in at least one liquid carrier;
  detection means configured at least to identify a reduction in (i) said first amount of said depletable chemical agent below a predetermined threshold value and/or (ii) the functionability of said at least one depletable chemical agent;
  transfer means configured to transfer at least a portion of said second amount of the at least one depletable chemical agent from said replenishment reservoir to said liquid reservoir once said reduction has been identified, optionally wherein said transfer means are manual means.

In another one of its aspects the present invention provides a method for preventing or minimizing printing defects in a printing process, wherein the printing defects are associated with a reduction in a first amount of at least one depletable chemical agent comprised within a liquid formulation (optionally in a liquid carrier), the method comprising:
  identifying/detecting a reduction in the first amount of said least one depletable chemical agent below a predetermined threshold value and/or relative to an amount of at least another component in the formulation; and
  adding to the formulation, upon identifying/detecting said reduction at least a portion of a second amount of the at least one depletable chemical agent wherein said at least a portion of said second amount being sufficient to reestablish the first amount of the depletable chemical agent in said liquid formulation to be substantially equal or greater than said predetermined threshold value and/or wherein said at least a portion of said second amount being sufficient to negate the reduction of the first amount relative to an amount of at least another component in the formulation, to thereby prevent or minimize said printing defects.

Various embodiments will be detailed herein in connection the aforementioned aspects. It is noted that one or more embodiments which are detailed in connection with the system of the invention may also be applicable to the method of the invention mutatis mutandis and vis-versa.

In some embodiments the first amount and second amount of the depletable chemical agent in the liquid reservoir and in the replenishment reservoir, respectively, are provided in % w/w (e.g., gram of the depletable chemical agent per 100 gram of the formulation/solution it is comprised within).

Unless stated otherwise, the term "concentration" refers to a w/w—i.e. a weight of a component of a formulation/solution/dispersion (e.g., treatment formulation, printing liquid such as ink formulation and the like) per total weight of that formulation/solution/dispersion. At times, the concentration is provided in w/w % (which is interchangeable with % w/w or % by weight) i.e., a weight of a component of a formulation/solution/dispersion (e.g., treatment formulation, printing liquid such as ink formulation and the like) per 100 grain of the formulation/solution/dispersion it is comprised within.

The system and the method of the present invention are aimed to improve printing quality by negating effects associated with depletion of at least one depletable chemical agent which presence thereof in the printing process is significant to the performance of the printing process and to the quality of the resulted printed image. Unless otherwise noted, the depletion of said depletable chemical agent may be reflected in one or more of the following "reduction" scenarios which system and method of the invention are aimed to negate:

- a reduction in the first amount of the depletable chemical agent below a predetermined threshold value;
- a reduction in the functionability of the at least one depletable chemical agent; and
- a reduction in the first amount of the depletable chemical agent relative to an amount of at least another component in the formulation.

In some embodiments, the depletion of the depletable chemical agent may be reflected in a reduction in the first amount of the depletable chemical agent below a predetermined threshold value.

In some embodiments, the depletion of the depletable chemical agent may be reflected in a reduction in the functionability of the at least one depletable chemical agent.

In some embodiments, the depletion of the depletable chemical agent may be reflected in a reduction in the first amount of the depletable chemical agent relative to an amount of at least another component in the formulation.

The below disclosure further elaborates on the above detailed reduction scenarios.

Accordingly, the at least one depletable chemical agent is present in the formulation in a first amount being substantially equal to or greater than a predetermined threshold value.

The term "predetermined threshold value" is used herein in connection with an amount of the at least one depletable chemical agent in a formulation (which is being hold in a liquid reservoir) said value being equal to or less than the a first amount and denotes an essentially distinct value (namely a distinct integer ±standard deviation) predetermined based on a reference formulation with qualities that fulfill one or more of stability, functionality and compatibility (e.g., with a printing process utilizing the formulation) of the formulation. These qualities may be directly related to the quality of an image produced utilizing the formulation in a printing process.

As used herein the phrase "and/or" is to be envisaged as defining one or the other or both terms to which said phrase refers.

In accordance with the present invention, the depleted chemical agent fulfills one or more functions which, alone or in combination, are of importance to the performance of the formulation in the printing process, wherein said performance may also be reflected in the image printing quality. Thus, as used herein, the terms "functionability", "functionality" or any lingual variations thereof used with respect to the depletable chemical agent refer to said one or more functions.

Non limiting examples of functions that the depletable chemical agent may have are one or more of affecting: solubility; wettability; viscosity; elasticity; cohesiveness; hygroscopicity; density; porosity; and tensile strength of the formulation.

Further non limiting functions of the depleted chemical agent are to provide one or more of good wettability of a surface of an ITM coated with the formulation comprising the depletable agent; good cohesiveness of the film formed on the ITM; improved quality ink image (which may be reflected in low graininess of the image); good ink wetting and ink spreading on the coated ITM characteristics. To this end, in some embodiments, the depleted chemical agent may serve as one or more of a wetting agent, a surface active agent and an anchoring agent (the latter may inter-alia serve to improve pinning of the treatment formulation to the ITM and reduce coalescence of the wet treatment coating from the ITM).

In some embodiments the function that the depletable chemical agent fulfills is being one or more of a surface active agent, a wetting agent, and an anchoring agent.

In some embodiments the function that the depletable chemical agent fulfills is providing good wettability of a surface of an ITM coated with a treatment formulation comprising the depletable agent.

The functionability of the depletable agent may be directly related to the amount thereof in the treatment formulation according to the present invention which is utilized in a printing process. Thus, at times, the reduction in the functionability of the at least one depletable chemical agent is directly related to a reduction in the first amount of the depletable chemical agent in the formulation below a predetermined threshold value.

In some embodiments, e.g., when utilized in an indirect printing process, a reduction in the functionability of the at least one depletable chemical agent and/or a reduction in the first amount of the depletable chemical agent below a predetermined threshold value are directly related to the printing quality.

In some embodiments the printing quality may be reflected in the graininess of a printed image (the lower the graininess the better the quality). To this end, the depletable chemical agent may play a function related to the graininess of the image.

In some embodiments the first amount of the depletable chemical agent may be substantially equal to or greater than the aforementioned predetermined threshold value.

In some embodiments the amount of the depletable chemical agent may be provided in weight, volume or concentration.

In some embodiments the replenishment reservoir is configured to hold only the at least one depletable chemical agent, optionally in at least one liquid carrier i.e., no other functional ingredients of the formulation in the liquid formulation are present in the replenishment reservoir and the replenishment is merely of the depletable chemical agent.

In some embodiments the at least one depletable chemical agent is present in the replenishment reservoir in a liquid form solution or dispersion, optionally in a liquid carrier being same or different from a liquid carrier present in the liquid reservoir).

In some embodiments, the replenishment reservoir and liquid reservoir may be in liquid communication (e.g., via a fluid conduit) permitting transfer (e.g., upon identifying a reduction in the first amount of the depletable chemical agent below the predetermined threshold value, or a reduction in the functionability of the at least one depletable chemical agent) of an amount (e.g., at least a portion of said second amount) of the at least one depletable chemical agent from the replenishment reservoir to the liquid reservoir.

In some embodiments, the transfer means may further comprise regulation means configured to regulate the transferred amount of the depletable chemical agent from the replenishment reservoir to the liquid reservoir and/or to avoid opposite flow of liquid from said liquid reservoir to said replenishment reservoir.

In some embodiments, the system of the invention may further comprise means (e.g., regulation means) to avoid opposite flow of liquid from the liquid reservoir to the replenishment reservoir (e.g., to avoid contamination e.g., ink contamination that may be originated from ink penetration into the liquid reservoir). In some embodiments said means comprise at least one security valve permitting one way flow of liquids, from the replenishment reservoir to the liquid reservoir. For example, the closed valve may be interposed between the liquid reservoir and the replenishment reservoir and when the closed valve is opened, it permits replenishment fluid to be transferred from the replenishment reservoir to the liquid reservoir. In some embodiments the system of the invention may further comprise means for operation of the valve to an open condition and means for closing same when the replenishment is completed e.g., when the amount of the at least one depletable chemical agent in the liquid reservoir reaches (upon said transfer) a value being equal to or greater that the aforementioned predetermined threshold value.

In some embodiments the replenishment may be considered completed when the amount of the at least one depletable chemical agent in the liquid reservoir reaches (upon said transfer) a value being below the first amount but greater than a detected/measured value that is lower than the predetermined threshold value.

In some embodiments the replenishment may be considered completed when the amount of the at least one depletable chemical agent in the liquid reservoir reaches (upon said transfer) a value being below the first amount but greater than the predetermined threshold value.

In some embodiments the second amount of the at least one depletable chemical agent in the replenishment reservoir (e.g., wt. %) may be greater than the first amount of the at least one depletable chemical agent in the liquid reservoir (e.g., wt. %) and upon transfer, dilution of the transferred portion of the depletable chemical agent occurs in the liquid reservoir.

The method and system of the invention may involve mixing of the at least one depletable chemical agent e.g., to provide homogeneity. Thus, in some embodiments the system may optionally further comprise mixing means (e.g., in one or more of the liquid reservoir and the replenishment reservoir) configured to mix (and/or homogeneously disperse) the at least one depletable chemical agent in the liquid reservoir and/or replenishment reservoir. To this end, the method of the invention may further comprise the corresponding mixing.

The system of the invention comprises transfer means configured to transfer of at least a portion of said second amount of the at least one depletable chemical agent from the replenishment reservoir to the liquid reservoir. In some embodiments the system may further comprise a metering pump for pumping a controlled amount of the depletable chemical agent from the replenishment reservoir into the liquid reservoir and optionally mixing means e.g., a mixing device, for mixing the transferred amount in the liquid reservoir.

In some embodiments according to the invention the transfer may be achieved manually e.g., by the system operator.

In some embodiments the added amount of the depletable chemical agent (present in the replenishment reservoir) may be provided in a solid form. To this end, the depletable chemical agent is present in the replenishment reservoir in a solid form and the system may optionally further comprise means to mix, dissolve (e.g., solubilize) disperse the solid depletable chemical agent e.g., in at least one liquid carrier which may be the same or different from a liquid carrier of the formulation which is comprised in the liquid reservoir. To this end, the method of the invention may further comprises mix, dissolve (e.g., solubilize) or disperse the depletable chemical agent present in the replenishment reservoir.

In some embodiments the method may further comprise mixing the at least a portion of the second amount of the at least one depletable chemical agent in the liquid formulation.

In some embodiments the method and the system may involve heating to assist in solubilizing the solid depletable agent. To this end, the system of the invention may further comprise heating means configured to assist in solubilizing the solid depletable chemical agent. To this end, the method of the invention may further comprise corresponding heating (to assist in solubilizing the solid depletable chemical agent).

In some embodiment the system and the method of the invention are for indirect printing.

In some embodiments, the system of the invention may further comprise at least one printing liquid reservoir (e.g., print bar) configured for holding a printing liquid, wherein the printing liquid optionally being an ink, further optionally a water based ink (e.g., aqueous ink formulation).

In some embodiments the system may further comprise an intermediate transfer member (ITM).

In the method and the system of the invention, in some embodiments the formulation in the liquid reservoir is a treatment formulation configured to be applied onto at least a region of a release surface of an ITM and to form a coating layer thereon (e.g., substantially as herein described).

In some embodiments the formulation is applied onto the release surface before said printing liquid (e.g., aqueous ink formulation) is applied thereon.

As used herein the term "treatment formulation" is meant that the formulation is for use with an ITM of a printing system for the purpose of treating a release surface of the ITM with said formulation. The treatment formulation may also be used for cooling in and/or cleaning the release surface of the ITM.

In some embodiments the method and the system of the invention may utilize one or more detection means (such as a detection unit) configured to identify, optionally continuously, the presence of the depletable chemical agent in the formulation e.g., treatment formulation) and to measure and/or calculate its amount in the formulation and/or calculate the percentage thereof with respect to the formulation amount or with respect to other components of the formulation. Non limiting examples of such detection means are spectroscopic means [e.g., visual (colorimetric), infrared], physical means, conductivity measurement means, pri measurement means, refractive index measurement means, density measurement means, specific gravity measurement means or any combinations thereof. The detected values (e.g., measured and/or calculated) may then can be compared with the predetermined threshold value and the amount of the depletable chemical agent is replenished when so required.

In some embodiments the detection means are selected from visual means, spectroscopic means, spectrophotometric means, electronic means, chemical means, physical means, print quality based means or any combinations thereof.

In some embodiments according to the invention the detection means are configured to measure and/or calculate a reduction in the first amount of the depletable chemical agent below a predetermined threshold value. To this end, the method of the invention may involve measuring and/or calculation said reduction.

In some embodiments according to the invention the detection means are configured to detect/measure the amount of the at least one depletable chemical agent in the liquid reservoir and the system is configured to calculate based on the detected/measured amount a reduction in the first amount of the at least one depletable chemical agent below a predetermined threshold value. To this end, the method of the invention may involve detecting/measuring and/or calculating said reduction.

In some embodiments the method of the invention further comprises identifying a reduction in the first amount of said least one depletable chemical agent below a predetermined threshold value, wherein said identifying is accomplished by detection means selected from visual means, spectroscopic means, spectrophotometric means, electronic means, chemical means, physical means, print quality based means or any combinations thereof and wherein said method further comprises calculating based on the identified reduction in said first amount of said least one depletable chemical agent the reduction in the first amount of said least one depletable chemical agent relative to an amount of another one or more components in the formulation.

In some embodiments according to the invention the detection means are configured to measure and/or calculate a reduction in the first amount of the depletable chemical agent relative to an amount of at least another component in the formulation. To this end, the method of the invention may involve measuring and/or calculating said reduction.

In some embodiments according to the invention the detection means are configured to measure and/or calculate a reduction in the functionability of said at least one depletable chemical agent. To this end, the method of the invention may involve measuring and/or calculation said reduction.

In some embodiments the system comprises means to detect, measure or calculate the concentration of the depletable chemical agent in the formulation which is comprised within the liquid reservoir and calculate therefrom the reduction in the first amount of said depletable chemical agent.

In some embodiments the method comprises detecting and/or measuring and/or calculating the concentration of the depletable chemical agent in the liquid formulation and calculate therefrom the reduction in the first amount of said depletable chemical agent.

In some embodiments according to the invention the detection means are configured to record and/or report (e.g., to a system operator) one or more of the aforementioned reductions.

In some embodiments according to the invention the detection means are configured to activate the transfer means once one or more of the aforementioned reductions have been identified.

In some embodiments according to the invention the system may further comprise a control unit configured to control replenishment of the at least one depletable chemical agent in the liquid reservoir and optionally configured to activate the transfer means once a reduction in the first amount of said depletable chemical agent below a predetermined threshold value and/or a reduction in the functionability of the at least one depletable chemical agent has been identified.

In some embodiments the control may be automatic or semi-automatic (combination of machine and human operation).

In some embodiments the transfer may be manual.

In some embodiments according to the invention the system may further comprise communication means configured to transfer data/information between the detection means to the control unit.

In some embodiments according to the invention the transfer means may be one or more of pressure based means, jetting means, spraying means or gravitational means. Other means known in the art may as well be suitable. To this end, the method of the invention may further involve utilizing same.

In some embodiments the detection means may be configured to specifically identify a reduction in the amount of the depletable chemical agent as herein disclosed based on the chemical and/or physical characteristics thereof. To this end, the method of the invention may involve quantifying the amount of the depletable chemical agent in the formulation based on the chemical and/or physical characteristics of said agent.

In some embodiments the system of the invention may further comprise a kit configured to quantify the amount of the depletable chemical agent in the formulation based on the chemical and/or physical characteristics of said agent.

In some embodiments the depletable chemical agent comprises nitrogen atoms and the detection/measurement means and/or kit are specific for detection of same.

In some embodiments the depletable chemical agent is a nitrogen containing agent (e.g., polyethylenimine) and said detection unit comprises spectroscopic means (e.g., in the visible and/or infrared) configured to detect a nitrogen containing agent based on a reaction of copper cation/salt with said nitrogen containing depletable chemical agent. To this end, the system of the invention may further comprise a kit configured to quantify the amount of the depletable chemical agent in the formulation, wherein the kit comprises a solution of copper ions and instructions for use.

In some embodiments the system and the method of the invention may further comprises sampling an aliquot from the liquid formulation for analysis (e.g., identifying/determining/measuring/calculating the amount of said at least one depletable chemical agent in the formulation). To this end, the system of the invention may further comprise at least one sampling unit configured to withdraw an aliquot of the formulation from the liquid reservoir for further analysis.

In some embodiments the sampling is performed upon demand and/or at predetermined time intervals and/or after a predetermined number of printing cycles.

In some embodiment the sampling unit is configured to withdraw an aliquot of the formulation from said liquid reservoir upon demand e.g., when low printing quality is observed and there is need to determine the amount to be replenished, and/or at predetermined time intervals and/or after a predetermined number of printing cycles.

In some embodiments the system of the invention may further comprise means to detect and/or measure and/or calculate the concentration of the depletable chemical agent in the formulation which is comprised within the liquid reservoir and calculate therefrom the reduction in the first amount of the depletable chemical agent. To this end, the method of the invention further comprises detecting and/or measuring and/or calculating the concentration of the depletable chemical agent and calculating therefrom the reduction in the first amount of the depletable chemical agent e.g., below a predetermined threshold value.

In some embodiments according to the present invention the reduction in the first amount of the depletable chemical agent may be relative to an amount of another one or more components of the formulation i.e., the amount of the another one or more components of the formulation remains constant e.g., the relative concentrations therefore in the treatment formulation, while only the concentration of the depletable chemical agent is reduced. In other words, the depletable chemical agent is the only agent that is depleted while the rest of the components maintain a constant amount e.g., wt. %, relative to each other.

In some embodiments the system of the invention is configured to identify a reduction in the first amount of the at least one depletable chemical agent relative to an amount of at least another component in the formulation. In some embodiments the system is configured to provide a signal indication, indicating the need to add said at least one depletable chemical agent to said liquid formulation to thereby reestablishing the first amount of the depletable chemical agent in said liquid formulation to be substantially equal or greater than said predetermined threshold value and hence to negate the reduction in the first amount of the at least one depletable chemical agent relative to an amount of at least another component in the formulation. In this respect, the method of the invention comprise identifying a reduction in the first amount of the at least one depletable chemical agent relative to an amount of at least another component in the formulation and adding to the formulation at least a portion of a second amount of the at least one depletable chemical agent to thereby reestablishing the first amount of the depletable chemical agent in said liquid formulation to be substantially equal or greater than the predetermined threshold value and hence to negate the reduction in the first amount of the at least one depletable chemical agent relative to an amount of at least another component in the formulation. To this end, the method may further provide a signal indication, indicating the need to add the at least one depletable chemical agent to said liquid formulation.

It is noted in this respect that the depletion of the depletable chemical agent is to be envisaged as one not being due to consumption of the depletable chemical agent for the printing process purposes e.g., consumption of the treatment solution for the purpose of coating the ITM). In the printing process the depletable chemical agent is being consumed e.g., in a controlled manner according to a predetermined program, together with the other components of the formulation. Thus, the relative amount of the depletable chemical agent with respect to the amounts of the other components of the formulation is to be maintained substantially constant during the printing process. Once depletion of the depleted chemical agent occurs (e.g., due to ink contamination) the aforementioned relative amount varies according to the extent of the depletion. The system and method of the invention are utilized to counteract such a depletion by adding a further amount of the depletable agent to repair the depletion thereof, and as such minimize the negative effect associate with such a depletion (e.g., reduction in the printing quality).

In some embodiments, in the method and system of the invention, upon identifying a reduction in the first amount of the depletable chemical agent below the aforementioned predetermined threshold value e.g., a desired amount of the at least one depletable chemical agent is added to the liquid formulation e.g., to reestablishing the first amount of the depletable chemical agent in the liquid formulation or at least to increase the amount to be equal or above the predetermined threshold value. The addition may be provided in a predetermined profile referred to herein as a predetermined replenishment profile.

In some embodiments the predetermined replenishment profile is selected to increase the amount of the depletable chemical agent to reach a value being substantially equal to or greater than the aforementioned predetermined threshold value, or at times to reach any other predetermined value that is below/above the predetermined threshold value.

To this end, the system of the invention may further comprise a control unit configured to control replenishment of the at least one depletable chemical agent in the liquid reservoir, in accordance with said replenishment profile.

Reference is now made to FIG. 1A exemplifying a schematically illustration of a system 100 (e.g., an apparatus) according to some embodiments of the invention. The system comprises a liquid reservoir 102 configured for holding a formulation comprising a first amount of at least one depletable chemical agent. The system further comprises a replenishment reservoir 104 holding an amount of the at least one depletable chemical agent. The system further comprises a transfer unit 106 configured for transferring an amount of the at least one depletable chemical agent from the replenishment reservoir 104 to the liquid reservoir 102. The transfer unit 106 may further comprise regulation means configured to regulate the transferred amount and/or prevent back flow.

One example of such transfer unit 106 is a fluid conduit permitting transfer of an amount of the at least one depletable chemical agent from the replenishment reservoir 104 to the liquid reservoir 102. To this end, the system optionally further comprises a security valve configured to avoid opposite flow of liquid from the liquid reservoir 102 to the replenishment reservoir 104.

In FIG. 1A the system 100 further comprises a detection unit 108 configured to measure the amount of the at least one depletable chemical agent in the liquid reservoir 102 and/or identify the depletion thereof.

The system may further comprise a sampling unit (not shown in FIG. 1A) configured to withdraw an aliquot of the formulation in the liquid reservoir 102 for fluffier analysis (e.g., determine the amount of the at least one depletable chemical agent). Alternatively, the detection unit can measure and/or detect the at least one depletable chemical agent and/or identify its depletion within the reservoir.

The system optionally further comprises a control unit 110 configured to control replenishment of the at least one depletable chemical agent in the liquid reservoir 102, by activating the transfer of an amount of the depletable chemical agent from the replenishment reservoir 104 to the liquid reservoir 102.

The control unit 110 can control the replenishment upon demand, e.g. based on a feedback from the detection unit and/or can periodically activate the replenishment based on a predetermined replenishment profile (e.g. a predetermined amount of the depletable chemical agent once in a predetermined period of time).

In some embodiments the system 100 in FIG. 1A may comprise further one or more units e.g., as detailed herein.

Figure 1B:
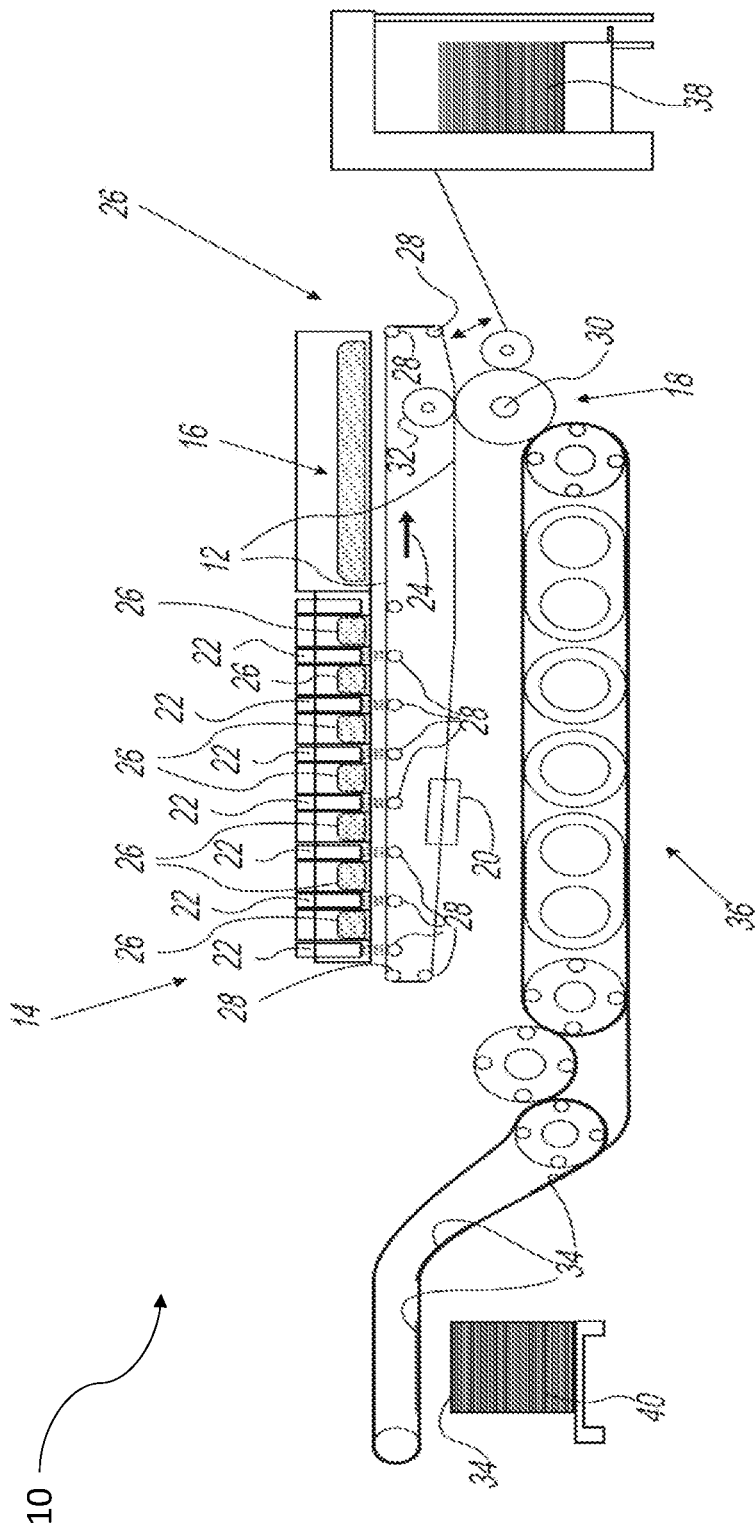
FIG. 1B is a schematic side view of a printing system (e.g., digital printing system), according to some embodiments of the invention.

In some embodiments the system of the invention, e.g., system 100 in FIG. 1A, may form part of a printing system e.g., as detailed herein (See for example the printing 10 system of FIG. 1B).

In some embodiments the system of the invention may further comprise a processing utility.

In some embodiments the processing utility may be configured, upon identifying a reduction in the first amount of the depletable chemical agent below the aforementioned predetermined threshold value and/or upon identifying a reduction in the functionability of the at least one depletable chemical agent (which may be reflected in the quality of a printed image), to provide a user (e.g., a system operator) with a signal indication, indicating the need to replenish the at least one depletable chemical agent in the liquid reservoir.

In some embodiments the signal indicator may be a visual signal, an audio signal or a combination thereof.

In some embodiments replenishment may be performed by the user e.g., according to a profile to be determined based on the printing conditions, optionally according to a predetermined replenishment profile, or may be automatically performed by the control unit e.g., upon approval by the system operator e.g., by activating the controller e.g., ON/OFF switch, e.g., according to a predetermined replenishment profile.

In some embodiments the system may optionally further comprise means to halt the printing process and resume same once replenishment is accomplished/completed.

In some embodiments the replenishment profile may define one or more of: the amount (e.g., volume) of the at least one depletable chemical agent to be transferred from the replenishment reservoir to the liquid reservoir; the frequency of the replenishment, the duration of the transfer; the manner of the transfer (e.g., being continuous or sequential); the transfer rate.

In some embodiments the replenishment profile may be determined based on one or more of: the first amount and/or the second amount of the depletable chemical agent; the extent of said reduction; detected reduction (e.g., the amount of the depletable chemical agent remained in the liquid reservoir after the reduction); the relative amount of the depletable chemical agent with respect to the formulation amount or the amount of other one of more components comprised within the formulation.

In some embodiments the replenishment profile may be defined based on one or more of the printing conditions e.g the nature of the printing medium, printing time/duration, number of printing cycles, number or printed pages, printing temperature/s, printing rate, the quality/age of the formulation, the quality/age of the ITM, extent of contamination of the formulation by external contaminants, such as ink.

In some embodiments the system and the method of the invention further comprise processing an image produced by the printing process and assess the image printing quality thereof, wherein when said image printing quality is below a predetermined required quality, replenishment/addition of the depletable chemical agent in the liquid formulation is required (thus, addition of the at least a portion of the second amount of the at least one depletable chemical agent to thee liquid formulation is performed). To this end, the system of the invention utilizes the processing utility which is configured to process the image and to assess the printing quality thereof, wherein when the image printing quality is below a predetermined required quality, the control unit of the system is configured to control replenishment of the at least one depletable chemical agent in the liquid reservoir.

In some embodiments the method and the system of the invention generate an output indicative of the quality of the image, wherein when the output is below a predetermined threshold parameter, replenishment/addition of the depletable chemical agent in the liquid formulation is required (thus, addition of the at least a portion of the second amount of the at least one depletable chemical agent to thee liquid formulation is performed). To this end, the system of the invention utilizes the processing utility which is configured to generate said output and wherein when said output is below a predetermined threshold parameter the control unit is configured to control or cause replenishment of said at least one depletable chemical agent in said liquid reservoir.

In some embodiments the image printing quality is determined based on the graininess of the image (the lower the graininess the better the quality). To this end, the output reflects a value indicative of the graininess of the image.

In some embodiments the system and method of the invention display said output on visual display unit, an audio device or combination of same. To this end, the system of the invention may further comprise a display unit.

In some embodiments the predetermined threshold parameter comprises an essentially distinct value or a range of values representing a desired quality of the printed image (e.g., the printing quality may be determined based on one or more image pixels, the threshold parameter being a distinct value of one pixel, an average of some pixels or a range of values of the various pixels).

In some embodiments, when the output is below a predetermined threshold value (e.g., indicating a defective image), the system of the invention is configured to provide, and the method provides an alert to the user and at times, automatically stop the printing process and optionally resume same once replenishment of the depletable chemical agent (in the liquid reservoir) is completed.

In some embodiments the system of the invention may further comprise a user interface. At times the user interface may be for allowing a user to introduce into the processing utility one or more desired printing conditions for a printing process.

In some embodiments the system of the invention may further comprise a memory comprising a database of image quality predetermined threshold parameter/s of a printing processes.

In some embodiments the processing utility is configured to correlate the image quality predetermined threshold parameter from the database to the output generated in a printing process.

In some embodiments the system of the invention may further comprise means to record the replenishment history. To this end, the system may be configured to record and optionally store in a memory the replenishment occurrences. The system may be further configured to determine based on the latter the quality of the treatment formulation and in case wherein a predetermined certain amount of replenishment cycles and/or certain amount of the depletable chemical agent was replenished and/or certain amount of the depletable chemical agent in the replenishment reservoir was consumed, to halt the printing process and/or provide an indication to the user regarding the replenishment history, optionally followed by decision making by the user (or automatically/semi automatically) to proceed with further replenishment or to discard the formulation in the liquid reservoir (when the quality thereof is insufficient e.g., due to a great number of replenishment cycles that exceed a predetermined replenishment cycles number) and fill it with a new (fresh) formulation.

In some embodiments the reduction in the first amount of the depletable chemical agent or a reduction in the functionability of the at least one depletable chemical agent may be due to an undesired side reaction of the depletable chemical agent.

In some embodiments the undesired side reaction of the depletable chemical agent results with a formation of an undesirable byproduct.

As used herein the term "undesirable byproduct" refers to a byproduct produced upon reaction of at least one ingredient that does not form part or fulfill any functionality in the treatment formulation, with the depletable chemical agent, the byproduct having no functionality in the formulation e.g., in the treatment formulation and/or in the printing process.

In some embodiments the system and the method of the invention may further comprise detection of the formation of the undesirable byproduct and optionally measure the amount thereof. To this end, the system of the invention may further comprise means to detect same and to measure/ determine/calculate the amount of the byproduct in the liquid reservoir.

In some embodiments the method and system of the invention may further comprise correlating between the detected formation of the undesirable byproduct and the reduction in the first amount of the depletable chemical agent. To this end, the system of the invention may further comprise means configured to correlate between the detected formation of the undesirable byproduct and the reduction in the first amount of the depletable chemical agent. In some embodiments the system may further comprise means configured to calculate from the amount of the undesirable byproduct in the liquid reservoir the reduction in the first amount of the depletable chemical agent.

In some embodiments reduction in the first amount of the depletable chemical agent may be due to contamination of the formulation (in the liquid reservoir) with at least one contaminant and formation of at least one undesired byproduct resulted from interaction (which may be reversible interaction or irreversible interaction) between the at least one depletable chemical agent and at least one contaminant.

In some embodiments the method and the system of the invention are for printing. To this end, the system further comprises at least one printing liquid reservoir (e.g., an ink reservoir) configured for holding a printing liquid (e.g., and ink formulation) and wherein the reduction in the first amount of the depletable chemical agent being due to printing liquid contamination (e.g., ink contamination) in the liquid reservoir holding the treatment formulation according to the invention (e.g., entrance of ink components into the liquid reservoir which holds a treatment formulation with the depletable chemical agent).

In some embodiments the system of the invention may further comprise means to remove ink image residue or treatment formulation residue from the release layer surface of the ITM and recycle the treatment formulation residue (to the liquid reservoir). To this end, the system of the invention may further comprise one or more of:
(i) mechanical residue removal mechanism adapted to mechanically remove ink image residue or treatment formulation residue from the release layer surface;
(ii) scraping blade mechanism adapted to mechanically remove ink image residue or treatment formulation residue from the release layer surface; and
(iii) a washing station for removing ink image residue or treatment formulation residue from the release layer surface,
wherein the system optionally further comprises means to recycle the treatment formulation residue to the liquid reservoir.

In some embodiments the ink contamination is originated from the recycling of the treatment formulation residue.

In some embodiments the ink contamination may be due to one or more of: ink spill; ink splash (e.g., from an ink jet nozzle); insufficient removal of the ink image residue; present of ink residues in the recycled treatment formulation residue (e.g., due to insufficient transfer of the ink from the ITM to a final substrate).

In some embodiments the ink contamination may be due to one or more of ink spill, ink splash and recycling process of the treatment formulation.

In some embodiments the ink contamination may be due to recycling process of the treatment formulation.

At times, the ink contamination may increase with increased printing cycles due to undesired buildup of ink contamination.

In some embodiments the printing liquid is an ink (e.g., an ink formulation) that comprises at least one binder (e.g., a negatively charged organic polymeric resin) and at least one colorant (e.g., coloring agent consists of pigment) and wherein the reduction in the first amount of the depletable chemical agent or the reduction in the functionability of the at least one depletable chemical agent being due to an undesired side reaction of the depletable chemical agent with the at least one binder to form an undesirable byproduct (in the liquid reservoir holding the treatment formulation according to the invention).

In some embodiments, in the system according to the invention, the replenishment reservoir is positioned sufficiently remote (sufficiently spaced apart) from the at least one ink reservoir (e.g., print bar) to avoid effects of ink contamination of the replenishment reservoir (e.g., due to ink splash/spill).

In some embodiments the system of the invention may further comprise a protecting unit configured to protect the liquid reservoir (holding the treatment formulation of the invention) from contamination ink contamination. To this end, the method of the invention further comprises protecting the liquid formulation from contamination.

In some embodiments the protecting unit may selectively trap one or more ink components utilizing selective filters e.g., that chemically interact with the one or more ink components e.g., binder. The protecting unit may be positioned downstream or at close proximity to the opening of the liquid reservoir or at the opening of the liquid reservoir. To this end, the system may further comprise connecting means configured to connect the protecting unit to the liquid reservoir. The system may further utilize same protecting unit to protect the replenishment reservoir.

In some embodiments the method and system of the invention may further comprise removal of the undesired byproduct. To this end, the system of the invention may further comprise means configured to remove said byproduct (e.g., once formed and/or once detected) from said liquid reservoir. Such means may enable further performance of the treatment formulation and optionally avoid undesired side effects associate with said byproduct e.g., clogging one or more of the system components/units.

Non limiting examples of means to remove the undesired by products are one or more of: filtration e.g., wherein the byproduct is a solid or semi solid which may be physically filtered out from the liquid treatment formulation; phase separation e.g., in cases wherein the byproduct forms a different phase such as a gel that forms a separate phase from the liquid formulation; circulation optionally followed by decantation of the liquid components (solution) and discarding the byproduct e.g., in cases wherein the byproduct is a solid product, and recirculation of the liquid components to the liquid reservoir.

In some embodiments the method and system of the invention further comprise measurement of the volume of the liquid formulation (in said liquid reservoir), wherein when the measured volume is below a predetermined minimum volume, the printing process is halted and refill of the liquid formulation with an additional volume of the liquid formulation to reach a volume being substantially equal or above said predetermined minimum volume. To this end, the system of the invention may further comprise measuring means configured to measure the volume of the liquid in said liquid reservoir and the system (e.g., the control unit or the processing unit) is configured to indicate to a user to refill the liquid reservoir with a new liquid formulation. Similarly, the system of the invention may further comprise measuring means configured to measure the amount (e.g., volume/liquid or weight/solid) of the depletable chemical agent in the replenishment reservoir, wherein when the measured amount is below a predetermined minimum amount the control unit is configured to indicate to a user to refill the replenishment reservoir with an additional amount (volume/weight) of the depletable chemical agent.

As described above, the system of the invention comprises several units. As appreciated by those versed in the art, these units may communicate using wired or wireless communication module.

In some embodiments the depletable chemical agent may be a polymeric agent containing amine nitrogen atoms in a plurality of functional groups which need not be the same and can be combined (e.g. primary, secondary, tertiary amines or quaternary ammonium salts which may be linear, branched or cyclic).

In some embodiments the depletable chemical agent may be a polymeric agent having a relatively high charge density.

In some embodiments the depletable chemical agent may be a polymeric agent having molecular weight equals or greater than 10,000 g/mole.

In some embodiments the depletable chemical agent may be a polymeric agent having at least one of (a) a positive charge density of at least 3 meq/g of said agent and an average molecular weight of at least 5,000, (b) a positive charge density of at least 6 meq/g of said agent and an average molecular weight of at least 1,000, (c) a nitrogen content of at least 1 wt. % and an average molecular weight of at least 50,000, and (d) a nitrogen content of at least 18 wt. % and an average molecular weight of at least 10,000.

In some embodiments the depletable chemical agent may be a polymeric agent having:
(1) a nitrogen content of at east 1 wt. % and at least one of:
  (a) a positive charge density of at least 3 meq/g of chemical agent and an average molecular weight of at least 5,000;
  (b) a positive charge density of at least 6 meq/g of chemical agent and an average molecular weight of at least 1000; and
  (c) an average molecular weight of at least 50,000; and/or
(2) a nitrogen content of at least 18 wt. % and an average molecular weight of at least 10,000.

In some embodiments the depletable chemical agent may be a polymeric agent having a positive charge density.

In some embodiments the positive charge density may be at least 0.5 meq/g, at least 1 meq/g, at least 2 meq/g, at least 3 meq/g, at least 4 meq/g, at least 5 meq/g, 6 meq/g, at least 7 meq/g, at least 8 meq/g, at least 9 meq/g, at least 10 meq/g, at least 11 meq/g, at least 12 meq/g, at least 13 meq/g, at least 14 meq/g, at least meq/g, at least 16 meq/g, at least 17 meq/g, at least 18 meq/g, at least 19 meq/g, or at least 20 meq/g of said agent.

In some embodiments the depletable chemical agent may be a polymeric agent having an average molecular weight of at least 500, at least 800, at least 1,000, at least 1,300, at least 1,700, at least 2,000, at least 2,500, at least 3,000, at least 3.500, at least 4,000, at least 4,500, at least 5,000, at least 10,000, at least 15,000, at least 20,000, at least 25,000, at least 50,000, at least 100,000, at least 150,000, at least 200,000, at least 250,000, at least 500,000, at least 750,000, at least 1,000,000, or at least 2,000,000.

In some embodiments the depletable chemical agent may be a polymeric agent having an average molecular weight of at least 2,000, at least 10,000 or at least 25,000.

In some embodiments the depletable chemical agent may be a polymeric agent comprising one or more positively chargeable nitrogen atoms.

As used herein the terms a "positively chargeable polymer" or "positively chargeable group" is meant a polymer or chemical moiety which either can readily add a proton (e.g. $-NH_2$) or has a permanent positive charge (e.g. $-N(CH_3)_3^+$). In some embodiments these terms refer to an inherent property of the polymer or moiety, and thus may encompass polymers or moieties which are in an environment in which such protons are added, as well as polymers in an environment in which such protons are not added. In contrast, the term "a positively charged" polymer or group refers to a polymer or group in an environment in which one or more such protons have been added or which has a permanent positive charge. In some embodiments, the one or more chargeable nitrogen atoms of the depletable chemical agent are selected from the group of primary, secondary and tertiary amines and quaternary ammonium groups and combinations of such groups. In some embodiments, such groups are covalently hound to a polymeric backbone and/or constitute part of such a backbone. In some embodiments the one or more nitrogen atoms are part of a cyclic moiety.

In some embodiments the one or more nitrogen atoms constitute at least 1%, at least 1.4%, at least 2%, at least 5%, at least 8%, at least 10%, at least 15%, at least 18%, at least 20%, at least 24%, at least 30%, at least 35%, at least 40%, at least 45%, or at least 50% by weight of the depletable chemical agent.

In some embodiments the depletable chemical agent is a polymeric agent that includes poly(diallyldimethylammonium chloride)

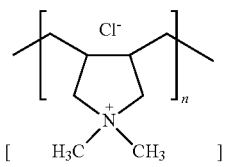

unit.

In some embodiments the depletable chemical agent is a polymeric agent that includes polyallylamine

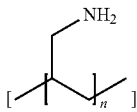

unit.

In some embodiments the depletable chemical agent is a polymeric agent that includes poly(4-vinylpyridine)

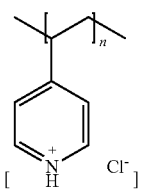

unit.

In some embodiments the depletable chemical polymeric agent is selected from the group consisting of linear polyethylene imine, branched polyethylene imine, modified polyethylene imine, poly(diallyldimethyammonium chloride), poly(4-vinylpyridine), polyallylamine, a vinyl pyrrolidone-dimethylaminopropyl methacrylamide co-polymer (Viviprint 131), a vinyl caprolactam-dimethylaminopropyl methacryamide hydroxyethyl methacrylate copolymer (Viviprint 200), a quaternized copolymer of vinyl pyrrolidone and dimethylaminoethyl methacrylate with diethyl sulfate (Viviprint 650), a guar hydroxypropyltrimonium chloride, and a hydroxypropyl guar hydroxypropyltrimonium chloride.

In some embodiments the depletable chemical polymeric agent is polyethyleneimine (PFI) (e.g., Loxanol P, Loxanol MI 6730)

In some embodiments the concentration (e.g., the first amount) of the depletable chemical polymeric agent in the formulation (in the liquid reservoir) is equal to or less than about 5 wt. %, 4 wt %, 3 wt. %, 2 wt. %, 1 wt. %, 0.5 wt. %, 0.4 wt. %, 0.3 wt. %, 0.2 wt. %, 0.1 wt. %, or equals to or being at least about 0.01 wt. %, at time at least about 0.05%.

In some embodiments the depletable chemical agent is PEI and the first amount thereof is a concentration, by weight, in the formulation (in the liquid reservoir), is at least 0.01%, at least 0.05%, at least 0.10%, at least 0.15% or at least 0.20%.

In some embodiments the depletable chemical agent is PEI and the predetermined threshold value is a concentration, by weight, in the formulation (in the liquid reservoir), being at least 0.01%, at least 0.05%, at least 0.10%, at least 0.15% or at least 0.20%.

In some non-limiting embodiments according to the invention, the first amount of the PEI (in the liquid reservoir) may be 0.25% concentration, by weight, in the treatment formulation (for example 0.75 gr PEI in a liquid reservoir holding 300 L of the treatment formulation). The second amount of the PEI (in the replenishment reservoir) may be 25 wt. % (e.g., in water). When the first amount of the PEI (in the liquid reservoir) is reduced below a predetermined threshold value e.g., 0.01 wt. % (e.g., below said value the PEI no longer fulfill its functionability in the printing process), the method and the system of the invention is configured to transfer a portion of the second amount of the PEI, from the replenishment reservoir to the liquid reservoir, to thereby replenish the amount of the PEI (in the liquid reservoir) to a value being equal to or above the predetermined threshold value e.g., a value being equal to 0.01 wt. % or above 0.01 wt. %, or to replenish the amount of the PEI (in the liquid reservoir) to a value being equal to the first amount e.g., 0.25 wt. % (the latter is an example of a required ×100 dilution of the PEI while being transferred from the replenishment reservoir to the liquid reservoir i.e., transfer of 3 L of the replenishment 25 wt. % solution to the 300 L liquid formulation of the liquid reservoir).

In some embodiments the depletable chemical agent PEI and the first amount thereof is a concentration, by weight, in the formulation (in the liquid reservoir), being at most 6%, at most 5%, at most 4%, at most 3%, at most 2.5%, at most 2.0%.

In some embodiments the depletable chemical agent is PEI and the first amount thereof is a concentration, by weight, in the formulation (in the liquid reservoir), being range of 0.01 to 1%, 0.01 to 0.8%, 0.01 to 0.7%, 0.01 to 0.6%, 0.1 to 0.5%, 0.2 to 0.7%, 0.2 to 0.6%, or 0.2 to 0.5%.

In some embodiments the PEI has an average molecular weight of at least 20,000, at least 50000, at least 100,000, at least 200,000, at least 350,000, at least 500,000, at least 700,000, at least 750,000 and optionally, at most 3,000,000, at most 2,500,000, or at most 2,000,000.

In some embodiments the PEI has an average molecular weight of 750,000

In some embodiments the depletable chemical agent is a polymeric agent being PEI, and wherein said PEI is a surface active agent, a wetting agent, an anchoring agent or any combination thereof.

In some embodiments the PEI is a surface active agent.
In some embodiments the PEI is a wetting agent.
In some embodiments the PEI is an anchoring agent.
In some embodiments the charge densities of the PEI polymer is in the range of 16-20 meq/g of material.
In some embodiments the PEI has a charge density of 8 meq/g.
In some embodiments the depletable chemical agent is silicone functionalized PEI [e.g., X 22 3939A (Shin Edsu.)], the silicon function being of the following structure:

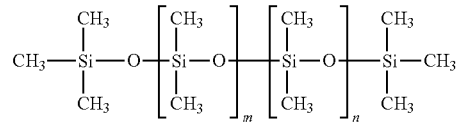

In some embodiments the depletable chemical agent is a quaternary ammonium compound.
In some embodiments the quaternary ammonium compound is Larostat2641A (BASF).
In some embodiments the quaternary ammonium compound is Foamquat SAQ (Linoleamidopropyl Ethyldimonium Ethosulfate 90).
In some embodiments the depletable chemical agent is water dispersible (e.g., polymeric water dispersible).
In some embodiments the depletable chemical agent is water soluble (e.g., water soluble polymer).
In some embodiments the depletable chemical agent is solid at room temperature.

In some embodiments the least one binder in the ink formulation is an anionic binder e.g., an acrylic binder and/or a sulfonic binder. Similar anionic binder are within the scope of the present invention.

In some embodiments the at least one binder in the ink formulation is a negatively charged organic polymeric resin.

In some embodiments the average molecular weight of the negatively charged organic polymeric resin is at least 8,000.

In some embodiments the at least one binder in the ink formulation is an acrylic polymer and/or an acrylic-styrene co-polymer (e.g., with an average molecular weight around 60,000 g/mole).

In some embodiments the at least one binder in the ink formulation is Joncryl® 538 BASF.

In some embodiments the depletable chemical agent is PEI and the reduction in the first amount thereof being due an undesired side reaction thereof with said at least one basic binder e.g., having COO— or SOOO— groups as side chains.

In some embodiments the formulation (in the liquid reservoir) may further comprise at least one competing ingredient which is inert with respect to printing process i.e., possess no functionality in the printing process per-se, wherein the competing agent is selected to rapidly interact (relative to the depletable chemical agent) with the ink one or more contaminating ingredient (e.g., binder), thereby prevent or minimize the depletion of the depletable chemical agent e.g., PEI due to interaction of the competing ingredient (and not the depletable chemical agent) with the contaminating ink ingredients (e.g., ink binder). Non limiting example of such competing ingredient is a poly-anionic material.

To this end, in some embodiments the system may further comprise means to remove the product produced between the at least one competing ingredient and the one or more contaminating ink ingredient.

In some embodiments the system of the invention is for indirect printing, wherein the system further comprises:
   i. an intermediate transfer member (ITM) comprising a release layer surface;
   ii. a treatment station comprising the liquid reservoir configured for holding an aqueous treatment formulation as disclosed herein, the treatment station is configured for applying the aqueous treatment formulation to the release layer surface of the ITM to form thereon a treatment layer;
   iii. a replenishment unit comprising the replenishment reservoir as disclosed herein.
   iv. an image forming station configured for applying a printing liquid to form an image on the aqueous treatment formulation formed on the intermediate transfer member;
   v. a transfer station for transferring the image onto a printing substrate e.g., by pressured contact between the ITM and the printing substrate.

In some embodiments the printing liquid is an ink which is optionally applied by jetting and the system further comprises:
   a drying station configured to at least partially dry the ink on the aqueous treatment formulation formed on the intermediate transfer member to produce an ink-image residue; and optionally drying means for drying the aqueous treatment formulation.

In some embodiments the method in the method of the invention the liquid formulation is configured to be applied on a substrate on which an image is to be printed or on an intermediate transfer member in an indirect printing process.

In some embodiments the method of the invention is utilized in an indirect printing process, wherein the method further comprises:
   i. providing an intermediate transfer member (ITM);
   ii. providing a treatment formulation as disclosed herein;
   iii. applying the treatment formulation to an image receiving surface of the ITM to form a wet treatment layer;
   iv. at least partially drying the wet treatment layer to form an at least partially dry treatment layer;
   v. applying a printing liquid onto the at least partially dried treatment layer to form an image;
   vi. transferring the image to a printing substrate by pressured contact between said surface of the ITM and the printing substrate.

In some embodiments the printing liquid is an ink, optionally an aqueous ink and the method further comprises:
   applying ink droplets on the at least partially dried treatment layer to form an ink image; and
   at least partially drying the wet ink image on the aqueous treatment layer to form a partially dried ink image film to be transferred to a printing substrate.

FIG. 1B provides an illustration of an exemplary printing system that the system of the invention may form part thereof. Specifically, FIG. 1B is a schematic side view of a digital printing system 10, in accordance with some embodiments of the invention. In some embodiments, system 10 comprises a rolling flexible blanket 12 that cycles through an image forming station 14, a drying station 16, an impression station 18 and a blanket treatment station 20.

As used herein the term "blanket" refers to a flexible transfer member that can be mounted within a printing device to form a belt-like structure on two or more rollers, at least one of which is able to rotate and move the blanket (e.g. by moving the belt thereof) to travel around the rollers.

As used herein, the terms "blanket" and "intermediate transfer member" (ITM) are used interchangeably and refer to a flexible member comprising at least a release layer used as an intermediate member configured to receive an ink image and to transfer the ink image to a target substrate, as detail herein.

In an operative mode, image forming station 14 is configured to form a mirror ink image, also referred to herein as "an ink image" (not shown), of a digital image on an upper run of a surface of blanket 12. Subsequently the ink image is transferred to a target substrate, (e.g., a paper, a folding carton, or any suitable flexible package in a form of sheets or continuous web) located under a lower run of blanket 12.

As used herein, the terms "ink image" and "image" are interchangeable. At times, said terms refer to a printed image formed on blanket 12 and transferred to a target substrate. At times they refer to the an image on the substrate itself (e.g., a paper, a folding carton, or any suitable flexible package in a form of sheets or continuous web). Thus, these terms should be interpreted in the context of the text in which they are used.

As used herein, the term "run" refers to a length or segment of blanket 12 between any two given rollers over which blanket 12 is guided.

In some embodiments, during installation blanket 12 may be adhered (e.g., seamed) edge to edge to form a continuous blanket loop (not shown). An example of a method and a system for the installation of the seam is described in detail in U.S. Provisional Application 62/532,400, the disclosure thereof is incorporated herein by reference.

In some embodiments, image forming station 14 typically comprises multiple print bars 22, each mounted (e.g., using a slider) on a frame (not shown) positioned at a fixed height above the surface of the upper run of blanket 12. In some embodiments, each print bar 22 comprises a strip of print heads as wide as the printing area on blanket 12 and comprises individually controllable print nozzles.

In some embodiments, image forming station 14 may comprise any suitable number of bars 22, each bar 22 may contain a printing fluid, such as an aqueous ink of a different color. The ink typically has visible colors, such as but not limited to cyan, magenta, red, green, blue, yellow, black and white. In the example of FIG. 1B, image forming station 14 comprises seven print bars 22, but may comprise, for example, four print bars 22 having any selected colors such as cyan, magenta, yellow and black.

In some embodiments, the print heads are configured to jet ink droplets of the different colors onto the surface of blanket 12 so as to form the ink image (not shown) on the surface of blanket 12.

In some embodiments, different print bars 22 are spaced from one another along the movement axis of blanket 12, represented by an arrow 24. In this configuration, accurate spacing between bars 22, and synchronization between directing the droplets of the ink of each bar 22 and moving blanket 12 are essential for enabling correct placement of the image pattern.

In some embodiments, system 10 comprises heaters, such as hot gas or air blowers 26, which are positioned in between print bars 22, and are configured to partially dry the ink droplets deposited on the surface of blanket 12.

This hot air flow between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 12 from undesirably merging into one another. In some embodiments, system 10 comprises a drying station 16, configured to blow hot air (or another gas) onto the surface of blanket 12. In some embodiments, drying station comprises air blowers or any other suitable drying apparatus.

In drying station 16, the ink image formed on blanket 12 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket transportation assembly 26, configured to move a rolling ITM, such as a blanket 12. In some embodiments, blanket transportation assembly 26 comprises one or more rollers 28, wherein at least one of rollers 28 comprises an encoder (not shown), which is configured to record the position of blanket 12, so as to control the position of a section of blanket 12 relative to a respective print bar 22. In some embodiments, the encoder of roller 28 typically comprises a rotary encoder configured to produce rotary-based position signals indicative of an angular displacement of the respective roller.

Additionally or alternatively, blanket 12 may comprise an integrated encoder (not shown) for controlling the operation of various modules of system 10. The integrated encoder is described in detail, for example, in U.S. Provisional Application 62/689,852, the disclosure of which is incorporated herein by reference.

In some embodiments, system 10 comprises an impression station 18, wherein blanket 12 passes between an impression cylinder and a pressure cylinder 32, which is configured to carry a compressible blanket.

In some embodiments, system 10 comprises a control console (not shown), which is configured to control multiple modules and assemblies of system 10.

In some embodiments, blanket treatment station 20, which can also serve as a cooling station, is configured to treat the blanket by, for example, cooling it and/or applying a treatment fluid to the outer surface of blanket 12, and/or cleaning the outer surface of blanket 12. The treatment may be carried out by passing blanket 12 over one or more rollers or blades configured for applying cooling and/or cleaning and/or treatment fluid on the outer surface of the blanket.

In the example of FIG. 1B, station 20 is mounted between two specific rollers 28, yet, station 20 may be mounted adjacent to blanket 12 at any other suitable location between impression station 18 and image forming station 14.

In some embodiments the liquid reservoir of the system of the invention forms part of station 20.

In some embodiments the replenishment reservoir of the system of the invention forms part of station 20.

In some embodiments, impression cylinder 30 of impression station 18, is configured to impress the ink image onto the target substrate, such as an individual sheet 34, conveyed by substrate transport module 36 (schematically shown) from an input stack 38 to an output stack 40 via impression cylinder 30. In some embodiments, the target substrate may comprise any suitable substrate, such as but not limited to a flexible substrate, a partially flexible substrate (e.g., having flexible sections and rigid sections or a rigid substrate.

In some embodiments, system 10 comprises an additional impression station (not shown), so as to permit duplex printing (i.e., printing on both sides of sheet 34).

In alternative embodiments, a different configuration of substrate conveyor 36 may be used for printing on a continuous web substrate. Detailed descriptions and various configurations of sheet-fed simplex and duplex printing systems and of systems for printing on continuous web substrates are provided, for example, in U.S. Pat. Nos. 9,914,316 and 9,186,884, in PCT International Publication WO2013/132424, in U.S. Patent Application Publication 2015/0054865, and in U.S. Provisional Application 62/596,926, the disclosure of each is incorporated herein by reference.

The particular configurations of system 10 are shown by way of example. Embodiments of the present invention, however, are by no means limited to this specific sort of example systems, and the principles described herein may similarly be applied to any other sorts of printing systems.

In some embodiments the formulation e.g., treatment formulation (in the liquid reservoir) may further comprise one or more of (a) at least one water soluble polymer; (b) at least one surfactant; (c) at least one humectant and (d) at least one wetting agent.

In some embodiments the formulation e.g., treatment formulation (in the liquid reservoir) may further comprise least one particulate material selected from (i) at least one thermoplastic polymeric particulate material; (ii) at least one thermosetting polymeric particulate material; or (iii) a combination thereof.

As used herein the term "thermosetting polymeric particulate material" or any lingual variations thereof refers to a particulate material which a is polymeric material (e.g., having relatively high molecular wright) that becomes irreversibly hardened upon being cured e.g., by the action of heat or suitable radiation). Once hardened this material cannot be re-melted.

Non limiting examples of thermosetting polymeric particulate material are polytetrafluoroethylene (PTFE), perfluoroalkoxy alkane (PEA) or fluorinated ethylene propylene (FEP).

In some embodiments the thermosetting polymeric particulate material is PTFE.

As used herein the term "thermoplastic polymeric particulate material" or any lingual variations thereof refers to a particulate material which is a polymeric material (e.g., having relatively high molecular weight) that becomes pliable or moldable above a specific temperature and solidifies upon cooling. This material can be re-melted and reshaped.

Non limiting examples of thermoplastic polymeric particulate material are wax particulate materials.

In some embodiments the wax particulate materials is an oxidized polyethylene wax particulate material.

In some embodiments the wax particulate material is a coated wax particulate material.

In some embodiments the coated wax particulate material is a wax particulate material coated with silicon dioxide.

Treatment formulations comprising such particulate materials are disclosed in the U.S. Provisional Application No. 62/787,984, U.S. Provisional Application No. 62,825,568 and International Application No. PCT/IB2020/050001, the content of each is incorporated herein by reference.

In some embodiments the formulation e.g., treatment formulation (in the liquid reservoir) may further comprise at least one modified polysaccharide (e.g., cellulose derivative, cellulose ether, methylcellulose and hydroxypropyl methylcellulose).

As used herein the term "modified polysaccharide" refers to polymeric carbohydrate molecule composed of long chains of monosaccharide units bound together by glycosidic linkages wherein at least one of the hydrogen atoms of the hydroxyl groups in the monosaccharide unit is replaced with another group e.g., R.

Treatment formulations comprising such modified polysaccharides are disclosed in U.S. Provisional Application No. 62/790,890, U.S. Provisional Application No. 62,825,568 and International Application No. PCT/M2020/050001, the content of each is incorporated herein by reference.

In some embodiments the formulation (in the liquid reservoir) optionally may further comprise at least one antibacterial agent.

In some embodiments the formulation e.g., the treatment formulation (in the liquid reservoir) comprises:
  at least one water soluble polymer;
  at least one particulate material selected from at least one thermoplastic polymeric particulate material, optionally in the form of an emulsion and/or a dispersion, (ii) at least one thermosetting polymeric particulate material, optionally in the form of a dispersion and/or an emulsion; or (iii) a combination thereof;
  a carrier liquid containing water; and
  optionally, one or more of (a) at least one humectant; (b) at least one surfactant and (c) at least one wetting agent.

In some embodiments the water soluble polymer may be at least one modified polysaccharide (e.g., cellulose derivative, cellulose ether, methylcellulose and hydroxypropyl methylcellulose).

In some embodiments the modified polysaccharide is hydroxypropyl methylcellulose.

In some embodiments the water soluble polymer may be selected from the group consisting of polyvinyl alcohol, water-soluble cellulose, polyvinylpyrrolidone (PVP), polyethylene oxide, and water-soluble acrylates.

In some embodiments the water soluble polymer may be Polyethylene oxide chain (PEO) or polypropylene oxide chain (PPO) based polymer.

In some embodiments the concentration of the water soluble polymer in formulation (in the liquid reservoir) may be within a range of 0.5 to 8%, 2.5 to 6.5%, 2.5 to 6%, 2.5 to 5.5%, or 2.5 to 5%, optionally being of at most 10% or at most 8% or at most 6% or at most 5%.

In some embodiments the solubility in water of the at least one water soluble polymer (in the liquid reservoir), at 25° C., is at least 2%, at least 7%, at least 10%, at least 12%, at least 15%, at least 20%, or at least 25%, and optionally, at most 80% or at most 60%.

In some embodiments the surfactant may be a non-ionic surfactant e.g., a non-ionic silicone-containing surfactant.

In some embodiments the formulation (in the liquid reservoir) has a total surfactant concentration of at least 0.3%, at least 0.5%, at least 0.75%, at least 1%, at least 2%, at least 3%, at least 4%, at least 5%, at least 6%, at least 7%, at least 8%, at least 9%, at least 10%, at least 11%, at least 12% and optionally, within a range of 6 to 40%, 6 to 30%, 6 to 20%, 7 to 30%, 7 to 20%, 7 to 15%, 8 to 25%, 8 to 20%, 8 to 15%, 8 to 13%, 9 to 25%, 9 to 20%, 9 to 15%, 9 to 13%, 10 to 25%, 10 to 20%. 10 to 15%, or 10 to 13%.

In some embodiments the formulation the liquid reservoir) contains at least 6%, at least 7%, at least 8%, at least 9%, or at least 10%, by weight, of the non-ionic surfactant.

In some embodiments the formulation (in the liquid reservoir) contains at most 18%, at most 16%, at most 15%, at most 14%, or at most 13%, by weight, of the non-ionic surfactant.

In some embodiments the concentration of the non-ionic surfactant within the formulation (in the liquid reservoir), by weight, is within a range of 0.5%-18%, 1-18%, 2-16%, 6.5-18%, 6.5-16%, 7.5-18%, 7.5-16%, 8.5-18%, 8.5-16%, 9.5-18%, 9.5-16%, 10.5-18%, or 10.5-16%.

In some embodiments the solubility in water of the non-ionic surfactant, at 25° C., is at least 2%, at least 8%, at least 10%, at least 12%, at least 15%, at least 20%, at least 25%, or at least 30%, and optionally, at most 80% or at most 60%.

In some embodiments the non-ionic surfactant is a polyethoxylated sorbitan ester.

In some embodiments, the polyethoxylated sorbitan ester includes at least one species or at least two species selected from the group consisting of PEG-4 sorbitan monolaurate, PEG-20 sorbitan monolaurate, PEG-20 sorbitan monopalmitate, PEG-20 sorbitan monostearate, and PEG-20 sorbitan monooleate.

In some embodiments an HLB number of said non-ionic surfactant is at least 11, at least 12, at least 13, at least 14, or at least 14.5, and optionally, at most 22, at most 21, at most 20, at most 19, at most 18, or at most 17, and further optionally, within a range of 11 to 25, 11 to 23, 11.5 to 21, 11.5 to 20, 11.5 to 18, 12.5 to 21, 12.5 to 20, 12.5 to 18, 13.5 to 21, 13.5 to 20, 13.5 to 18, 14 to 20.5, 14 to 18.5, 14.5 to 20, 14.5 to 19, 14.5 to 18, or 14.5 to 17.5.

In some embodiments the formulation the liquid reservoir) gins at least 6%, at least 7%, at least 8%, at least 9%, or at least 10%, by weight, of c non-ionic surfactant.

In some embodiments the formulation (in the liquid reservoir) contains at most 18%, at most 16%, at most 15%, at most 14%, or at most 13%, by weight, of the non-ionic surfactant.

In some embodiments the non-ionic surfactant n the formulation (in the liquid reservoir), by weight, is within a range of 2-18%, 5.5-18%, 5.5-16%, 6.5-18%, 6.5-16%, 7.5-18%, 7.5-16%, 8.5-18%, 8.5-16%, 9.5-18%, 9.5-16%, 10.5-18%, or 10.5-16%.

In some embodiments the solubility in water of the non-ionic surfactant, at 25° C., is at least 2%, at least 8%, at least 10%, at least 12%, at least 15%, at least 20%, at least 25%, or at least 30%, and optionally, at most 80% or at most 60%.

In some embodiments the concentration of the non-ionic surfactant within the treatment (in the liquid reservoir), by weight, is within a range of 2-18%, 1-18%, 1-15%, 1-12%, 1-10%, 1-8%, 2-18%, 2-15%, 2-12%, 2-10%, 2-8%, 3-18%, 3-15%, 3-12%, 3-10%, 3-8%, or 4-18%, 4-15%, 4-12%, 4-10%, or 4-8%.

In some embodiments the formulation (in the liquid reservoir) comprises a further non-ionic silicone-containing surfactant selected from a polysiloxane-polyoxyalkylene copolymer, and wherein optionally, a concentration of said polysiloxane-polyoxyalkylene copolymer is at least 0.3%, at least 0.5%, at least 0.75%, or at least 1.0%, by weight, and further optionally, at most 5%, at most 4%, at most 3%, at most 2.5%, at most 2%, or at most 1.75%, by weight.

In some embodiments the formulation (in the liquid reservoir) contains at least 0.3%, at least 0.5%, at least 0.75%, or at least 1.0%, by weight and optionally, at most 5%, at most 4%, at most 3%, at most 2.5%, at most 2%, or at most 1.75%, by weight, of the further, non-ionic silicone-containing surfactant.

In some embodiments, the further, non-ionic silicone-containing surfactant includes a polysiloxane-polyoxyalkylene copolymer, and wherein optionally, a concentration of said polysiloxane-polyoxyalkylene copolymer is at least 0.3%, at least 0.5%, at least 0.75%, or at least 1.0%, by weight, and further optionally, at most 5%, at most 4%, at most 3%, at most 2.5%, at most 2%, or at most 1.75%, by weight.

In some embodiments the formulation (in the liquid reservoir) contains at least 0.3%, at least 0.5%, at least 0.75%, or at least 1.0%, by weight and optionally, at most 5%, at most 4%, at most 3%, at most 2.5%, at most 2%, or at most 1.75%, by weight, of said further, non-ionic silicone-containing surfactant.

In some embodiments the formulation (in the liquid reservoir) has a total surfactant concentration of at least 2%, at least 6%, at least 7%, at least 8%, at least 10%, or at least 12%, and optionally, within a range of 6 to 40%, 6 to 30%, 6 to 20%, 7 to 30%, 7 to 20%, 7 to 15%, 8 to 25%, 8 to 20%, 8 to 15%, 8 to 13%, 9 to 25%, 9 to 20%, 9 to 15%, 9 to 13%, 10 to 25%, 10 to 20%, 10 to 15%, or 10 to 13%.

In some embodiments the formulation (in the liquid reservoir) comprises at least one wetting agent.

In some embodiments the wetting agent is PEI.

In some embodiments the PEI is one or nore of PEI detailed in Table 1 below:

TABLE 1

Exemplary PEIs

| Chemical Agent [Brand name] | Charge Density, meq/g | Molecular Weight |
|---|---|---|
| Polyethyleneimine (PEI) [Lupasol ® FG] | 16 | 800 |
| PEI [Lupasol ® G 100] | 17 | 5,000 |
| PEI [Lupasol ® G 20] | 16 | 1,300 |

TABLE 1-continued

Exemplary PEIs

| Chemical Agent [Brand name] | Charge Density, meq/g | Molecular Weight |
|---|---|---|
| PEI [Lupasol ® G 20 Waterfree] | 16 | 1,300 |
| PEI [Lupasol ® G 35] | 16 | 2,000 |
| PEI [Lupasol ® HF] | 17 | 25,000 |
| PEI [Lupasol ® P] | 20 | 750,000 |
| PEI, modified [Lupasol ® PN 50] | | 1,000,000 |
| PEI, modified [Lupasol ® PN 60] | | n/a |
| PEI, modified [Lupasol ® PO 100] | | 2,000 |
| PEI [Lupasol ® PR 8515] | 16 | 2,000 |
| PEI [Lupasol ® PS] | 20 | 750,000 |
| PEI, modified [Lupasol ® SK] | 8 | 2,000,000 |
| PEI [Lupasol ® WF] | 17 | 25,000 |

In some embodiments the PEI is provided in an aqueous solution (Lupasol® PS, BASF).

Non limiting examples of applicable depletable chemical agents are N-Hance™ BF 17 cationic guar, N-Hance™ CCG 45 cationic guar, N-Hance™ HPCG 1000 cationic guar, N-Flance™ BF 13 cationic guar, N-Hance™ CG 13 cationic guar, N-Hance™ 3196 cationic guar (all from Ashland Specialty Ingredients)

In some embodiments the depletable chemical agent is guar hydroxypropyltrimonium chloride (GHPTC).

In some embodiments the depletable chemical agent is hydroxyl guar hydroxypropyltrimonium chloride (HGHPTC).

Further non limiting examples of applicable depletable chemical agents are listing in Table 2 below:

TABLE 2

Exemplary depletable chemical agents

| Chemical Agent [Brand name] | Charge Density, meq/g | Molecular Weight |
|---|---|---|
| Poly(diallyldimethylammonium chloride) | ~6 (calc.) | 200,000-300,000 |
| Poly(4-vinylpyridine) | 7 (calc.) | 60,000-160,000 |
| Polyallylamine | 17.5 (calc.) | 17,000 |

Further non limiting examples of applicable depletable chemical agents are listing in the Table 3 below:

TABLE 3

Exemplary depletable chemical agents

| chemical agent, | Material | Viscosity | Charge density |
|---|---|---|---|
| Lupasol PS | PEI | | Very high |
| CG 13 | GHPTC | High | Medium |
| BF 13 | GHPTC | High | Medium |
| 3196 | GHPTC | High | Medium |
| BF 17 | GHPTC | High | Very High |
| CCG 45 | GHPTC | Low | Medium |
| Hpcg 1000 | HGHPTC | Medium | Medium |

Further details on treatment formulations suitable for the methods and systems according to the present invention are disclosed e.g., in WO2013/132418, WO 2013/132339 and WO2019/111223, the content of each is incorporated herein by reference.

Further details of non-limiting examples of ink compositions suitable for the printing processes and systems of the present invention are disclosed in WO 2013/132439, PCI/111313/51755 (WO2013/132439) or US2015/0025179, PCT/IB14/02395 (WO2015/036865) or U.S. Ser. No. 14/917,461, all of which are hereby incorporated by reference.

In some embodiments the formulations e.g., treatment formulations and ink formulations are as herein disclosed and exemplified.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention.

DETAILED DESCRIPTION OF EMBODIMENTS

The following examples are not in any way intended to limit the scope of the invention as claimed.

Example 1: to Aqueous Treatment Formulation

Exemplary aqueous treatment formulation used in the present study and referred to herein as V1, V2 and V3 are provided in Table 4. Table 5 and Table 6 respectively.

The treatment formulation V1 was prepared by mixing the ingredients listed herein below in Table 4:

TABLE 4

Treatment Formulation V1

| Ingredient | Concentration (% w/w) | Role of ingredient |
| --- | --- | --- |
| PVA 6-88 | 3.75% | Water soluble polymer |
| BYK LPX 23289 | 1.50% | Surfactant |
| Loxanol P | 0.25% | Wetting agent |
| Sugar | 6.50% | Humectant |
| Tego 280 | 1.10% | Surfactant |
| Tween20 | 12.00% | Surfactant |
| K12N | 0.20% | Antibacterial agent |
| Water | 74.7% | |

Treatment formulation V2 was prepared by mixing the ingredients listed herein below in Table 5:

TABLE 5

Treatment Formulation V2

| Ingredient | Concentration (% w/w) | Role of ingredient |
| --- | --- | --- |
| Metochel K-3 | 3.38% | Binder (water soluble polymer) |
| BYK LPX 23289 | 1.35% | Surfactant |
| Loxanol P | 0.23% | Wetting agent |
| Sugar | 5.85% | Humectant |
| Tego 280 | 0.99% | Surfactant |
| Tween20 | 10.80% | Surfactant |
| K12N | 0.20% | Antibacterial agent |
| Water | 77.2% | |

Treatment formulation V3 was prepared by mixing the ingredients listed herein below in Table 6:

TABLE 6

Treatment Formulations V3

| Ingredient | Concentration (% w/w) | Role of ingredient |
| --- | --- | --- |
| Metochel K-3 | 3.38% | Binder (water soluble polymer) |
| BYK LPX 23289 | 1.35% | Surfactant |
| Loxanol P | 0.23% | Wetting agent |
| Sugar | 5.85% | Humectant |
| Tego 280 | 0.99% | Surfactant |
| Tween20 | 14.80% | Surfactant |
| K12N | 0.20% | Antibacterial agent |
| Water | 73.2% | |

It is noted that the ingredients of the treatment formulation according to the present invention can be mixed in any suitable manner to form a composition that can be applied as a coating onto an intermediate transfer member. At times the mixed ingredients may form a dispersion. To this end, the system of the invention is configured to provide mixing means to provide a homogenous dispersion of the treatment formulation.

Example 2: Ink Formulation

Preparation of Pigments

Pigments used in the examples described below are generally supplied with initial particle size of a few micrometers. Such pigments were ground to submicron range in presence of the dispersing agent, the two materials being fed to the milling device (bead mill) as an aqueous mixture. The progress of milling was controlled on the basis of particle size measurements (for example, a Malvern or Nanosizer instrument). The milling was stopped when the average particle size (dv50) reached 70 to 100 nm.

Exemplary Ink Composition

In the present example, the preparation of an ink composition is described: Heliogen® Blue D7079 was milled with Disperbyk® 190, as described, and the materials were mixed in the following proportion:

| | |
| --- | --- |
| Heliogen ® Blue D7079 | 30 g |
| Disperbyk ® 190 (40%) | 30 g |
| Water | 140 g |
| Total | 200 g |

The milled concentrate, having a Dv50 of less than 100 nm, typically between 70 and 100 mn, was further diluted with 50 g water and extracted from the milling device at Ca. 12 wt % pigment concentration. The millbase concentrate was further processed as below described for the preparation of an ink composition.

In a first stage, 2.4 g of sodium dodecanoate were added to 200 g of the millbase concentrate to yield a millbase. The mixture was stirred to homogeneity (5' magnetic stirrer at 50 rpm) and incubated at 60° C. for 1 day. The mixture was then left to cool down to ambient temperature.

In a second stage, ink ingredients were added to the millbase as follows:

| | |
| --- | --- |
| Millbase Concentrate (from stage 1) | 202.4 g |
| Joncryl ® 538 (46.5%) | 154.8 g |
| BYK ® 349 | 5 g |
| BYK ® 333 | 2 g |

-continued

| | |
|---|---|
| Propylene Glycol | 240 g |
| Water | 595.8 g |
| Total | 1200 g |

The mixture was stirred for 30 minutes at ambient temperature, resulting in an ink-able ink composition having a viscosity of less than 10 cP.

Example 3: Study the Factors that Affect the Life Time of a Treatment Formulation A stock of the treatment formulation was prepared at an amount of about 200 L.

About 0.5 gr of the treatment formulation was consumed per printed page in the printing process, for the purpose of coating the ITM.

Replenishment of the treatment formulations with additional amount of the treatment formulation (all ingredients included) was required based on the amount consumed (about weekly replenishment of 100 L, out of total ~300 L, total replenishment usage of about 300 L per month).

The inventors of the present invention have realized the need to replenish the treatment formulation in a very frequent manner that does not reflect the need to replenish it based on a calculation of 0.5 gr of the treatment formulation per printed page.

To reduce to minimum (zero) usage of the treatment formulations beyond printing needs the effect of various factors was tested as detailed herein below:

Viscosity and Surface Tension Measurements:

The viscosity and the surface tension of the treatment formulation were tested for a period of 6 months both at room temperature and at 50° C.

Figure 2:
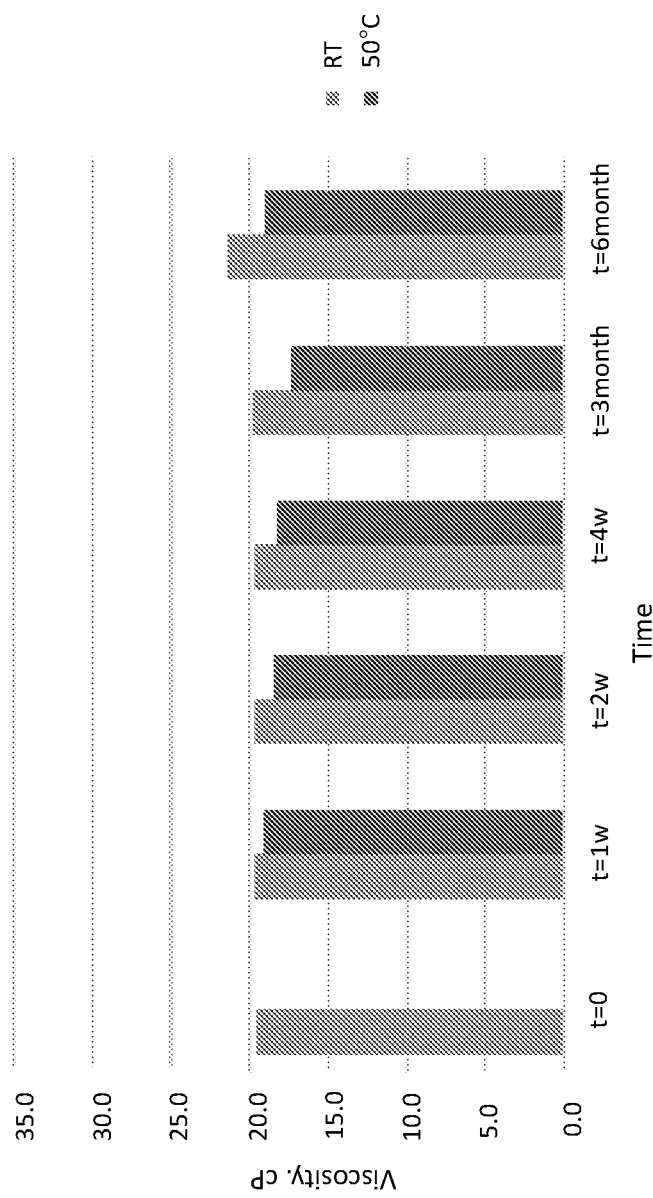
FIG. 2 displays a diagram representing measurements of averaged viscosity vs. time of a treatment formulation according to some embodiments of the invention.
Figure 3:
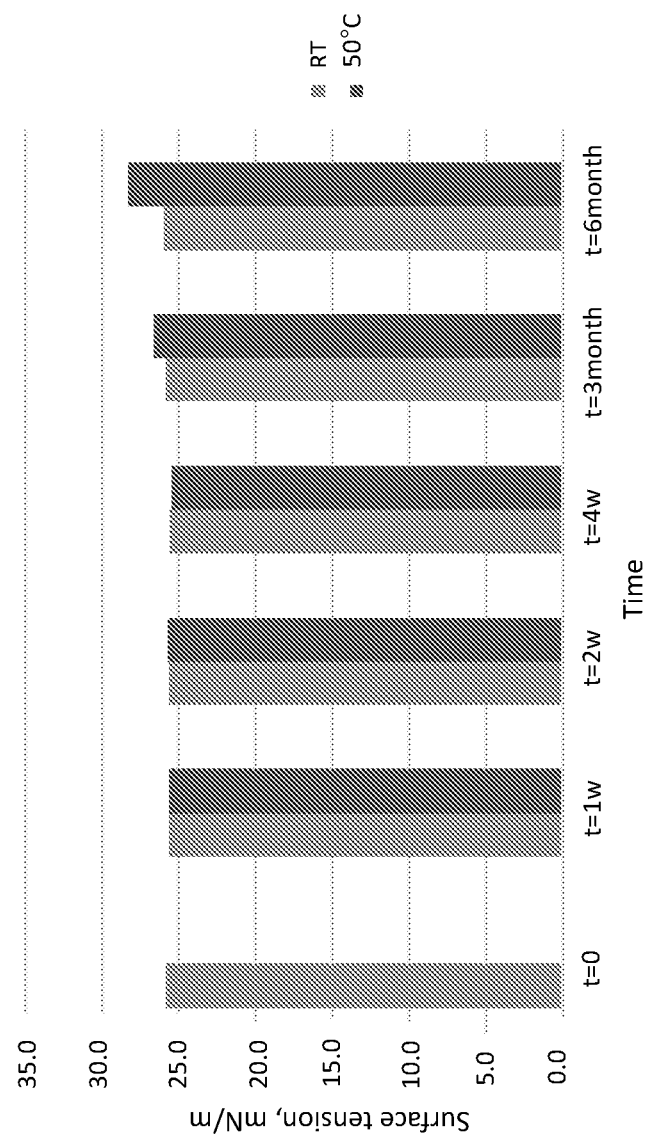
FIG. 3 displays a diagram FIG. 3 displays a diagram representing measurements of averaged surface tension vs. time of a treatment formulation according to some embodiments of the invention.

The results are illustrated in FIG. 2 and FIG. 3.

FIG. 2 displays a diagram representing measurements of averaged viscosity of the treatment formulation vs, time. FIG. 3 displays a diagram representing measurements of averaged surface tension of the treatment formulation vs. time.

FIG. 2 and FIG. 3 both illustrate that the treatment formulation maintained its physical properties during time.

Printing Quality Measurements as a Function of the Aging and the Temperature of the Treatment Formulation:

The printing quality as a function of the age and temperature of the treatment solution was studied.

FIGS. 4A-4C display a section of a printed image obtained in an indirect printing process utilizing a freshly prepared treatment formulation (t=0) (FIG. 4A), a treatment formulation of one month old, at room temperature (FIG. 4B), and a treatment formulation of one month old, at 50° C. (FIG. 4C).

FIGS. 4A-4C illustrate that no change in the printing quality was observed due to aging of the treatment formulation (up to 1 month) and that the formulation maintained it performance properties both at room temperature and 50° C. for at least 1 month, Printing Quality Measurements as a Function of the Usage of Treatment Formulation:

Problematic treatment formulations from presses, that provided low printing quality determined based on print graininess, were tested.

No difference in the physical properties thereof compared to freshly prepared treatment formulation was measured.

Figure 5B:
FIGS. 5A-5B display a printed image obtained in an indirect printing process utilizing a fresh treatment formulation that has not been previously used (FIG. 5A) and a treatment formulation that has been used in the printing process for several printing cycles (FIG. 5B), according to some embodiments of the invention.
Figure 5A:

FIGS. 5A-5B display a printed image obtained in an indirect printing process utilizing a fresh treatment formulation that has not been previously used (FIG. 5A) and a treatment formulation that has been used in the printing process for several printing cycles (FIG. 5B).

FIGS. 5A-5B clearly illustrate the low quality of the image produced utilizing a used treatment formulation.

Printing Quality Measurements as a Function of the Usage of Treatment Formulation and as a Function of the Aging of the Blanket:

The effect of the aging of the blanket and the combination thereof with utilizing a treatment formulation from press was tested.

Figures 6C, 6D:
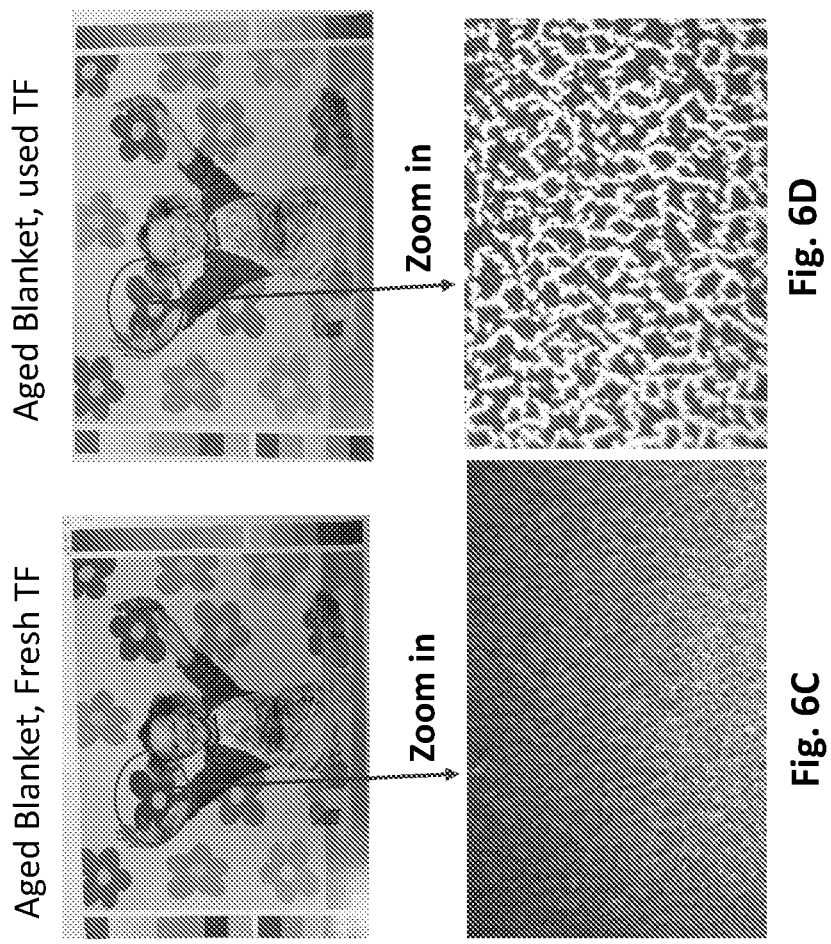

FIGS. 6A-6D display a printed image and an enlarged (zoom in) section thereof obtained in an indirect printing process utilizing the following combinations: fresh blanket, fresh treatment formulation (FIG. 6A), Fresh blanket, used treatment formulation (FIG. 6B), Aged blanket, fresh treatment formulation (FIG. 6C) and Aged blanket, used treatment formulation (FIG. 6C).

FIGS. 6A-6D illustrate that image high graininess is indicative of low quality of the treatment solution that required refreshment of the stock of the treatment formulation in the printing machine. At times, refreshment was insufficient to minimize the graininess of the image and full replacement of the treatment formulation in the printing process was required.

The Effect of the Treatment Formulations Age and Temperature on the Image Graininess:

The effect of the temperature and the aging of the treatment formulation on the image quality as reflected from the graininess of the image was tested.

Fresh treatment formulations (not used in a printing process) were used.

Three time points were determined as t=0, t=1d (one day) and t=3d (three days), and two temperatures i.e., room temperature and 50° C.

The experiment was used utilizing 2 h aged Blanket at 135° C.

Graininess—K570, 70%, QEA (K570—black ink, 70%—coating percentage of black ink in printing, QEA—digital microscope).

Figure 7:
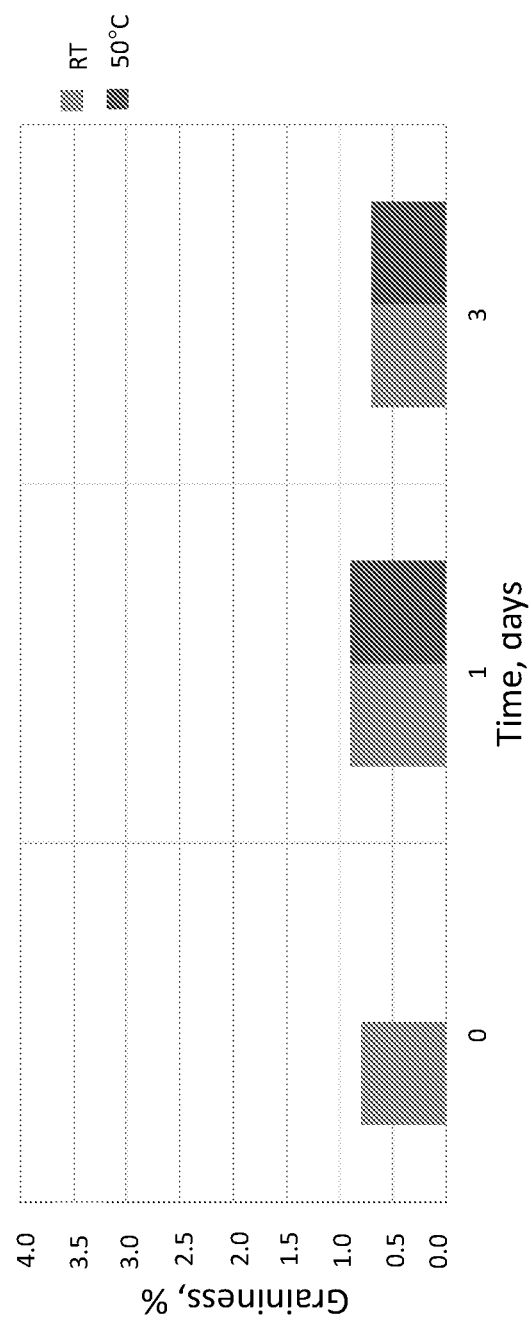
FIG. 7 displays a diagram representing the effect of the aging (time) and the temperature of a treatment formulation on the graining of a printed image produced in an indirect printing process according to some embodiments of the invention.

FIG. 7 displays a diagram representing the effect of the aging (time) and the temperature of a treatment formulation on the graining of the printed image.

As reflected in FIG. 7, the studied time frame and the temperatures had no impact on the graininess of the images formed.

The Effect of Ink Contamination and Filtration on the Image Graininess:

The effect of ink contamination on the image graininess was tested.

Fresh treatment formulations (not used in a printing process) were used.

Three time points were determined as t=0, t=1d (one day) and t=3d (three days). Two temperatures were studied: room temperature and 50° C.

The experiment was used utilizing 2 h aged Blanket at 135° C.

Graininess—K570, 70%, QEA (K570—black ink, 70%—coating percentage of black ink in printing, QEA—digital microscope).

Ink formulations (YMCK) were introduced into the fresh treatment formulations at 4% and 8% wt.

Some formulations were filtered as detailed below.

Figure 8:
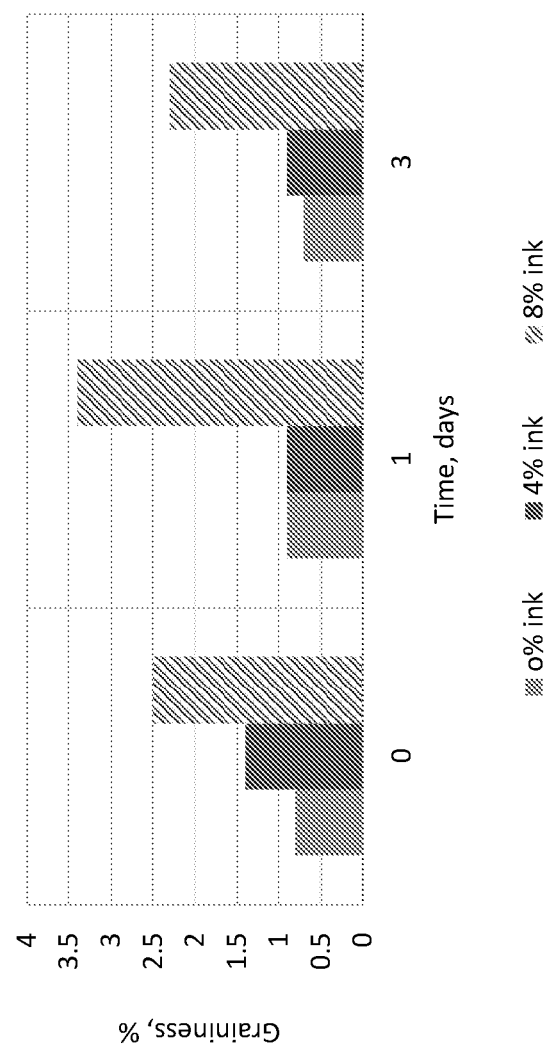
FIG. 8 displays a diagram representing the effect of ink contamination in a treatment formulation (at room temperature, RT) on the graining of a printed image produced in an indirect printing process according to some embodiments of the invention.

FIG. 8 displays a diagram representing the effect on the graining of a printed image produced with a treatment formulation with ink contamination, at room temperature.

FIG. 9 displays a diagram representing the effect on the graining of a printed image produced with a treatment formulation with ink contamination, at 50° C.

Figure 10A:
FIGS. 10A-10D display printed images obtained in an indirect printing process utilizing a fresh TF, an ink contaminated TF (of different ages and temperatures) and filtered treatment formulations according to some embodiments of the invention.
Figure 10B:
Figure 10D:

FIGS. 10A-10D display a printed image obtained in an indirect printing process utilizing a fresh TF (FIG. 10A), an ink contaminated TF, 3 days old, at 50° C. (FIG. 10B), an ink contaminated fresh TF at room temperature, filtered (FIG. 1.0C) and an ink contaminated TF of 3 days old, at 50° C., filtered (FIG. 10D).

FIGS. 8, 9 and 10A-10D clearly illustrate that ink contamination has significant negative impact on the treatment formulations properties which are essential to the printing process, as reflected in the observed increased graininess of the images produced with treatment formulations into which ink formulations was introduced. The negative effect of the ink contamination on the treatment formulations properties was observed both at room temperature and at 50° C. Filtration of the contaminated treatment formulations did not improved the performance of the treatment formulation.

Figure 10C:

Timewise, it is noted that low printing quality was also observed with freshly prepared treatment formulation (at time zero) into which ink formulation was introduced (FIG. 8) i.e., the negative effect of the ink contamination is immediate. This negative effect is not cured by filtering of the ink contaminated treatment formulation (FIG. 10C).

The Effect of Ink Contamination on the PEI Performance:

The above results indicated that while aging of the treatment formulation and the temperature thereof do not affect the performance thereof, ink contamination strongly affects the function ability of the treatment formulation, resulting with the need to refresh the treatment formulation (i.e., to add fresh treatment formulation to the liquid reservoir holding same in the printing process. At times, the quality of the treatment formulation is harmed to such a great extent that discard of same was required.

The negative effect of the ink contamination was not negated by filtration of the contaminated treatment formulation, implying that it is a reaction between one of the inks components and the treatment formulation that affects the quality of the treatment formulation.

The inventors have studied the possibility that reduction in the amount of the chemical agent PEI in the treatment formulation will affect the quality thereof. Specifically, the inventors investigated if reduction in the amount thereof will negatively affect the wetting of the treatment formulation which is necessary for good performance thereof.

Figure 11B:
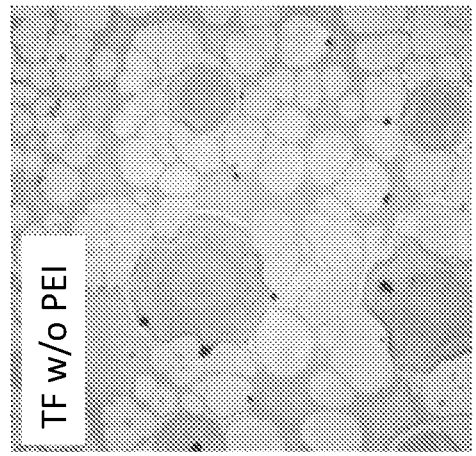
FIGS. 11A-11B display an image (Zygo ×50) of a Polyethylene Terphtalate (PET) slide coated with a treatment formulation with polyethylenimine (PEI) (FIG. 11A) and without PEI (FIG. 11B), according to some embodiments of the invention.
Figure 11A:
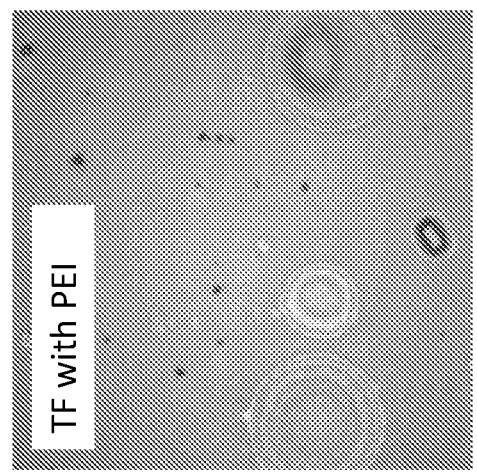

FIGS. 11A-11B display an image of a Polyethylene Terphtalde (PET) slide coated with a treatment formulation with PEI (FIG. 11A) and without PEI (FIG. 11B). It is clear from FIGS. 11A-11B that the coating in the absence of PEI is less homogeneous, indicating wetting problems (reduction of wetting ability) in the absence of PEI.

Figure 12:
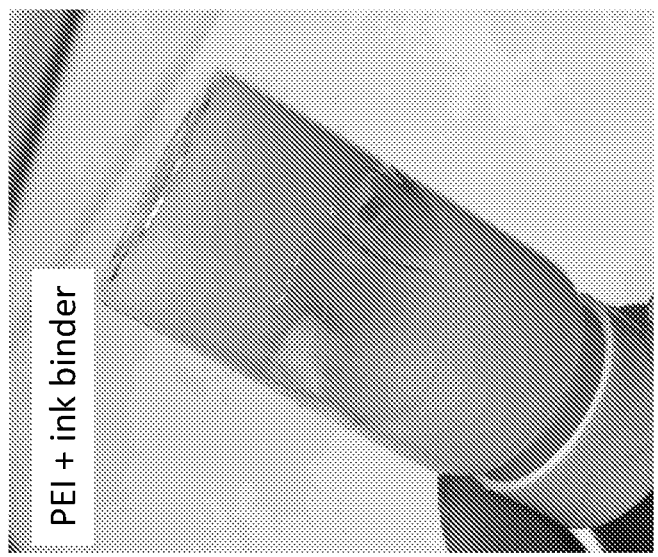
FIG. 12 illustrates phase separation and precipitation observed in a glass tube upon addition of an ink binder into a solution of PEI.

The inventors have surprisingly found that PEI interacts with the binder of the ink formulation. FIG. 12 illustrates the observed phase separation and precipitation upon addition of the ink binder Joncryl 538 BASF into PEI solution.

Figures 13A, 13B:
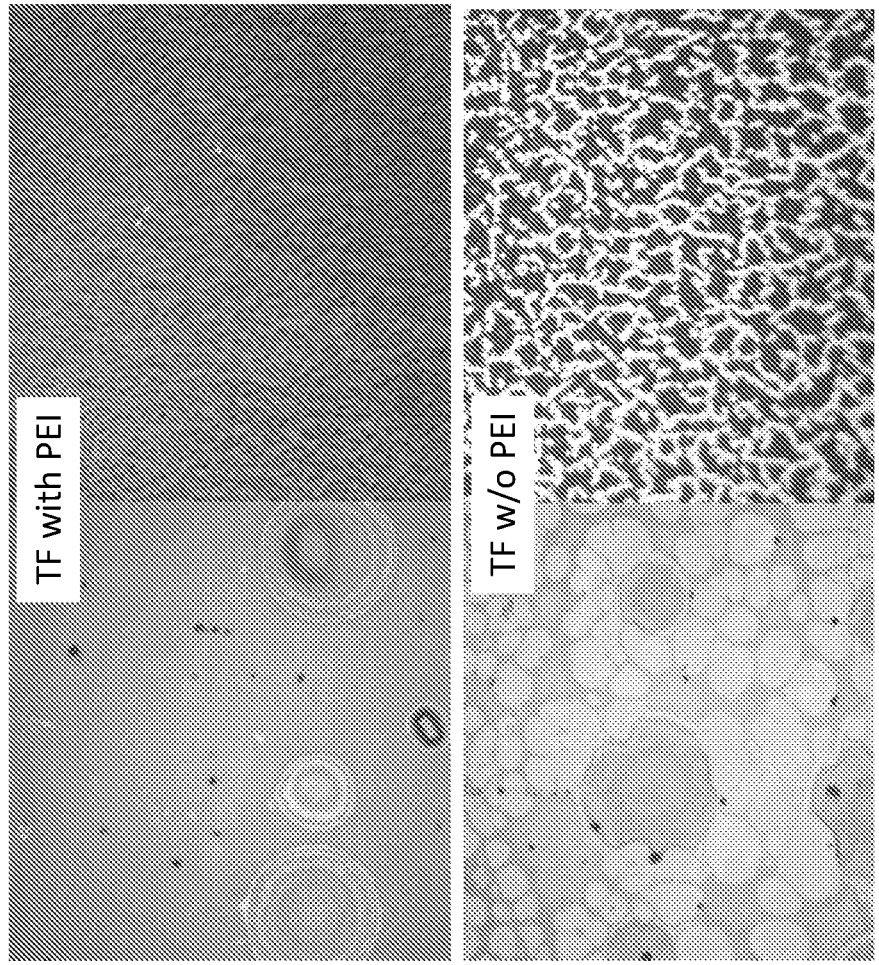
FIGS. 13A-13D display an image of a PET slide (left side of the figure) coated with a treatment formulation with PEI (FIG. 13A), without PEI (FIG. 13B), with TF contaminated with ink being of 3 days old and at 50° C.
Figures 13C, 13D:
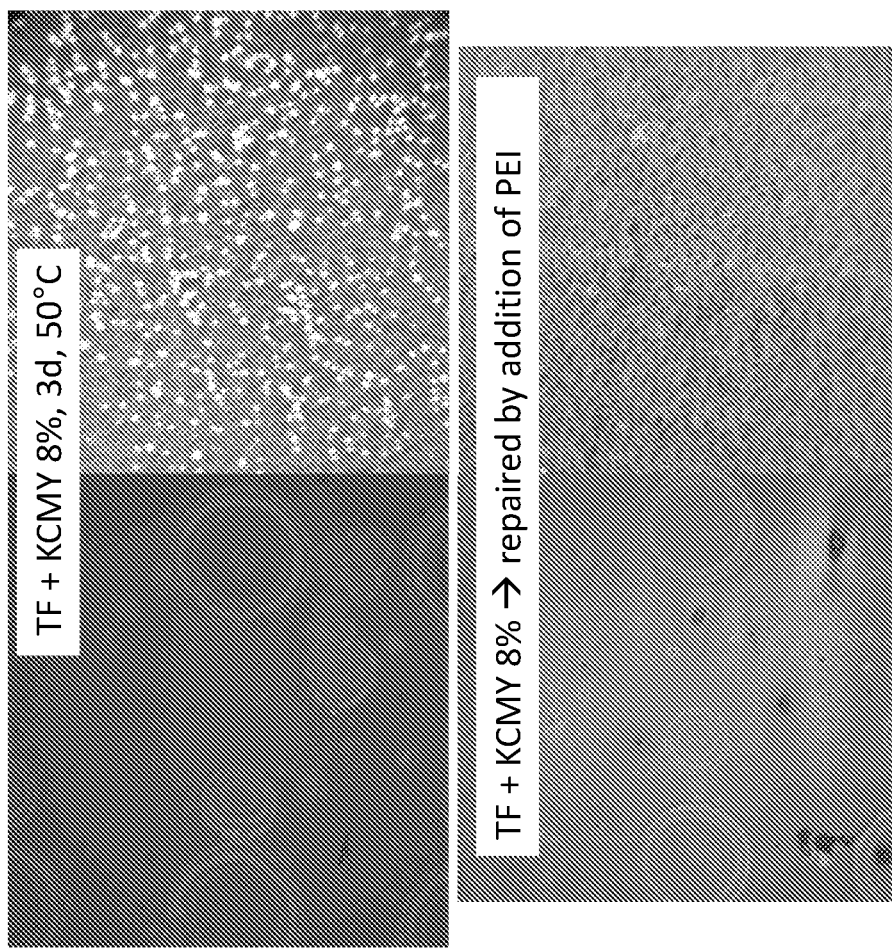

FIGS. 13A-13D display an image of a PET (left side) coated with a treatment formulation with PEI (FIG. 13A), without PEI (FIG. 13B), with TF contaminated with ink being of 3 days old and at 50° C. (FIG. 13C) and with a TF contaminated with ink but with additional amount of PEI (FIG. 13D). FIGS. 13A-13D further display (right side) the corresponding section (zoom in) of a printed image obtained in an indirect printing process utilizing the corresponding treatment formulations.

FIGS. 13A-13D clearly illustrate the importance of the presence of the PEI in the treatment formulation. The absence thereof resulted with inhomogeneity (e.g., wetting problem) in the coating of the ITM which resulted with low printing quality (FIG. 13B). Similar effect was observed with a treatment formulation that was contaminated with ink (FIG. 13C). The inhomogeneity in the coating of the ITM was recovered merely be addition of PEI to the contaminated treatment formulation (FIG. 13D).

FIG. 14A displays a diagram representing the graining of a printed image produced in an indirect printing process utilizing fresh TF, ink contaminated TF and ink contaminated TF with added amount of PEI. FIG. 14B displays a section of the corresponding printed image obtained in an indirect printing process utilizing the corresponding treatment formulations.

FIGS. 15A-15C display printed images produced in an indirect printing process, utilizing fresh TF (FIG. 15A), ink contaminated TF (FIG. 15B) and ink contaminated TF with added amount of PEI (FIG. 15C). FIGS. 15A-15C further display a section (zoom in) of the corresponding printed images.

The above results indicate that PEI solely can be replenished to repair the performance of the treatment formulation and that there was no need to replenish the treatment formulation as a whole. These results further illustrate that the reduction in the printing quality resulted from reduction in the amount of the PEI. This reduction was due to a reaction of the PEI with the binder of the ink formulation.

Without wishing to be bound by theory, the inventors believe that the observed immediate phase separation and precipitation upon addition of ink binder to the PEI solution (FIG. 12) might be due to the charge characteristics of the PEI (having a positively charged nature) and the ink binder (having a negatively charged nature) and due to the high molecular weight of the PEI that requires low concentration thereof to react with the ink binder.

The above results illustrate the importance of the present of the PEI in the treatment formulation. Even slight reduction in the concentration thereof in the treatment formulation affected the performance of the treatment formulation. Even relatively small amounts of the ink contamination in the treatment formulations negatively affected the functionability thereof.

The results of the above study indicate that ink contamination of the treatment formulation have a strong negative impact on the treatment formulation performance. The performance of the treatment formulation can be repaired by addition of PEI. This addition negated the reduction in the PEI concentration in the treatment formulation which was a result of an ink contamination that caused a fast reaction between the binder of the ink formulation and the PEI. The depletion of PEI strongly affected the quality of the coating of the ITM and as such the printed image quality. The findings of the above study are of great importance and contribute to the improvement in the costs involved with the printing process inter-alia since replenishment of the whole treatment formulation is not required but rather replenishment of merely PEI. Printing quality stability can be obtained along with reduction of unnecessary waste involved with otherwise the need to discard a great amount of low quality treatment formulation.

Example 4: Detection and Quantification of PEI in the Treatment Formulations

In order to determine if addition of PEI is required to repair depletion thereof in the treatment formulation, the concentration of PEI in the treatment formulations was detected utilizing spectroscopic means known in the art, see for example the following links:

https://www.sciencedirect.com/science/article/pii/S187853213001779
https://ww.ncbi.nlm.nih.gov/pubmed/12560058
https://onlinelibrary.wiley.com/doi/abs/10.1002/pol.1967.150050816
https://www.researchgate.net/publication/299346733_Validation_of_a_New_Method_for_Spectrophotometric_Determination_of_Polyethyleneimine In particular, PEI detection was performed using an assay involving reaction with copper. PEI can be detected using addition of copper ions, resulting in blue color emission from the solution and strong absorption at 285 nm (it is noted that absorption at 650 nm may also be utilized, but the intensity thereof relative to that observed with 285 nm is lower).

The inventors tested various samples of the treatment formulation. 1 ml sample was introduced into a 3 ml bottle and Cu solution of 0.1 M was pipetted. The solution was mixed 3 seconds using vortex.

Figure 16:
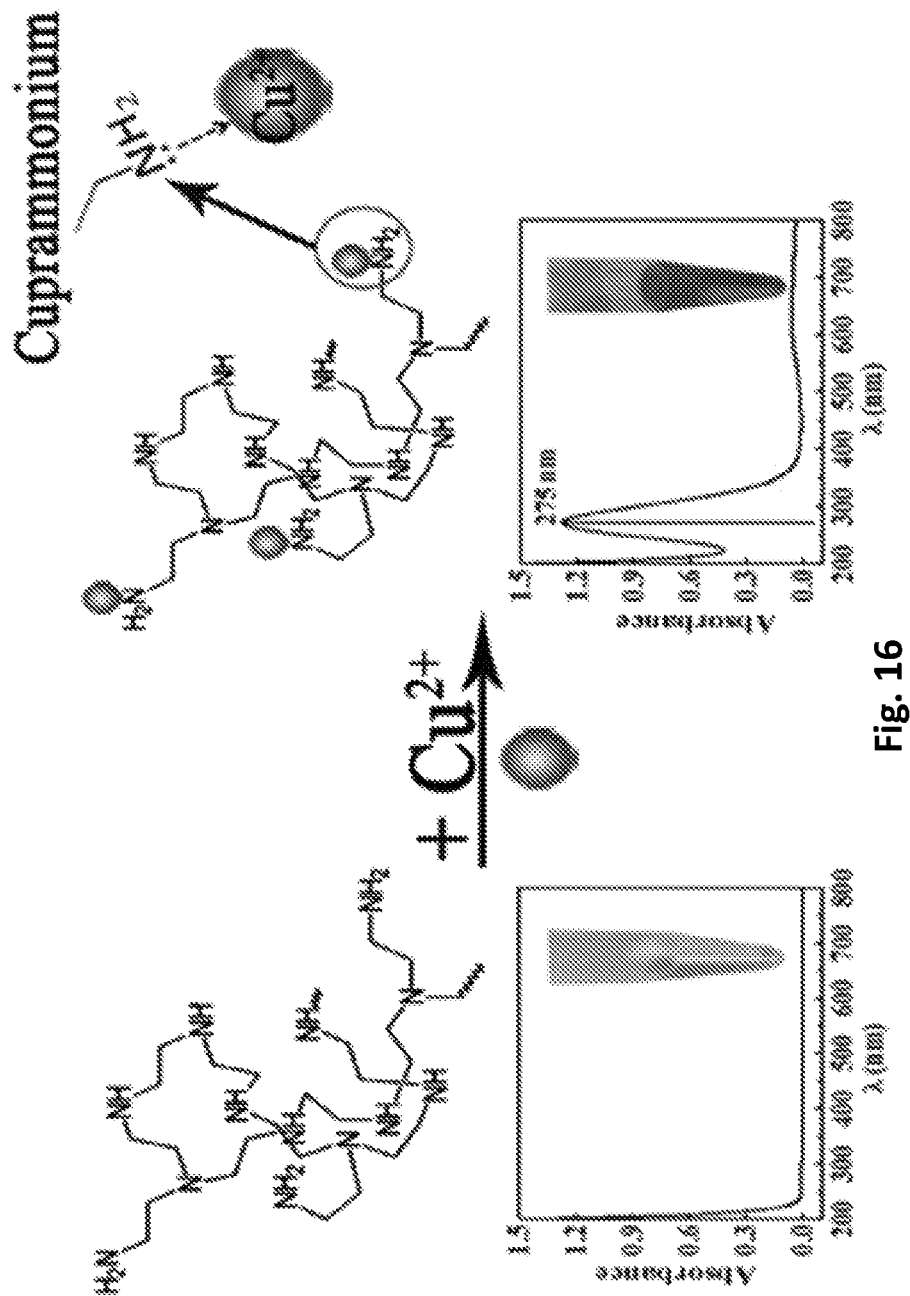
FIG. 16 display a scheme illustrating the detection of PEI by addition of copper ions into a PEI solution, the addition results in blue color emission from the solution and strong absorption at about 275 nm (accompanied with lower absorption at about 650 nm).
Figure 17A:
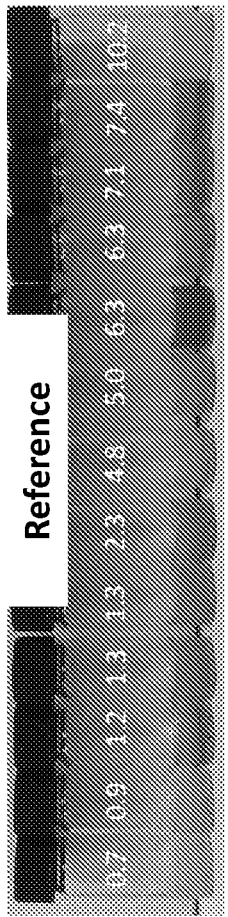
Figure 17B:
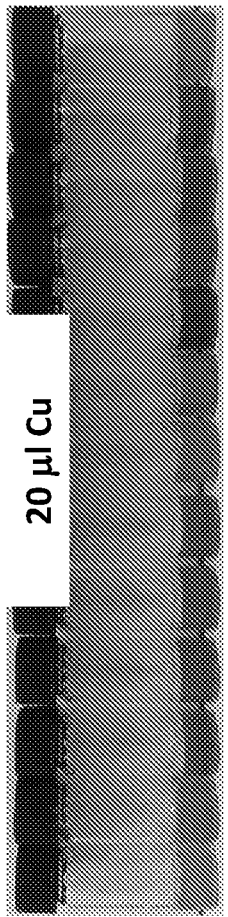
Figure 17C:
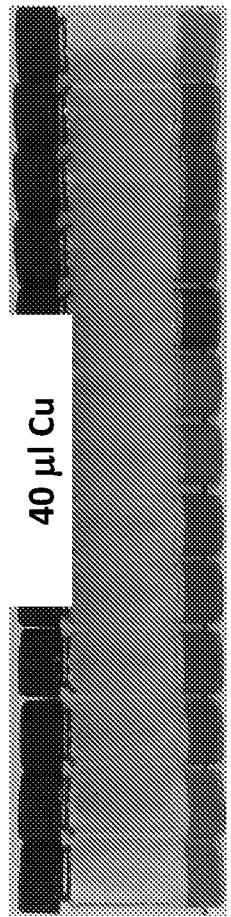
Figure 17D:
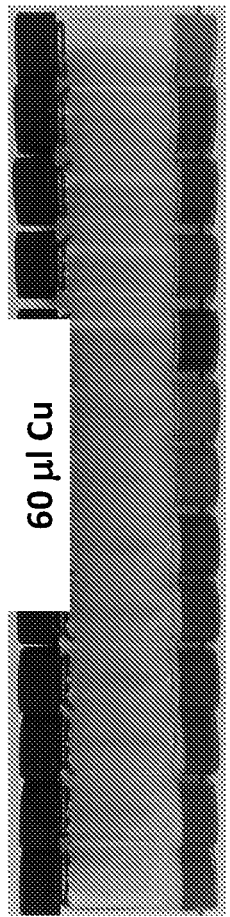
Figures 17E, 17F, 17G, 17H:
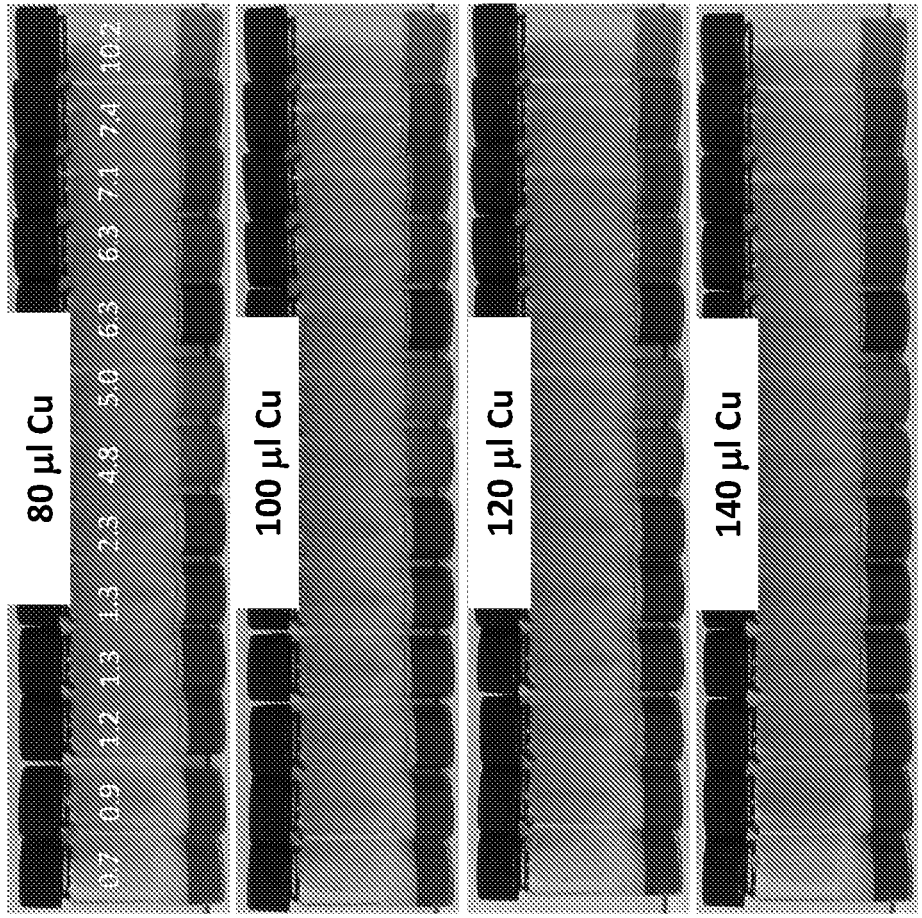

FIG. 16 display a scheme illustrating the detection of PEI by addition of copper ions into a PEI solution, the addition results in blue color emission from the solution and strong absorption at 285 nm.

FIGS. 17A-17L illustrate the color reaction observed upon titration with copper of various fresh TF having different PEI concentrations (the corresponding observed graininess values are noted as numbers on the vials with the titrated TF). FIGS. 17A-17L illustrate that 80 µl of 0.1 M Cu were sufficient for 1 ml sample detection (above 80 µl no further change in color was observed).

Figure 18:
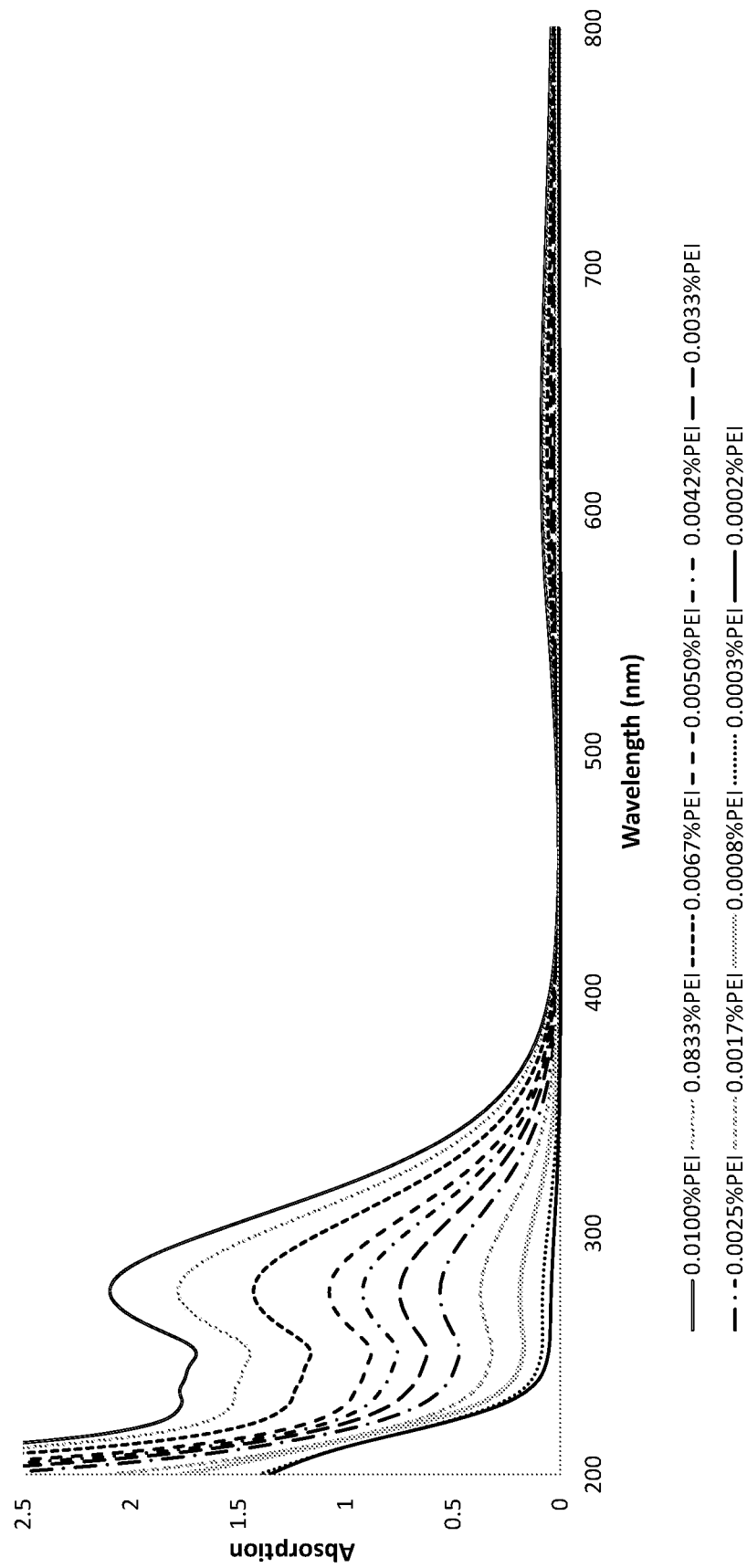
FIG. 18 displays the absorption spectra observed upon addition of copper to various TF having different PEI concentrations, according to some embodiments of the invention.

FIG. 18 displays the absorption spectra (PEI+Cu spectra) observed upon addition of copper to various TF having different PEI concentrations (3ml sample were placed in a vial. 20 ul of 0.1 NI Cu solution was added. Samples were first diluted to 0.01% and then secondly diluted). Final samples were placed in quivette and spectrally analyzed.

Figure 19:
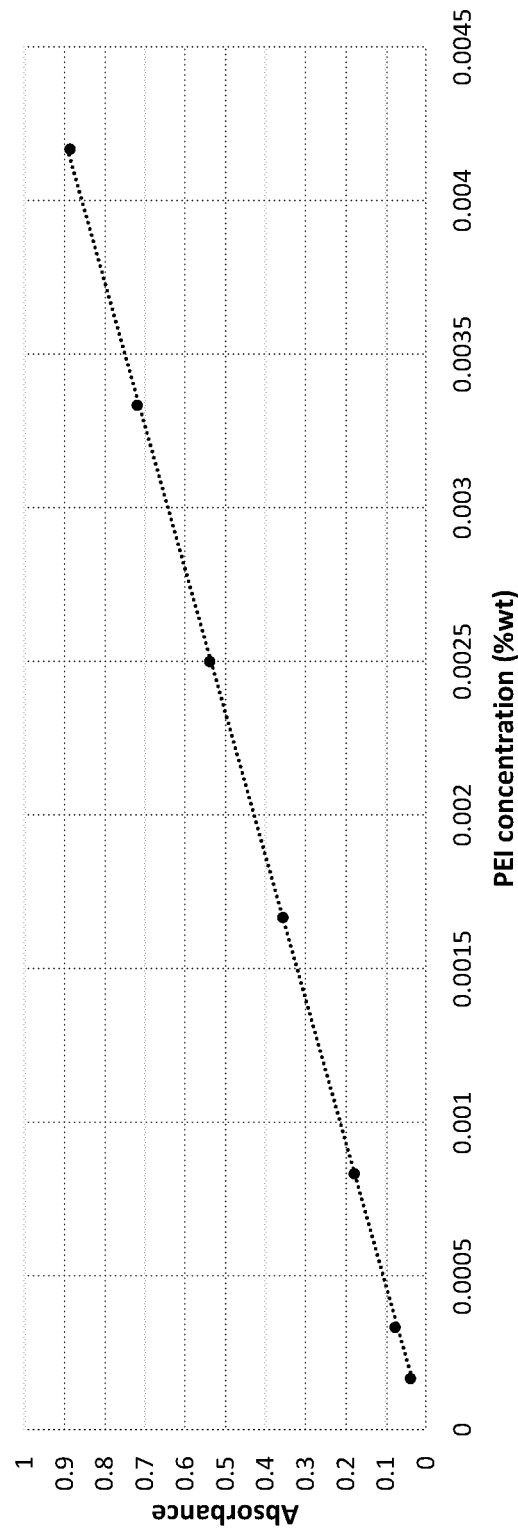
FIG. 19 displays a calibration curve at 285 nm, produced with treatment formulations with known PEI concentrations, according to some embodiments of the invention, and in the presence of copper.

FIG. 19 displays a calibration curve at 285 nm, produced with treatment formulations with known PEI concentrations and in the presence of copper. The calibration curve provided high $R^2$ value of 0.9998.

Figure 20:
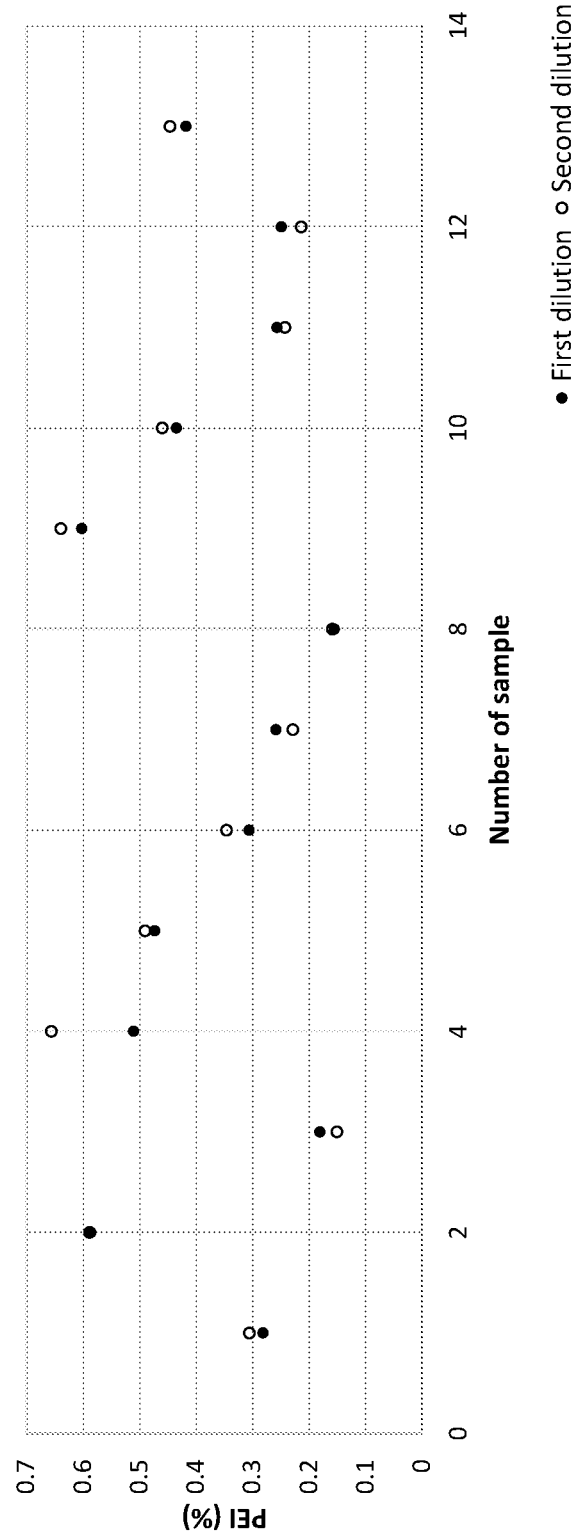
FIG. 20 displays the concentration of PEI of various TFs, according to some embodiments of the invention, calculated based on the calibration curve of FIG. 19 and at two different dilutions.

FIG. 20 displays the concentration of PEI of various TFs as determined based on the calibration curve of FIG. 19 and at two different dilutions. FIG. 20 illustrates that different dilutions did not interrupt the reading.

Figure 21:
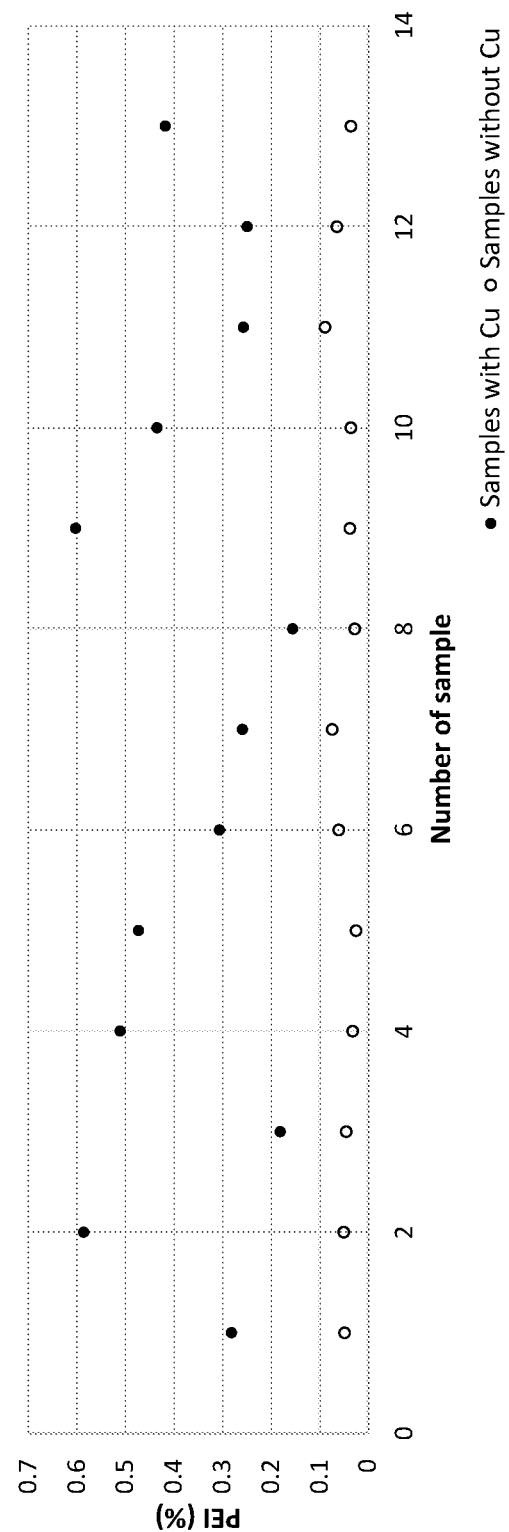
FIG. 21 displays the concentration of PEI of various TFs according to some embodiments of the invention, calculated based on the calibration curve of FIG. 19, with and without copper, the latter serves as a control test.

FIG. 21 displays the concentration of PEI of various TFs as determined based on the calibration curve of FIG. 19, with and without copper, the latter serves as a control test. As expected, the absorption intensity observed without the addition of Cu was very low for all the samples.

Figure 22:
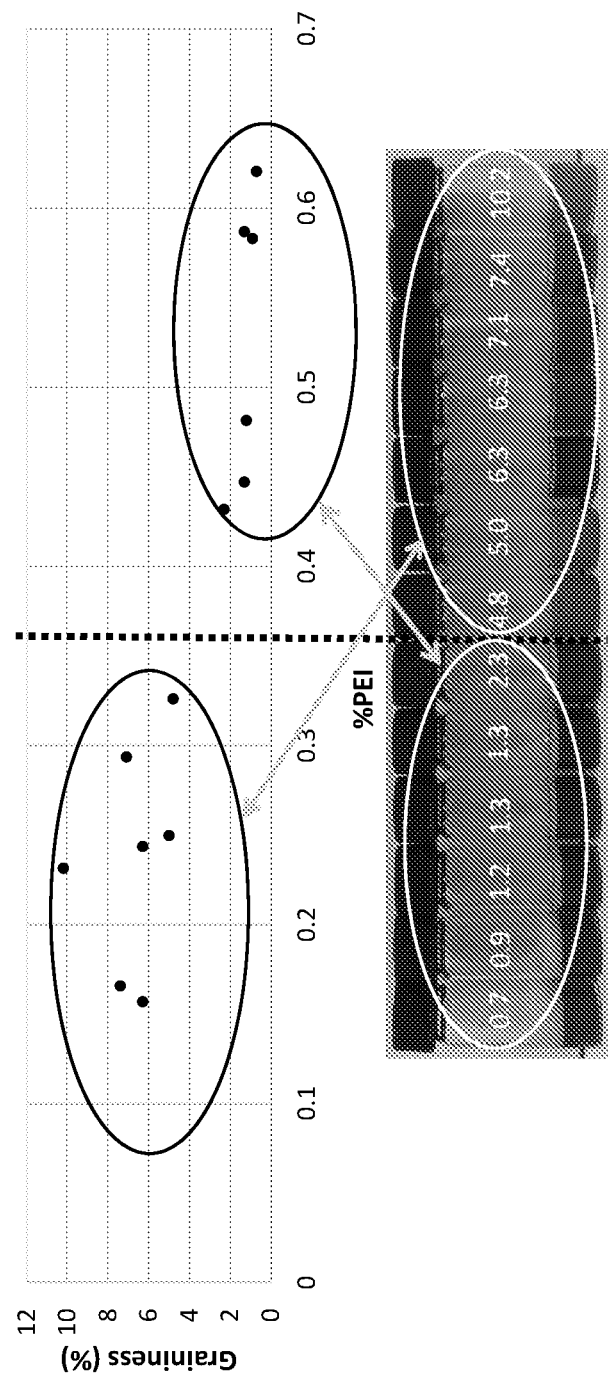
FIG. 22 displays the correlation between graininess of a printed image and the concentration of the PEI in the TF used to produce the image, according to some embodiments of the invention.

FIG. 22 displays the correlation between graininess of a printed image and the concentration of the PEI in the TF used to produce the image. FIG. 22 illustrates that there is a clear border between "good" (graininess 2.3 and lower) and "bad" (graininess 2.3 and higher). All the "good samples" has a deep blue color (shown in grey scale in the figure), while the others has different and other/lighter shades of blue (shown in grey scale in the figure).

ILLUSTRATIVE EMBODIMENTS

The following embodiments are illustrative and not intended to limit the claimed subject matter.

Embodiment 1 A system for printing, comprising:
  a liquid reservoir configured for holding a formulation, the formulation comprising a first amount of at least one depletable chemical agent, said first amount being substantially equal to or greater than a predetermined threshold value, wherein said formulation optionally further comprises at least one further component;
  a replenishment reservoir configured for holding a second amount of said at least one depletable chemical agent, optionally in at least one liquid carrier,
  detection means configured at least to identify a reduction in (i) said first amount of said depletable chemical agent below said predetermined threshold value and/or (ii) the functionability of said at least one depletable chemical agent;
  transfer means configured to transfer at least a portion of said second amount of the at least one depletable chemical agent from said replenishment reservoir to said liquid reservoir once said reduction has been identified, optionally wherein said transfer means are manual means.

Embodiment 2 The system according to Embodiment 1, wherein said detection means are configured to measure and/or calculate said reduction.

Embodiment 3 The system according to Embodiment 1 or 2, wherein said detection means are configured to record and/or report said reduction.

Embodiment 4 The system according to any one of Embodiments 1 to 3, wherein said detection means arc configured to activate said transfer means once said reduction has been identified.

Embodiment 5 The system according to any one of Embodiments 1 to 4, wherein said system further comprises a control unit configured to control replenishment of said at least one depletable chemical agent in the liquid reservoir and optionally configured to activate said transfer means once said reduction has been identified.

Embodiment 6 The system according to Embodiment 5, wherein said system further comprises communication means configured to transfer data/information between said detection means to said control unit.

Embodiment 7 The system according to any one of Embodiments 1 to 6, wherein said transfer means are selected from pressure based means, jetting means, spraying means or gravitational means.

Embodiment 8 The system according to any one of Embodiments 1 to 7, wherein said system further comprises at least one printing liquid reservoir configured for holding a printing liquid, wherein the printing liquid is optionally an ink and more optionally is a water based ink.

Embodiment 9 The system according to any one of Embodiments 1 to 8, wherein said system if for indirect printing.

Embodiment 10 The system according to Embodiment 9, wherein said system further comprises an intermediate transfer member.

Embodiment 11 The system according to any one of Embodiments 8 to 10, wherein said formulation is a treatment formulation configured to be applied onto at least a region of a release surface of said intermediate transfer member and to form a coating layer thereon.

Embodiment 12 The system according to Embodiment 11, wherein the formulation is applied onto said release surface before said printing liquid is applied thereon.

Embodiment 13 The system according to any one of Embodiments 1 to 12, wherein the at least one depletable chemical agent is present in said replenishment reservoir in a liquid form and wherein said replenishment reservoir and liquid reservoir are in liquid communication permitting transfer, once said reduction has been identified, of at least a portion of said second amount of the at least one depletable chemical agent from said replenishment reservoir to said liquid reservoir.

Embodiment 14 The system according to Embodiment 13, wherein said transfer means further comprises regulation means configured to regulate the transferred amount of said depletable chemical agent from said replenishment reservoir to said liquid reservoir and/or to avoid opposite flow of liquid from said liquid reservoir to said replenishment reservoir.

Embodiment 15 The system according to Embodiment 14, wherein said regulation means comprises at least one security valve permitting one way flow of liquids, from the replenishment reservoir to the liquid reservoir.

Embodiment 16 The system according to any one of Embodiments 1 to 15, wherein said second amount of said at least one depletable chemical agent in said replenishment reservoir is greater than said first amount of said at least one depletable chemical agent in said liquid reservoir.

Embodiment 17 The system according to any one of Embodiments 1 to 16, wherein said system optionally further comprises mixing means configured to mix said at least one depletable chemical agent in said liquid reservoir and/or replenishment reservoir.

Embodiment 18 The system according to any one of Embodiments 1 to 17, wherein the at least one depletable chemical agent in said replenishment reservoir is present in a solid form.

Embodiment 19 The system according to Embodiment 18, wherein said system optionally further comprises means configured to mix, dissolve or disperse the solid depletable chemical agent.

Embodiment 20 The system according to Embodiment 18 or 19, wherein said system optionally further comprises heating means configured to assist in solubilizing said solid depletable chemical agent.

Embodiment 21 The system according to any one of Embodiments 1 to 20, wherein upon detection/identifying of said reduction, said control unit is configured to control replenishment of said at least one depletable chemical agent in said liquid reservoir, in accordance with a replenishment profile selected to increase the amount of the depletable chemical agent in said liquid reservoir to reach a value being substantially equal to or greater than said predetermined threshold value.

Embodiment 22 The system according to any one of Embodiments 1 to 21, wherein said system further comprises a processing utility.

Embodiment 23 The system according to Embodiment 22, wherein said processing utility is configured, upon identifying of said reduction, to provide a user with a signal indication, indicating the need to replenish said at least one depletable chemical agent in said liquid reservoir.

Embodiment 24 The system according to any one of Embodiments 1 to 23, wherein said system optionally further comprises means to halt the printing process and resume same once replenishment is accomplished/completed.

Embodiment 25 The system according to any one of Embodiments 21 to 24, wherein the replenishment profile defines one or more of: the amount of the at least one depletable chemical agent to be transferred from the replenishment reservoir to the liquid reservoir; the frequency of the replenishment; the duration of the transfer; the manner of the transfer; the transfer rate.

Embodiment 26 The system according to any one of Embodiments 21 to 25, wherein said replenishment profile is determined based on one or more of: said first amount and/or second amount of the depletable chemical agent; the extent of said reduction; the relative amount of the depletable chemical agent with respect to the formulation amount or the amount of other one of more components comprised within the formulation.

Embodiment 27 The system according to any one of Embodiments 21 to 26, wherein the replenishment profile is defined based on one or more of the printing conditions.

Embodiment 28 The system according to any one of Embodiments 22 to 27, wherein said processing utility is configured to process an image produced by said system and to assess the image printing quality thereof, wherein when said image printing quality is below a predetermined required quality the control unit is configured to cause replenishment of said at least one depletable chemical agent in said liquid reservoir.

Embodiment 29 The system according to Embodiment 28, wherein said processing utility is configured to generate an output indicative of the quality of said image, wherein when said output is below a predetermined threshold parameter the control unit is configured to cause replenishment of said at least one depletable chemical agent in said liquid reservoir.

Embodiment 30 The system according to Embodiment 29, wherein said processing unit is configured to display said output on visual display unit, an audio device or combination of same.

Embodiment 31 The system according to Embodiment 29, wherein said predetermined threshold parameter comprises an essentially distinct value or a range of values representing a desired quality of the printed image.

Embodiment 32 The system according to any one of Embodiments 29 to 31, wherein when said output is below a predetermined threshold parameter value the system is optionally configured to immediately alert the user to stop or automatically stop the printing process and optionally resume same once replenishment of the depletable chemical agent in the liquid reservoir is completed.

Embodiment 33 The system according to any one of Embodiments 29 to 32, wherein said output reflects a value indicative of the graininess of the image.

Embodiment 34 The system according to any one of Embodiments 1 to 33, further comprising a user interface.

Embodiment 35 The system according to Embodiment 34, wherein said user interface is for allowing a user to introduce into the processing utility one or more desired printing conditions for a printing process.

Embodiment 37 The system according to any one of Embodiments 1 to 35, further comprising a memory.

Embodiment 38 The system according to Embodiment 36, wherein said memory comprises a database of image quality predetermined threshold parameter/s of a printing processes.

Embodiment 39 The system according to Embodiment 36 or 37, wherein said processing utility is configured to correlate the image quality predetermined threshold parameter from said database to said output.

Embodiment 40 The system according to any one of Embodiments 1 to 38, wherein said system further comprises means to record the replenishment history.

Embodiment 41 The system according to any one of Embodiments 1 to 39, wherein said detection means are selected from visual means, spectroscopic means, spectrophotometric means, electronic means, chemical means, physical means, print quality based means or any combinations thereof.

Embodiment 42 The system according, to Embodiment 40, wherein said means are configured to detect/measure the amount of said at least one depletable chemical agent in said liquid reservoir and wherein said system is configured to calculate based on the detected/measured amount a reduction in said first amount of said least one depletable chemical agent.

Embodiment 43 The system according to any one of Embodiments 1 to 41, wherein said system further comprises a sampling unit configured to withdraw an aliquot of the formulation from said liquid reservoir for further analysis.

Embodiment 44 The system according to Embodiment 42, wherein said sampling unit is configured to withdraw an aliquot of the formulation from said liquid reservoir upon demand and/or at predetermined time intervals and/or after a predetermined number of printing cycles.

Embodiment 45 The system according to any one of Embodiments 1 to 43, wherein said reduction in the first amount of said depletable chemical agent is relative to an amount of another one or more components of the formulation.

Embodiment 46 The system according to any one of Embodiments 1 to 44, wherein said reduction in the first amount of said depletable chemical agent occurs due to an undesired side reaction of the depletable chemical agent.

Embodiment 47 The system according to Embodiment 45, wherein said undesired side reaction of the depletable chemical agent results with a formation of an undesirable byproduct in said liquid reservoir and wherein said system optionally further comprises means configured to remove said byproduct.

Embodiment 48 The system according to Embodiment 46, wherein said system further comprises means to detect the formation of said undesirable byproduct and optionally measure/determine the amount thereof in said liquid reservoir.

Embodiment 49 The system according to Embodiment 47, wherein said system further comprises means configured to correlate between the detected formation of said undesirable byproduct and the reduction in the first amount of the depletable chemical agent.

Embodiment 50 The system according to any one of Embodiments 1 to 48, wherein said reduction in the first amount of said depletable chemical agent being due to contamination of the formulation in the liquid reservoir with at least one contaminant and wherein the formation of at least one undesired byproduct is resulted from interaction between said at least one depletable chemical agent and at least one contaminant.

Embodiment 51 The system according to any one of Embodiments 1 to 49, wherein said system further comprises at least one printing liquid reservoir configured for holding a printing liquid, optionally said printing liquid being an ink formulation, and wherein said reduction in the first amount of said depletable chemical agent being due to printing liquid contamination in the liquid reservoir.

Embodiment 52 The system according Embodiment 50, wherein said printing liquid is an ink and comprises at least one binder and at least one colorant, and wherein said reduction in the first amount of said depletable chemical agent being due to an undesired side reaction of the depletable chemical agent with said at least one binder.

Embodiment 53 The system according to any one of Embodiments 1 to 51, wherein said system further comprises a protecting unit configured to protect the liquid reservoir from contamination e.g., ink contamination.

Embodiment 54 The system according to any one of Embodiments 1 to 52, wherein said system optionally further comprises measuring means configured to measure the volume of the liquid in said liquid reservoir, wherein when the measured volume is below a predetermined minimum volume the system is configured to indicate to a user to refill the liquid reservoir with an additional amount of liquid formulation.

Embodiment 55 The system according to any one of Embodiments 1 to 53, wherein said system optionally further comprises measuring means configured to measure the amount (e.g., volume/liquid or wright/solid) of the depletable chemical agent in the replenishment reservoir, wherein when the measured amount is below a predetermined minimum amount the control unit is configured to indicate to a user to refill the replenishment reservoir with a further amount of said depletable chemical agent.

Embodiment 56 The system according to any one of Embodiments 1 to 54, wherein the depletable chemical agent is a polymeric agent containing amine nitrogen atoms in a plurality of functional groups which need not be the same and can be combined.

Embodiment 57 The system according to Embodiment 55, wherein said polymer has a relatively high charge density.

Embodiment 58 The system according to Embodiment 55 or 56, wherein the polymer has molecular weight equals or greater than 10,000 g/mole.

Embodiment 59 The system according to any one of Embodiments 1 to 57, wherein the depletable chemical agent is a polymeric agent having at least one of (a) a positive charge density of at least 3 meq/g of said agent and an average molecular weight of at least 5,000, (b) a positive charge density of at least 6 meq/g of said agent and an average molecular weight of at least 1,000, (c) a nitrogen content of at least 1 wt. % and an average molecular weight of at least 50,000, and (d) a nitrogen content of at least 18 wt. % and an average molecular weight of at least 10,000.

Embodiment 60 The system according to any one of Embodiments 1 to 58, wherein said depletable chemical agent is a polymeric agent having a positive charge density.

Embodiment 61 The system according to Embodiment 59, wherein the positive charge density being at least 0.5 meq/g, at least 1 meq/g, at least 2 meq/g, at least 3 meq/g, at least 4 meq/g, at least 5 meq/g, 6 meq/g, at least 7 meq/g, at least 8 meq/g, at least 9 meq/a, at least 10 meq/g, at least 11 meq/g, at least 12 meq/g, at least 13 meq/g, at least 14 meq/g, at least 15 meq/g, at least 16 meq/g, at least 17 meq/g, at least 18 meq/g, at least 19 meq/g, or at least 20 meq/g of said agent.

Embodiment 61 The system according to any one of Embodiments 1 to 60, wherein said depletable chemical agent is a polymeric agent having an average molecular weight of at least 500, at least 800, at least 1,000, at least 1,300, at least 1,700, at least 2,000, at least 2,500, at least 3,000, at least 3,500, at least 4,000, at least 4,500, at least 5,000, at least 10,000, at least 15,000, at least 20,000, at least 25,000, at least 50,000, at least 100,000, at least 150,000, at least 200,000, at least 250,000, at least 500,000, at least 750,000, at least 1,000,000, or at least 2,000,000.

Embodiment 62 The system according to any one of Embodiments 1 to 61, therein the depletable chemical agent is a polymeric agent having an average molecular weight of at least 2,000, at least 10,000 or at least 25,000.

Embodiment 63 The system according to any e of Embodiments 1 to 62, wherein said depletable chemical agent comprises one or more positively chargeable nitrogen atoms.

Embodiment 64 The system according to Embodiment 63, wherein the one or more nitrogen atoms constitute at least 1%, at least 1.4%, at least 2%, at least 5%, at least 8%, at least 10%, at least 15%, at least 18%, at least 20%, at least 24%, at least 30%, at least 35%, at least 40%, at least 45%, or at least 50% by weight of the depletable chemical agent.

Embodiment 65 The system according to any one of Embodiments 1 to 64, wherein the depletable chemical agent is a polymeric agent that includes poly(diallyldimethylammonium chloride)

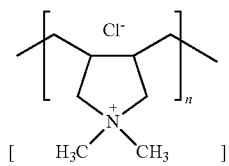

unit.

Embodiment 66 The system according to any one of Embodiments 1 to 64, wherein the depletable chemical agent is a polymeric agent that includes polyallylamine

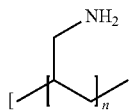

unit.

Embodiment 67 The system according to any one of Embodiments 1 to 64, wherein the depletable chemical agent is a polymeric agent that includes poly(4-vinylpyridine)

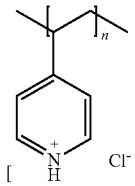

unit.

Embodiment 68 The system according to any one of Embodiments 1 to 67, wherein the depletable chemical polymeric agent is selected from the group consisting of linear polyethylene imine, branched polyethylene imine, modified polyethylene imine, poly(diallyldimethylammonium chloride), poly(4-vinylpyridine), polyallylamine, a vinyl pyrrolidone-dimethylaminopropyl methacrylamide co-polymer (Viviprint 131), a vinyl caprolactam-dimethylaminopropyl methacryamide hydroxyethyl methacrylate copolymer (Viviprint 200), a quaternized copolymer of vinyl pyrrolidone and dimethylaminoethyl methacrylate with diethyl sulfate (Viviprint 650), a guar hydroxypropyltrimonium chloride, and a hydroxypropyl guar hydroxypropyltrimonium chloride.

Embodiment 69 The system according to Embodiment 68, wherein the depletable chemical polymeric agent is polyethyleneimine (PEI).

Embodiment 70 The system according to any one of Embodiments 1 to 69, wherein the first amount of the depletable chemical polymeric agent in the formulation in the liquid reservoir is equal to or less than about 5 wt. %, 4 wt. %, 3 wt. %, 2 wt. %, 1 wt. %, 0.5 wt. %, 0.4 wt. %, 0.3 wt. %, 0.2 wt. %, 0.1 wt. %, or equals to or being at least about 0.05 wt. %, or at times at least about 0.01% wt. %.

Embodiment 71 The system according to any one of Embodiments 1 to 70, wherein the depletable chemical agent is a polymeric agent being PEI and wherein the predetermined threshold value is at least 0.01 wt. %, at least 0.05 wt. at least 0.10 wt. %, at least 0.15 wt. % or at least 0.2 wt. %.

Embodiment 72 The system according to any one of Embodiments 1 to 71, wherein the depletable chemical agent is a polymeric agent being PEI and wherein said first amount thereof in the liquid reservoir is a concentration by weight being at most 6%, at, most 5%, at most 4%, at most 3%, at most 2.5%, at most 2.0%.

Embodiment 73 The system according to any one of Embodiments 1 to 72, wherein the depletable chemical agent is a polymeric agent being PEI and wherein said first amount thereof in the liquid reservoir is a concentration by weight is within a range of 0.01 to 1%, 0.01 to 0.8%, 0.01 to 0.7%, 0.01 to 0.6%, 0.01 to 0.5%, 0.2 to 0.7%, 0.2 to 0.6%, or 0.2 to 0.5%.

Embodiment 74 The system according to any one of Embodiments 1 to 73 wherein the at least one depletable chemical agent is PEI, wherein the first amount thereof in the formulation in liquid reservoir is 0.25 wt. % and the second amount thereof in the replenishment reservoir is 25 wt. % in water.

Embodiment 75 The system according to Embodiment 74 wherein when the first amount of the PEI in the liquid reservoir is reduced below a predetermined threshold value of 0.01 wt. % the system is configured to transfer a portion of said second amount of the PEI from the replenishment reservoir to the liquid reservoir, to thereby replenish the amount of the PEI in the liquid reservoir to a value being equal to or above said predetermined threshold value (0.01 wt. %) or to replenish the amount of the PEI in the liquid reservoir to a value being equal to the first amount (0.25 wt. %).

Embodiment 76 The system according to any one of Embodiments 1 to 75, wherein the depletable chemical agent is a polymeric agent being PEI and wherein the average molecular weight thereof is at least 20,000, at least, 50,000, at least 100,000, at least 200,000, at least 350,000, at least 500,000, at least 700,000, at least 750,000 and optionally, at most 3,000,000, at most 2,500,000, or at most 2,000,000.

Embodiment 77 The system according to any one of Embodiments 1 to 76, wherein the depletable chemical agent is a polymeric agent being PEI, and wherein said PEI is a surface active agent, a wetting agent, an anchoring agent or any combination thereof.

Embodiment 78 The system according to any one of Embodiments 1 to 77, wherein the depletable chemical agent is a polymeric agent being PEI, wherein the charge densities of the PEI polymer is in the range of 16-20 meq/g of material.

Embodiment 79 The system according to any one of Embodiments 1 to 77, wherein the depletable chemical agent is a polymeric agent being PEI, wherein the charge densities of the PEI polymer is 8 meq/g.

Embodiment 80 The system according to any one of Embodiments 1 to 79, wherein the depletable chemical agent is silicone functionalized PEI.

Embodiment 81 The system according to any one of Embodiments 1 to 80, wherein the depletable chemical agent is a quaternary ammonium compound.

Embodiment 82 The system according to Embodiment 81, wherein the quaternary ammonium compound is Larostat264A (BASF).

Embodiment 83 The system according to Embodiment 81, wherein the quaternary ammonium compound is Foamquat SAQ (Linoleamidopropyl Ethyldimonium Ethosulfate 90).

Embodiment 84 The system according to any one of Embodiments 1 to 83, wherein the depletable chemical agent is water dispersible.

Embodiment 85 The system according to any one of Embodiments 1 to 83, wherein the depletable chemical agent is water soluble.

Embodiment 86 The system according to any one of Embodiments 1 to 85, wherein the depletable chemical agent is solid at room temperature.

Embodiment 87 The system according to any one of Embodiments 51 to 86, wherein the at least one binder in the ink is an anionic binder.

Embodiment 88 The system according to Embodiment 87, wherein said anionic binder is an acrylic binder and/or a sulfonic binder.

Embodiment 89 The system according to any one of Embodiments 51 to 88, wherein the at least one binder in the ink is a negatively charged organic polymeric resin.

Embodiment 90 The system according to Embodiment 89, wherein the average molecular weight of the negatively charged organic polymeric resin is at least 8,000.

Embodiment 91 The system according to Embodiment 89 or 90, wherein the at least one binder in the ink is an acrylic polymer and/or an acrylic-styrene co-polymer.

Embodiment 92 The system according to any one of Embodiments 51 to 91, wherein said binder is Joncryl 538 BASF.

Embodiment 93 The system according to any one of Embodiment 51 to 92, wherein the depletable chemical agent is PEI, and wherein the reduction in the first amount of PEI being due an undesired side reaction thereof with said at least one binder.

Embodiment 94 The system according to any one of Embodiments 1 to 93, wherein said system further comprises means to detect, measure or calculate the concentration of the depletable chemical agent in the formulation which is comprised within the liquid reservoir and calculate therefrom the reduction in the first amount of said depletable chemical agent.

Embodiment 95 The system according to Embodiment 94, wherein the depletable chemical agent is PEI.

Embodiment 96 The system according to Embodiment 94, wherein said means are spectroscopic means configured to detect the PEI based on a reaction of copper with the PEI.

Embodiment 97 The system according to any one of Embodiments 1 to 96, wherein said printing system is an indirect printing system, the system further comprising:

i. an intermediate transfer member (ITM) comprising a release layer surface;
ii. a treatment station comprising the liquid reservoir configured for holding an aqueous treatment formulation as disclosed herein, the treatment station is configured for applying the aqueous treatment formulation to the release layer surface of the ITM to form thereon a treatment layer;
iii. a replenishment unit comprising the replenishment reservoir as disclosed herein.
iv. an image forming, station configured for applying a printing liquid to form an image on the aqueous treatment formulation formed on the intermediate transfer member;
v. a transfer station for transferring the image onto a printing substrate e.g., by pressured contact between the ITM and the printing substrate.

Embodiment 98 The system according to Embodiment 97, wherein the printing liquid is an ink which is optionally applied by jetting and the system further comprises:
 a drying station configured to at least partially dry the ink on the aqueous treatment formulation formed on the intermediate transfer member to produce an ink-image residue; and optionally drying means for drying the aqueous treatment formulation.

Embodiment 99 The system according to any one of Embodiments 11 to 98 wherein said treatment formulation comprises:
 at least one water soluble polymer;
 at least one particulate material selected from (i) at least one thermoplastic polymeric particulate material, optionally in the form of an emulsion and/or a dispersion, (ii) at least one thermosetting polymeric particulate material, optionally in the form of a dispersion and/or an emulsion; or (iii) a combination thereof;
 a carrier liquid containing water; and
optionally, one or more of (a) at least one humectant; (b) at least one surfactant and (c) at least one wetting agent.

Embodiment 100 The system according to Embodiment 99, wherein said treatment formulation further comprising at least one wetting agent.

Embodiment 101 The system according to Embodiment 100, wherein said wetting agent is PEI.

Embodiment 102 The system according to Embodiment 99, wherein said water soluble polymer is at least one modified polysaccharide.

Embodiment 103 The system of Embodiment 102 wherein said modified polysaccharide is selected from cellulose derivative, cellulose ether, methylcellulose, hydroxypropyl methylcellulose or any combinations thereof.

Embodiment 104 The system of Embodiment 103 wherein said modified polysaccharide is hydroxypropyl methylcellulose.

Embodiment 105 The system according to any of Embodiments 1 to 104 wherein said treatment formulation is as herein disclosed and exemplified.

Embodiment 106 A method for preventing or minimizing printing defects in a printing process, wherein the printing defects are associated with a reduction in a first amount of at least one depletable chemical agent comprised within a liquid formulation (optionally in a liquid carrier), the method comprising:
 identifying/detecting a reduction in the first amount of said least one depletable chemical agent below a predetermined threshold value and/or relative to an amount of at least one another component in the formulation; and adding to the formulation, upon identifying/detecting said reduction, at least a portion of a second amount of the at least one depletable chemical agent, wherein said at least a portion of a second amount being sufficient to reestablish the first amount of the depletable chemical agent in said liquid formulation to be substantially equal or greater than said predetermined threshold value and/or wherein said at least a portion of said second amount being sufficient to negate the reduction of the first amount relative to an amount of at least another component in the formulation, to thereby prevent or minimize said printing defects.

Embodiment 107 The method according to Embodiment 106, wherein the second amount of the at least one depletable chemical agent is provided in a liquid form.

Embodiment 108 The method according to Embodiment 106, wherein the second amount of the at least one depletable chemical agent is provided in a solid form.

Embodiment 109 The method according to any one of Embodiments 106 to 108, wherein said method further comprises mixing the at least a portion of the second amount of the at least one depletable chemical agent in said liquid formulation.

Embodiment 110 The method according to Embodiment 108, further comprises dissolving or dispersing the solid depletable chemical agent in at lease on liquid carrier (which may be same or different from the liquid carrier of the liquid formulation).

Embodiment 111 The method according to Embodiment 110, further comprising heating said solid depletable chemical agent to thereby assist in dissolving thereof.

Embodiment 112 The method according to any one of Embodiments 106 to 111, wherein said liquid formulation is configured to be applied on a substrate on which an image is to be printed or on an intermediate transfer member in an indirect printing process.

Embodiment 113 The method according to any one of Embodiments 106 to 112, wherein said method further comprises:
  i. providing an intermediate transfer member (ITM);
  ii. providing a treatment formulation;
  iii. applying the treatment formulation to an image receiving surface of the ITM to form a wet treatment layer;
  iv. at least partially drying the wet treatment layer to form an at least partially dry treatment layer;
  v. applying a printing liquid onto the at least partially dried treatment layer to form an image;
  vi. transferring the image to a printing substrate by pressured contact between said surface of the ITM and the printing substrate.

Embodiment 114 The method according to Embodiment 113, wherein the printing liquid is an ink, optionally an aqueous ink and the method further comprises:
  applying ink droplets on the at least partially dried treatment layer to form an ink image; and
  at least partially drying the wet ink image on the aqueous treatment layer to form a partially dried ink image film to be transferred to a printing substrate.

Embodiment 115 The method according to any one of Embodiments 106 to 114, wherein the addition of at least a portion of the second amount of the at least one depletable chemical agent is performed according to a predetermined replenishment profile selected to increase the amount of the depletable chemical agent in the liquid formulation to reach a value being substantially equal to or greater than a predetermined threshold value.

Embodiment 116 The method according to any one of Embodiments 106 to 115, wherein said method further comprises identifying a reduction in the first amount of said at least one depletable chemical agent relative to an amount of at least another component in the formulation and provide a signal indication, indicating the need to add said at least one depletable chemical agent to said liquid formulation to thereby reestablishing the first amount of the depletable chemical agent in said liquid formulation to be substantially equal or greater than said predetermined threshold value hence to negate said reduction.

Embodiment 117 The method according to Embodiment 116, wherein the replenishment profile is a predetermined profile determined based on one or more of the printing conditions.

Embodiment 118 The method according to any one of Embodiments 106 to 117, wherein said method further comprises processing an image produced in said method and assessing the image printing quality thereof, wherein when said image printing quality is below a predetermined required quality the method comprises addition of at least a portion of said second amount of said at least one depletable chemical agent to said liquid formulation.

Embodiment 119 The method according to Embodiment 118, wherein said method comprises generating an output indicative of the quality of said image, wherein when said output is below a predetermined threshold parameter the method comprises addition of said at least a portion of said second amount of said at least one depletable chemical agent to said liquid formulation.

Embodiment 120 The method according to Embodiment 119, wherein said method comprises displaying said output on a visual display unit, an audio device or combination of same.

Embodiment 121 The method according to Embodiment 119 or 120, wherein said output reflects a value indicative of the graininess of the image.

Embodiment 122 The method according to Embodiment 119, wherein said predetermined threshold parameter comprises an essentially distinct value or a range of values representing a desired quality of the printed image.

Embodiment 123 The method according to any one of Embodiments 106 to 122, further to comprises identifying a reduction in the first amount of said at least one depletable chemical agent below a predetermined threshold value, wherein said identifying is accomplished by detection means selected from visual means, spectroscopic means, spectrophotometric means, electronic means, chemical means, physical means, print quality based means or any combinations thereof and wherein said method further comprises calculating based on the identified reduction in said first amount of said least one depletable chemical agent the reduction in the first amount of said at least one depletable chemical agent relative to an amount of another one or more components in the formulation.

Embodiment 124 The method according to any one of Embodiments 106 to 123, further comprising sampling an aliquot of the liquid formulation for analysis.

Embodiment 125 The method according to Embodiment 124, wherein said sampling is performed upon demand and/or at predetermined time intervals and/or after a predetermined number of printing cycles.

Embodiment 126 The method according to any one of Embodiments 106 to 125, wherein said reduction in the first amount of said depletable chemical agent is relative to an amount of another one or more components comprised within the formulation.

Embodiment 127 The method according to any one of Embodiments 106 to 126, wherein said reduction in the first amount of said depletable chemical agent being due to an undesired side reaction of the depletable chemical agent.

Embodiment 128 The method according to Embodiment 127, wherein said undesired side reaction of the depletable chemical agent results with a formation of an undesirable byproduct in said liquid formulation.

Embodiment 129 The method according to Embodiment 128, wherein said method further comprises detecting the formation of said undesirable byproduct and optionally measure/determine the amount thereof in said liquid formulation.

Embodiment 130 The method according to Embodiment 129, wherein said method further comprises correlating between the detected formation of said undesirable byproduct and the reduction in the first amount of the depletable chemical agent.

Embodiment 131 The method according to any one of Embodiments 106 to 130, wherein said reduction in the first amount of said depletable chemical agent being due to contamination of the liquid formulation with at least one contaminant and wherein the formation of at least one undesired byproduct is resulted from interaction between said at least one depletable chemical agent and said at least one contaminant.

Embodiment 132 The method according to any one of Embodiments 106 to 131, wherein said reduction in the first amount of said depletable chemical agent being due to ink contamination in the liquid formulation.

Embodiment 133 The method according to Embodiment 132, wherein said ink contamination being due to one or more of: ink spill; ink splash; and recycling process of the treatment formulation.

Embodiment 134 The method according to any one of Embodiments 114 to 133, wherein said ink comprises at least one binder and at least one colorant, and wherein said reduction in the first amount of said depletable chemical agent being due to an undesired side reaction of the depletable chemical agent with said at least one binder.

Embodiment 135 The method according to any one of Embodiments 106 to 134, wherein said method further comprises protecting the liquid formulation from contamination.

Embodiment 136 The method according to any one of Embodiments 128 to 135, wherein said method further comprises removing said byproduct from said liquid formulation.

Embodiment 137 The method according to any one of Embodiments 106 to 136, wherein said method further comprises measuring the volume of the liquid formulation, wherein when the measured volume is below a predetermined minimum volume the method further comprises refilling the liquid formulation with a liquid formulation to be substantially equal or above said predetermined minimum volume.

Embodiment 138 The method according to any one of Embodiments 106 to 137, wherein the depletable chemical agent is a polymeric agent containing amine nitrogen atoms in a plurality of functional groups which need not be the same and can be combined.

Embodiment 139 The method according to Embodiment 138, wherein said polymer has a relatively high charge density.

Embodiment 140 The method according to Embodiment 138 or 139, wherein the polymer has molecular weight equals or greater than 10,000 g/mole.

Embodiment 141 The method according to any one of Embodiments 106 to 140, wherein the depletable chemical agent is a polymeric agent having at least one of (a) a positive charge density of at least 3 meq/g of said agent and an average molecular weight of at least 5,000, (b) a positive charge density of at least 6 meq/g of said agent and an average molecular weight of at least 1,000, (c) a nitrogen content of at least 1 wt. % and an average molecular weight of at least 50,000, and (d) a nitrogen content of at least 18 wt. % and an average molecular weight of at least 10,000.

Embodiment 142 The method according to any one of Embodiments 106 to 141, wherein said depletable chemical agent is a polymeric agent having a positive charge density.

Embodiment 143 The method according to Embodiment 142, wherein the positive charge density being at least 0.5 meq/g, at least 1 meq/g, at least 2 meq/g, at least 3 meq/g, at least 4 meq/g, at least 5 meq/g, 6 meq/g, at least 7 meq/g, at least 8 meq/g, at least 9 meq/g, at least 10 meq/g, at least 11 meq/g, at least 12 meq/g, at least 13 meq/g, at least 14 meq/g, at least 15 meq/g, at least 16 meq/g, at least 17 meq/g, at least 18 meq/g, at least 19 meq/g, or at least 20 meq/g of said agent.

Embodiment 144 The method according to any one of Embodiments 106 to 143, wherein said depletable chemical agent is a polymeric agent having an average molecular weight of at least 500, at least 800, at least 1,000, at least 1,300, at least 1,700, at least 2,000, at least 2,500, at least 3,000, at least 3,500, at least 4,000, at least 4,500, at least 5,000, at least 10,000, at least 15,000, at least 20,000, at least 25,000, at least 50,000, at least 100,000, at least 150,000, at least 200,000, at least 250,000, at least 500,000, at least 750,000, at least 1,000,000, or at least 2,000,000.

Embodiment 145 The method according to any one of Embodiments 106 to 144, wherein the depletable chemical agent is a polymeric agent having an average molecular weight of at least 2,000, at least 10,000 or at least 25,000.

Embodiment 146 The method according to any one of Embodiments 106 to 145, wherein said depletable chemical agent comprises one or more positively chargeable nitrogen atoms.

Embodiment 147 The method according to Embodiment 146, wherein the one or more nitrogen atoms constitute at least 1%, at least 1.4%, at least 2%, at least 5%, at least 8%, at least 10%, at least 15%, at least 18%, at least 20%, at least 24%, at least 30%, at least 35%, at least 40%, at least 45%, or at least 50% by weight of the depletable chemical agent.

Embodiment 148 The method according to any one of Embodiments 106 to 147, wherein the depletable chemical agent is a polymeric agent that includes poly(diallyldimethylammonium chloride)

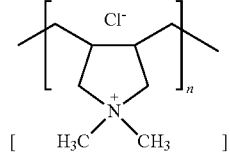

unit.

Embodiment 149 The method according to any one of Embodiments 106 to 147, wherein the depletable chemical agent is a polymeric agent that includes polyallylamine

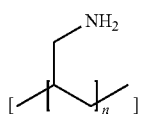

unit.

Embodiment 150 The method according to any one of Embodiments 106 to 147, wherein the depletable chemical agent is a polymeric agent that includes poly(4-vinylpyridine)

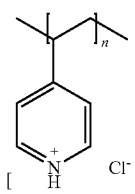

unit.

Embodiment 151 The method according to any one of Embodiments 106 to 147, wherein the depletable chemical polymeric agent is selected from the group consisting of linear polyethylene imine, branched polyethylene imine, modified polyethylene imine, poly(diallyldimethylammonium chloride), poly(4-vinylpyridine), polyallylamine, a vinyl pyrrolidone-dimethylaminopropyl methacrylamide co-polymer (Viviprint 131), a vinyl caprolactam-dimethylaminopropyl methacryamide hydroxyethyl methacrylate copolymer (Viviprint 200), a quaternized copolymer of vinyl pyrrolidone and dimethylaminoethyl methacrylate with diethyl sulfate (Viviprint 650), a guar hydroxypropyltritnonium chloride, and a hydroxypropyl guar hydroxypropyltrimonium chloride.

Embodiment 152 The method according to Embodiment 151, wherein the depletable chemical polymeric agent is polyethyleneimine (PEI).

Embodiment 153 The method according to any one of Embodiments 106 to 152, wherein the first amount of the depletable chemical polymeric agent in the formulation in the liquid reservoir is equal to or less than about 5 wt. %, 4 wt. %, 3 wt. %, 2 wt. %, 1 wt. %, 0.5 wt. %, 0.4 wt. % 0.3 wt %, 0.2 wt. %, 0.1 wt. %, or equals to or being at least about 0.05 wt. % or at times at least about 0.01% wt. %.

Embodiment 154 The method according to any one of Embodiments 106 to 153, wherein the depletable chemical agent is a polymeric agent being PEI and wherein the predetermined threshold value is at least 0.01 wt. %, at least 0.05 wt. %, at least 0.10 wt. %, at least 0.15 wt. % or at least 0.20 wt. %.

Embodiment 155 The method according to any one of Embodiments 106 to 154, wherein the depletable chemical agent is a polymeric agent being PEI and wherein the first amount thereof by weight, in the liquid formulation is at most 6%, at most 5%, at most 4%, at most 3%, at most 2.5%, at most 2.0%.

Embodiment 156 The method according to any one of Embodiments 106 to 155, wherein the depletable chemical agent is a polymeric agent being PEI and wherein the first amount thereof, by weight, in the liquid formulation, is within a range of 0.01 to 1%, 0.01 to 0.8%, 0.01 to 0.7%, 0.01 to 0.6%, 0.01 to 0.5%, 0.2 to 0.7%, 0.2 to 0.6%, or 0.2 to 0.5%.

Embodiment 157 The method according to any one of Embodiments 106 to 156 wherein the at least one depletable chemical agent is PEI, wherein the first amount thereof in the formulation in liquid reservoir is 0.25 wt. % and the second amount thereof in the replenishment reservoir is 25 wt. % in water.

Embodiment 158 The method according to Embodiment 157 wherein when the first amount of the PEI in the liquid formulation is reduced below a predetermined threshold value of 0.01 wt. % a portion of said second amount of the PEI is added to said liquid formulation, to thereby replenish the amount of the PEI in the liquid formulation to a value being equal to or above said predetermined threshold value (0.01 wt.) or to replenish the amount of the PEI the liquid formulation to a value being equal to the first amount (0.25 wt. %).

Embodiment 159 The method according to any one of Embodiments 106 to 158, wherein the depletable chemical agent is a polymeric agent being PEI and wherein the average molecular weight thereof is at least 20,000, at least, 50,000, at least 100,000, at least 200,000, at least 350,000, at least 500,000, at least 700,000, at least 750,000 and optionally, at most 3,000,000, at most 2,500,000, or at most 2,000,000.

Embodiment 160 The method according to any one of Embodiments 106 to 159, wherein the depletable chemical agent is a polymeric agent being PEI, and wherein said PEI is a surface active agent, a wetting agent, an anchoring agent or any combination thereof.

Embodiment 161 The method according to any one of Embodiments 106 to 160, wherein the depletable chemical agent is a polymeric agent being PEI, wherein the charge densities of the PEI polymer is in the range of 16-20 meq/g of material.

Embodiment 162 The method according to any one of Embodiments 106 to 160, wherein the depletable chemical agent is a polymeric agent being PEI, wherein the charge densities of the PEI polymer is of 8 meq/g.

Embodiment 163 The method according to any one of Embodiments 106 to 162, wherein the depletable chemical agent is silicone functionalized PEI.

Embodiment 164 The method according to any one of Embodiments 106 to 163, wherein the depletable chemical agent is a quaternary ammonium compound.

Embodiment 165 The method according to Embodiment 164, wherein the quaternary ammonium compound is Larostat264A (BASF).

Embodiment 166 The method according to Embodiment 164, wherein the quaternary ammonium compound is Foamquat SAQ (Linoleamidopropyl Ethyldimonium Ethosulfate 90).

Embodiment 167 The method according to any one of Embodiments 106 to 166, wherein the depletable chemical agent is water dispersible.

Embodiment 168 The method according to any one of Embodiments 106 to 166, wherein the depletable chemical agent is water soluble.

Embodiment 169 The method according to any one of Embodiments 106 to 168, wherein the depletable chemical agent is solid at room temperature.

Embodiment 170 The method according to any one of Embodiments to 134 to 169, wherein the least one binder in the ink formulation is a negatively charged organic polymeric resin.

Embodiment 171 The method according to Embodiment 170, wherein the average molecular weight of the a negatively charged organic polymeric resin is at least 8,000.

Embodiment 172 The method according to Embodiment 170 or 171, wherein the at least one binder in the ink formulation is an acrylic polymer and/or an acrylic-styrene co-polymer.

Embodiment 173 The method according to Embodiment 170, wherein the binder is to Joncryl 538 BASF.

Embodiment 174 The method according to any one of Embodiments 106 to 173, wherein the depletable chemical agent is PEI, and wherein the reduction in the first amount of PEI being due an undesired side reaction thereof with said at least one binder.

Embodiment 175 The method according to any one of Embodiments 106 to 174, wherein said method further comprises detecting and/or measuring and/or calculating the concentration of the depletable chemical agent in the liquid formulation and calculate therefrom the reduction in the first amount of said depletable chemical agent.

Embodiment 176 The method according to Embodiment 175, wherein the depletable chemical agent is PEI and wherein said detecting and/or measuring and/or or calculating is performed by spectroscopic means utilizing a reaction of copper with said PEI.

Embodiment 177 The method according to any one of Embodiments 106 to 176 wherein said treatment formulation comprises:
- at least one water soluble polymer;
- at least one particulate material selected from (i) at least one thermoplastic polymeric particulate material, optionally in the form of an emulsion and/or a dispersion, (ii) at least one thermosetting polymeric particulate material, optionally in the form of a dispersion and/or an emulsion; or a combination thereof;
- a carrier liquid containing water; and optionally, one or more of (a) at least one humectant (b) at least one surfactant; and (c) at least one wetting agent.

Embodiment 178 The method according to Embodiment 177, wherein said treatment formulation further comprising at least one wetting agent.

Embodiment 179 The method according to Embodiment 178 wherein said wetting agent is PEI.

Embodiment 180 The method according to Embodiment 177, wherein said water soluble polymer is at least one modified polysaccharide.

Embodiment 181 The method of Embodiment 180 wherein said modified polysaccharide is selected from cellulose derivative, cellulose ether, methylcellulose, hydroxypropyl methylcellulose or any combinations thereof.

Embodiment 182 The method of Embodiment 181 wherein said modified polysaccharide is hydroxypropyl methylcellulose.

Embodiment 183 The method according to any of Embodiments 1 to 182 wherein said treatment formulation is as herein disclosed and exemplified.

The invention claimed is:

1. A system for printing, comprising:
a liquid reservoir configured for holding a formulation, the formulation comprising a first amount of at least one depletable chemical agent, said first amount being substantially equal to or greater than a predetermined threshold value;
a replenishment reservoir configured for holding a second amount of said at least one depletable chemical agent;
detection means configured at least to identify a reduction in (i) said first amount of said depletable chemical agent below said predetermined threshold value and/or (ii) the functionability of said at least one depletable chemical agent,
wherein said reduction in the first amount of said depletable chemical agent occurs due to a side reaction of the depletable chemical agent with a contaminant; and
transfer means configured to transfer at least a portion of said second amount of the at least one depletable chemical agent from said replenishment reservoir to said liquid reservoir once said reduction has been identified.

2. The system according to claim 1, wherein said system further comprises a control unit configured to control replenishment of said at least one depletable chemical agent in the liquid reservoir.

3. The system according to claim 1, wherein said system further comprises at least one printing liquid reservoir configured for holding a printing liquid.

4. The system according to claim 1, wherein (i) said system is for indirect printing; (ii) said system further comprises an intermediate transfer member; (iii) said formulation is a treatment formulation configured to be applied onto at least a region of a release surface of said intermediate transfer member and to form a coating layer thereon; and (iv) said formulation is applied onto said release surface before said printing liquid is applied thereon.

5. The system according to claim 2, wherein upon detection/identifying of said reduction, said control unit is configured to control replenishment of said at least one depletable chemical agent in said liquid reservoir, in accordance with a replenishment profile selected to increase the amount of the depletable chemical agent in said liquid reservoir to reach a value being substantially equal to or greater than said predetermined threshold value.

6. The system according to claim 1, wherein said system further comprises a processing utility configured to process an image produced by said system and to assess the image printing quality thereof, wherein when said image printing quality is below a predetermined required quality the control unit is configured to cause replenishment of said at least one depletable chemical agent in said liquid reservoir.

7. The system according to claim 1, wherein said side reaction of the depletable chemical agent results with a formation of a byproduct in said liquid reservoir.

8. The system according to claim 7, wherein said system further comprises means to detect the formation of said byproduct.

9. The system according to claim 7, wherein said system further comprises at least one printing liquid reservoir configured for holding a printing liquid and wherein said reduction in the first amount of said depletable chemical agent being due to printing liquid contamination in the liquid reservoir, in particular, wherein said printing liquid is an ink and comprises at least one binder and at least one colorant, and wherein said reduction in the first amount of said depletable chemical agent being due to a side reaction of the depletable chemical agent with said at least one binder.

10. The system according to claim 9, wherein the depletable chemical agent is polyethyleneimine (PEI).

11. A method for preventing or minimizing printing defects in a printing process, wherein the printing defects are associated with a reduction in a first amount of at least one depletable chemical agent comprised within a liquid formulation, the method comprising:
identifying/detecting a reduction in the first amount of said at least one depletable chemical agent below a predetermined threshold value and/or relative to an amount of at least one another component in the formulation, said reduction in the first amount of said depletable chemical agent being due to a side reaction of the depletable chemical agent with a contaminant; and adding to the formulation, upon identifying/detecting said reduction, at least a portion of a second amount of the at least one depletable chemical agent, wherein said at least a portion of a second amount being sufficient to reestablish the first amount of the depletable chemical agent in said liquid formulation to be substantially equal or greater than said predetermined threshold value and/or wherein said at least a portion of said second amount being sufficient to negate the reduction of the first amount relative to an amount of at least another component in the formulation, to thereby prevent or minimize said printing defects.

12. The method according to claim 11, wherein said liquid formulation is configured to be applied on a substrate on which an image is to be printed or on an intermediate transfer member in an indirect printing process.

13. The method according to claim 11, wherein the addition of at least a portion of the second amount of the at least one depletable chemical agent is performed according to a predetermined replenishment profile selected to increase the amount of the depletable chemical agent in the liquid formulation to reach a value being substantially equal to or greater than a predetermined threshold value.

14. The method according to claim 11, wherein said method further comprises processing an image produced in said method and assessing the image printing quality thereof, wherein when said image printing quality is below a predetermined required quality the method comprises addition of at least a portion of said second amount of said at least one depletable chemical agent to said liquid formulation.

15. The method according to claim 11, wherein said side reaction of the depletable chemical agent results with a formation of a byproduct in said liquid formulation.

16. The method according to claim 15, wherein said method further comprises correlating between the detected formation of said byproduct and the reduction in the first amount of the depletable chemical agent.

17. The method according to claim 15, wherein said reduction in the first amount of said depletable chemical agent being due to ink contamination in the liquid formulation, wherein said ink comprises at least one binder and at least one colorant, and wherein said reduction in the first amount of said depletable chemical agent being due to a side reaction of the depletable chemical agent with said at least one binder.

18. The method according to claim 17, wherein the depletable chemical agent is polyethyleneimine (PEI).

19. The system according to claim 5, wherein said replenishment profile defines one or more of: the amount of the at least one depletable chemical agent to be transferred from the replenishment reservoir to the liquid reservoir; the frequency of the replenishment; the duration of the transfer; the manner of the transfer; and the transfer rate, wherein said replenishment profile is determined based on one or more of: said first amount and/or second amount of the depletable chemical agent; the extent of said reduction; the relative amount of the depletable chemical agent with respect to the formulation amount or the amount of other one of more components comprised within the formulation.

20. The system according to claim 6, wherein said processing utility is configured to generate an output indicative of the quality of said image, wherein when said output is below a predetermined threshold parameter the control unit is configured to cause replenishment of said at least one depletable chemical agent in said liquid reservoir, and wherein when said output is below a predetermined threshold parameter value the system is configured to immediately alert the user to stop or automatically stop the printing process.

21. The method according to claim 13, wherein said method further comprises identifying a reduction in the first amount of said least one depletable chemical agent relative to an amount of at least another component in the formulation and provide a signal indication, indicating the need to add said at least one depletable chemical agent to said liquid formulation to thereby reestablishing the first amount of the depletable chemical agent in said liquid formulation to be substantially equal or greater than said predetermined threshold value hence to negate said reduction.

22. The method according to claim 14, wherein said method further comprises generating an output indicative of the quality of said image, wherein when said output is below a predetermined threshold parameter the method comprises addition of said at least a portion of said second amount of said at least one depletable chemical agent to said liquid formulation.

* * * * *